United States Patent [19]
Hoshi et al.

[11] Patent Number: 5,816,569
[45] Date of Patent: Oct. 6, 1998

[54] SHEET FEEDING APPARATUS AND IMAGE READING APPARATUS

[75] Inventors: Akimitsu Hoshi, Kawasaki; Tsuyoshi Yamauchi, Yokohama, both of Japan

[73] Assignee: Canon Kabushiki Kaisha, Tokyo, Japan

[21] Appl. No.: 723,823

[22] Filed: Sep. 30, 1996

[30] Foreign Application Priority Data

Sep. 29, 1995 [JP] Japan ................................. 7-251708

[51] Int. Cl.⁶ ................................................. B65H 3/52
[52] U.S. Cl. ........................ 271/117; 271/122; 271/127
[58] Field of Search .................................. 271/114, 116, 271/117, 122, 125, 126, 127

[56] References Cited

U.S. PATENT DOCUMENTS

| | | | |
|---|---|---|---|
| 5,158,279 | 10/1992 | Laffey et al. | 271/122 |
| 5,564,689 | 10/1996 | Fukuba | 271/122 |
| 5,566,006 | 10/1996 | Yoshinaga et al. | 358/475 |
| 5,624,109 | 4/1997 | Tanaka | 271/122 |

FOREIGN PATENT DOCUMENTS

| | | | |
|---|---|---|---|
| 4031661404 | 7/1991 | Japan | 271/114 |
| 3216428 | 9/1991 | Japan . | |

*Primary Examiner*—H. Grant Skaggs
*Attorney, Agent, or Firm*—Fitzpatrick, Cella, Harper & Scinto

[57] ABSTRACT

A sheet feeding apparatus for separating stacked sheets one by one and feeding the sheets which includes a feed roller for feeding sheets, a retard roller for separating the sheets one by one between the retard roller and the feed roller, and a torque limiter for transmitting a predetermined torque to the retard roller. The sheet feeding apparatus also includes a roller shaft for movably supporting the retard roller, a gear for transmitting a drive force to the roller shaft of the retard roller, a coupling member for coupling the retard roller and the gear, and universal joints connecting the gear with the coupling member, and the coupling member with the roller shaft, respectively. The torque limiter is disposed on the coupling member.

13 Claims, 45 Drawing Sheets

FIG. 9
(a)
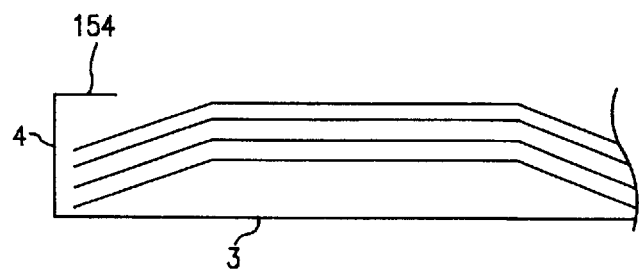
(b)
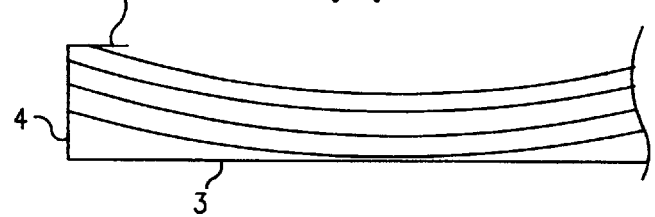

SHEET FEEDING APPARATUS AND IMAGE READING APPARATUS

BACKGROUND OF THE INVENTION

1. Field of the Invention

This invention relates to a sheet feeding apparatus for feeding sheets such as original documents and to an image reading apparatus using the sheet feeding apparatus.

2. Description of Related Art

In printers, photocopiers, and facsimile machines, sheet feeding apparatuses are widely used these days to feed, one by one, original documents or recording sheets set as multiple sheets. As a sheet separation mechanism in such a sheet feeding apparatus, there is a retard separation method in which sheets are pushed by a retard roller, which rotates in the reverse direction to a feeding direction of the sheets, toward a feed roller rotating in a feeding direction of the sheets, and in which stacked sheets are separated and fed one by one in rotating both rollers.

With such a retard separation method, as shown in FIG. 49, a torque limiter 501 is placed in a drive transmission line so as not to transmit a drive power of a predetermined torque or more to the retard roller 500.

To enable the retard roller 500 to push sheets onto the feed roller, a retard roller shaft 504 is supported by an arm 503 pivotable around a fixed shaft 502 as a center, thereby enabling the retard roller 500 to rock in a direction of the feed roller. Therefore, a shaft of the torque limiter 501 whose both ends are supported by frames 505a, 505b is coupled to a retard roller shaft 504 by an intermediate link member 506 connected by a universal joint. By this mechanism, the drive force to the retard roller 500 is transmitted from a drive gear 507 through the torque limiter 501, the intermediate link member 506, and the retard roller shaft 504.

With the supporting constitution of the retard roller, however, if the apparatus is made to be compact, an inclined angle theta one (θ1) of the intermediate link member 506 comes larger when the retard roller 500 is rocked, because a distance between the frames 505a, 505b or a length of the intermediate link member 506 tends to be obtained less. If this inclined angle theta one (θ1) becomes larger, a force to push the retard roller 500 to the feed roller may occur when a rotational force is transmitted to the roller 500, thereby likely making unstable the pushing force of the retard roller 500 to the feed roller. Furthermore, if the pushing force becomes unstable, the retard roller may not worn out evenly, so that eccentric worn-out phenomena may occur in which a part there is worn out, and so that the life of the retard roller may be shortened.

SUMMARY OF THE INVENTION

This invention is to solve problems above of prior art, and it is an object of the invention to provide a sheet feeding apparatus not lowering separation capability of sheets and not shortening the life of the apparatus even if the apparatus is made compact, and an image reading apparatus using the sheet feeding apparatus.

A representative constitution according to the invention to accomplish the object, is characterized in having, in a sheet feeding apparatus for separately feeding stacked sheets one by one, a feed roller for feeding a sheet, a retard roller for pushing the sheet to the feed roller and rotating to feed the sheet in the reverse direction to the feeding direction, a drive motor for driving the feed roller and the retard roller, a torque limiter for transmitting a predetermined torque to the retard roller, a gear for transmitting a drive force to a roller shaft of the retard roller, and a coupling member for coupling the retard roller shaft and the gear, wherein respective universal joints connect the gear with the coupling member, and the coupling member with the retard roller shaft, and the torque limiter is disposed on the coupling member.

With the constitution above, since the gear for transmitting the drive force and the retard roller shaft are coupled by the coupling member in which the universal joint forms coupling, the length of the coupling member can be long even if the apparatus is made compact, and the inclined angle of the coupling member cannot be larger even when the retard roller is rocked. Therefore, the rotational force to the retard roller is smoothly transmitted by the universal joint, thereby making stable the pushing force to the feed roller by the retard roller, and thereby preventing eccentric worn-out.

BRIEF DESCRIPTION OF THE DRAWINGS

FIG. 9 is a cross section showing a curling state of original documents;

DETAILED DESCRIPTION OF THE PREFERRED EMBODIMENTS

Now, a sheet feeding apparatus as an embodiment according to this invention and an image reading apparatus using the sheet feeding apparatus are described.

First Embodiment

Figure 1:
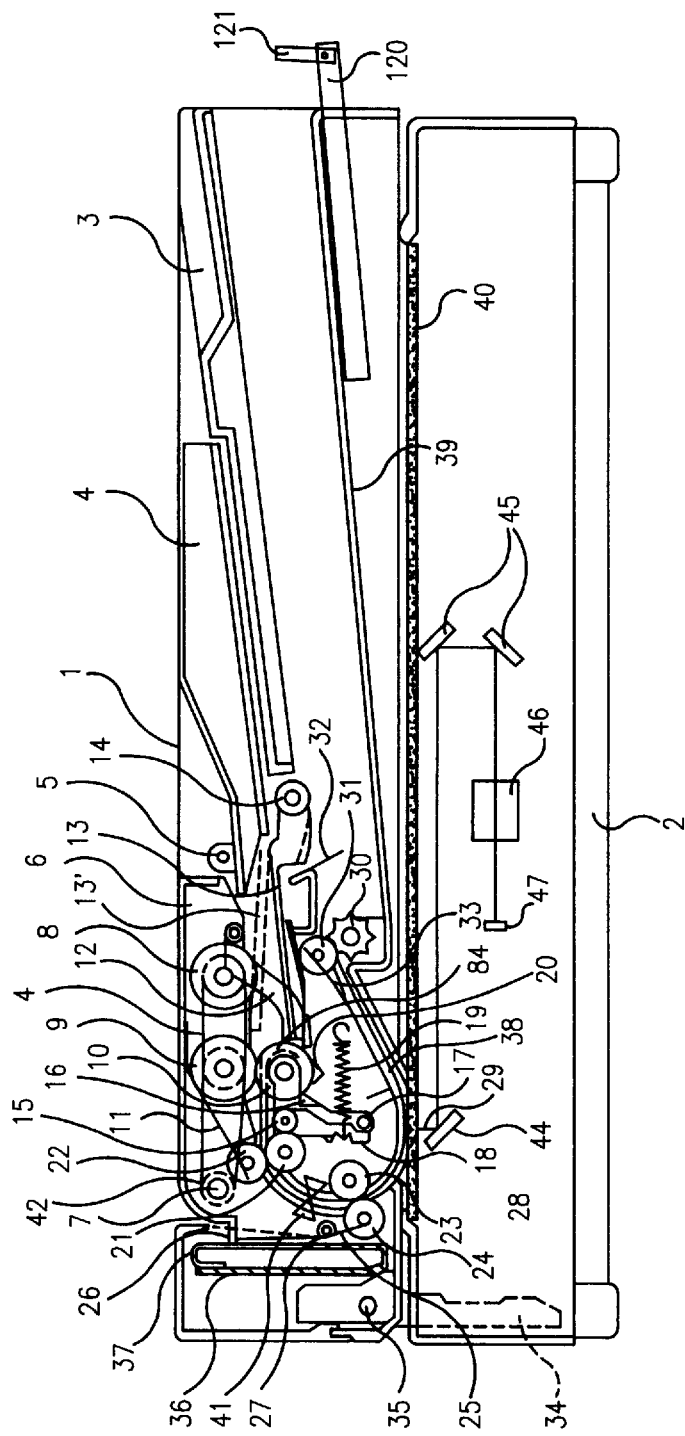
FIG. 1 is a cross-sectional illustration of an image reading apparatus equipped with an original document feeding apparatus according to an embodiment of the invention.
Figure 2:
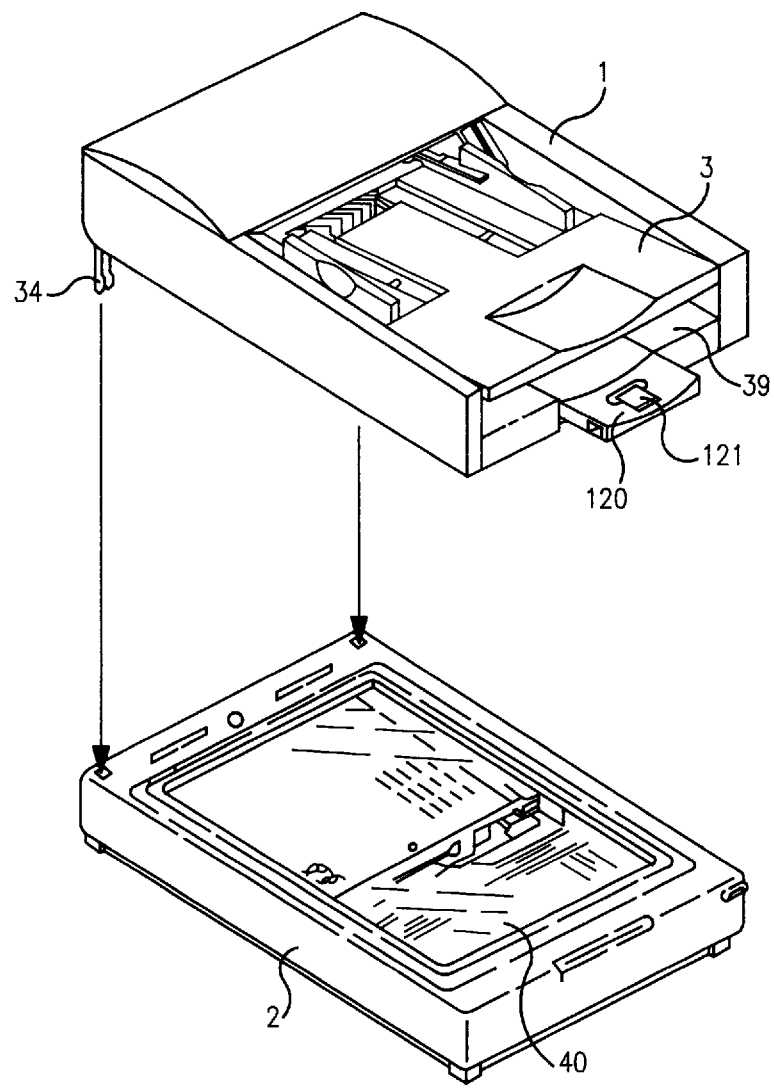
FIG. 2 is a perspective view showing an attaching structure of a flat head scanner and the original document feeding apparatus.

As a sheet feeding apparatus according to this invention, an image reading apparatus using an original document feeding apparatus for feeding original documents is exemplified and described. As shown in FIGS. 1, 2, the image reading apparatus is composed of the original document feeding apparatus 1 and a flat bed scanner 2 operating as reading means.

{Entire Constitution}

Referring to FIG. 1, the entire constitution of the image reading apparatus is described. In the image reading apparatus, original documents are set on a feeding tray 3, and, upon power on of a reading start switch or reception of an reading start signal from a computer shown in FIG. 43 as described below or from a computer network not shown, the original documents are fed by a pickup roller 8, fed one by one by a feed roller 9 and a retard roller 10, and conveyed to a reading section by a pull-up roller 21 and a document feed roller 23. While the original document is conveyed through the reading section, the scanner 2 scans information on the original document. The original document after reading is conveyed by a delivery roller 30 and delivered onto a delivery tray 39 through being electrically discharged by means of a discharging needle or needles 32.

Figure 3:
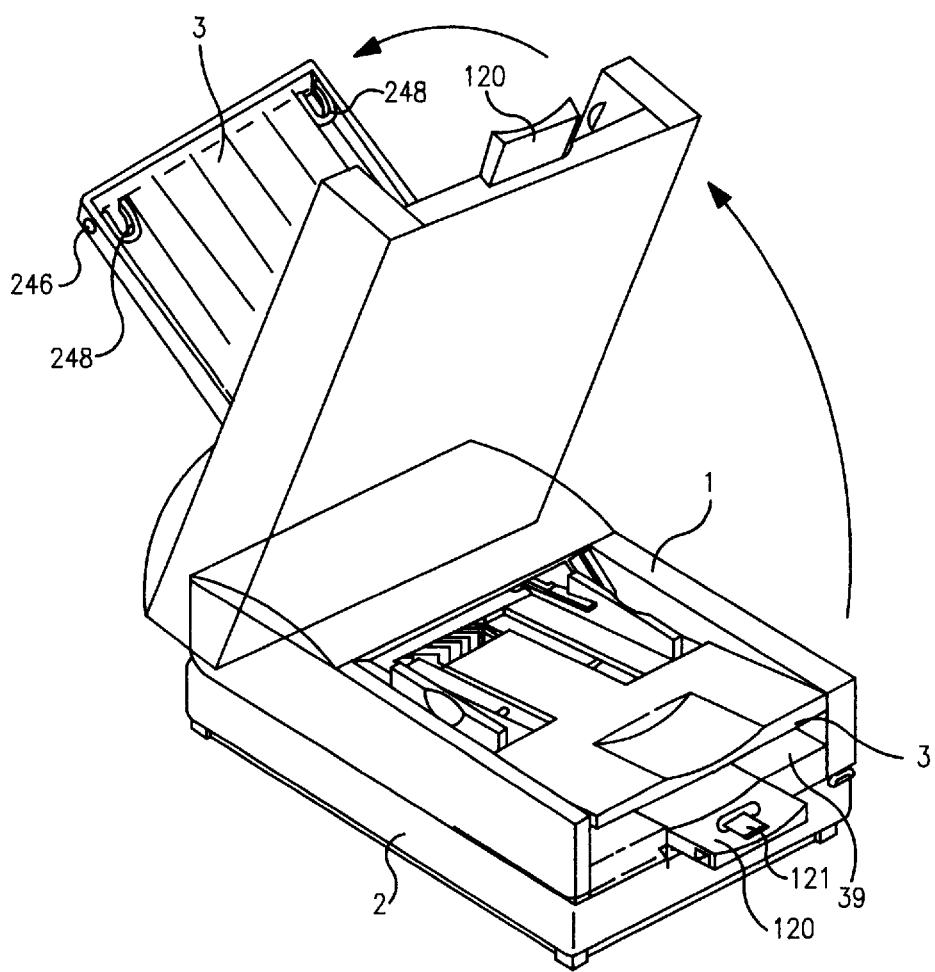
FIG. 3 is a perspective view showing an opening and closing structure of a flat head scanner and the original document feeding apparatus.

Although the image reading apparatus can automatically feed and read original documents by the original document feeding apparatus 1, the original document feeding apparatus 1 and the scanner 2 are coupled in a way that legs 34 provided at the end of the original document feeding apparatus 1 fit into holes in the scanner 2 as shown in FIG. 2, and the original document feeding apparatus 1 is pivotable to the scanner 2 placed thereunder since the legs 34 are pivotable around their shafts 35 as shown in FIG. 1. Therefore, as shown in FIG. 3, original documents can be directly read upon being put on a platen glass 40 of the scanner 2 where the original document feeding apparatus 1 is opened to expose the glass 40.

Now, respective sections of the image reading apparatus having this original document feeding apparatus are sequentially described below.

{Function of a Stopper of the Original Document Feeding Apparatus}

The number 120 represents a stopper as supplemental tray means, formed to project from tray means (the delivery tray 39 in this embodiment) arranged below the original document feeding apparatus 1, extendible according to the length in the feeding direction of original documents put on the tray means. When the length in the feeding direction of the original documents is long, the stopper 120 is pulled from the tray means for a predetermined amount to prevent the end of original documents from hanging from the tray means and the documents from falling down on a floor or table.

Figure 4:
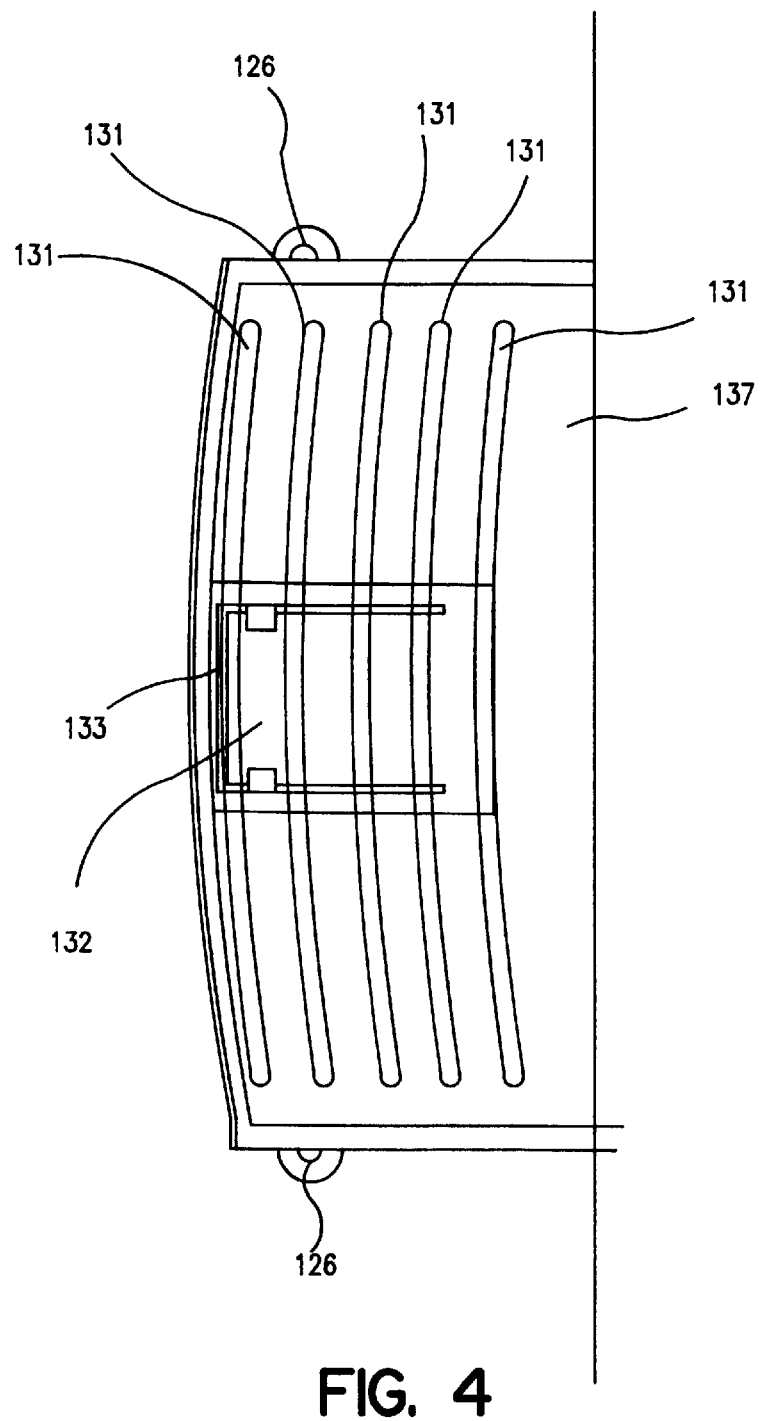
FIG. 4 is a view of a stopper when seem from its bottom.

The stopper 120 is arranged to project from the delivery tray 39 as the tray means provided on a lower side and functions as a handle when the original document feeding apparatus 1 attached as openable at the top of the scanner 2 is opened as shown in FIG. 3. FIG. 4 is an enlarged view showing the stopper 120 when seen from the bottom thereof A cover 137 is formed on the bottom of the stopper 120 and formed with projections 131 for engaging fingers as shown in FIG. 4. The projections 131 allow a user to surely grip the stopper 120 when the user opens or closes the original document feeding apparatus 1 with his hand and prevent the hand of the user from slipping. Thus, the stopper 120 serving as supplemental tray means is formed at the tray means arranged on the lower side, and is used as a handle, thereby allowing a user to surely control the original document feeding apparatus open and closed, and thereby preventing such a user from mistakenly slipping his hand.

Although in this embodiment the constitution is exemplified in which the stopper 120 serving as supplemental tray means is formed at the delivery tray 39 as the tray means located on the lower side where the original document feeding apparatus 1 feeds original documents one by one from the feeding tray 3 as the tray means located on an upper side and delivers them to the delivery tray 39 located on the lower side, this invention is not limited to this embodiment. For example, though not shown, where the original document feeding apparatus 1 feeds original documents one by one from the feeding tray 3 as the tray means located on a lower side and delivers them to the delivery tray located on an upper side, constitution with a stopper 120 serving as supplemental tray means formed at the feeding tray located on the lower side, can obtain substantially the same effects described above.

{Feeding Tray}

In FIG. 1, the numeral 3 represents the original document feeding tray 3 as the tray means and is attached in an openable manner on the upper side of the original document feeding apparatus 1. This mechanism makes original documents in a smaller size easy to be removed when delivered onto the delivery tray 39 as the tray means located on the lower side and makes original documents easy to be removed when jammed on a delivery side.

However, in the case of an image reading apparatus in which the original document feeding apparatus 1 is openable with respect to the scanner 2 and in which the tray means (the feeding tray 3 in this embodiment) is openable with respect to the original document feeding apparatus 1, in particular, likewise in this embodiment, in the case of an image reading apparatus in which an opening and closing direction of the entire original document feeding apparatus 1 is the same direction as an opening and closing direction of the feeding tray 3, when the original document feeding apparatus 1 is made open or closed, the feeding tray 3 may also be opened unnecessarily as shown in FIG. 3 by force exerted therefrom.

According to this embodiment, to prevent this unnecessary opening, the image reading apparatus in which the original document feeding apparatus 1 is openable with respect to the scanner 2 and in which the tray means (the feeding tray 3 in this embodiment) is openable with respect to the original document feeding apparatus 1, in particular, likewise in this embodiment, in which an opening and closing direction of the entire original document feeding apparatus 1 is the same direction as an opening and closing direction of the feeding tray 3, provided engaging means for elastically engaging the original document feeding apparatus 1 with the feeding tray 3 between the apparatus 1 and the tray 3, thereby preventing the feeding tray 3 from opening and closing upon opening and closing operation of the original document feeding apparatus 1.

Figure 5:
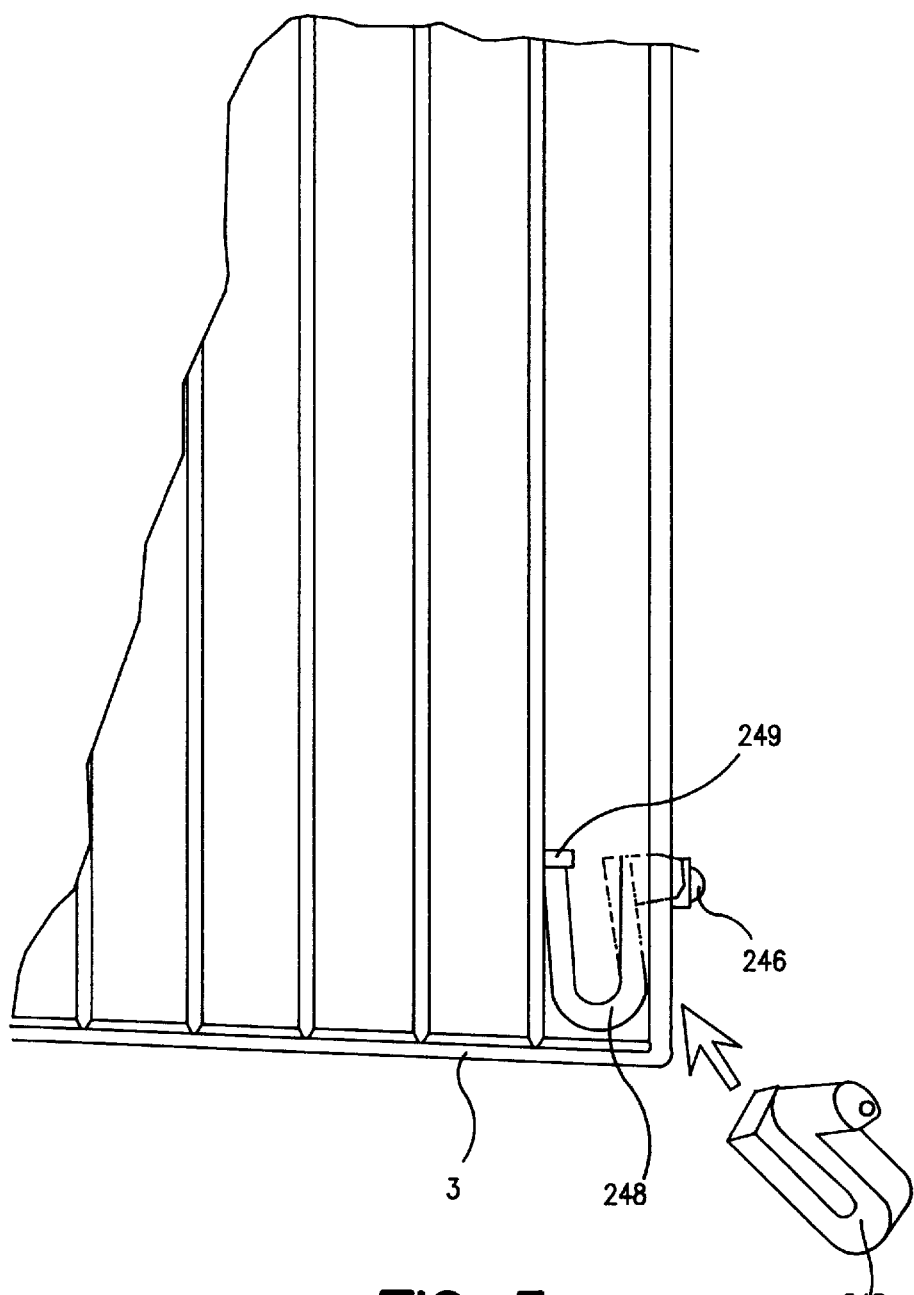
FIG. 5 is a view of a tip side of an original document feeding tray when seen from its bottom.
Figure 6:
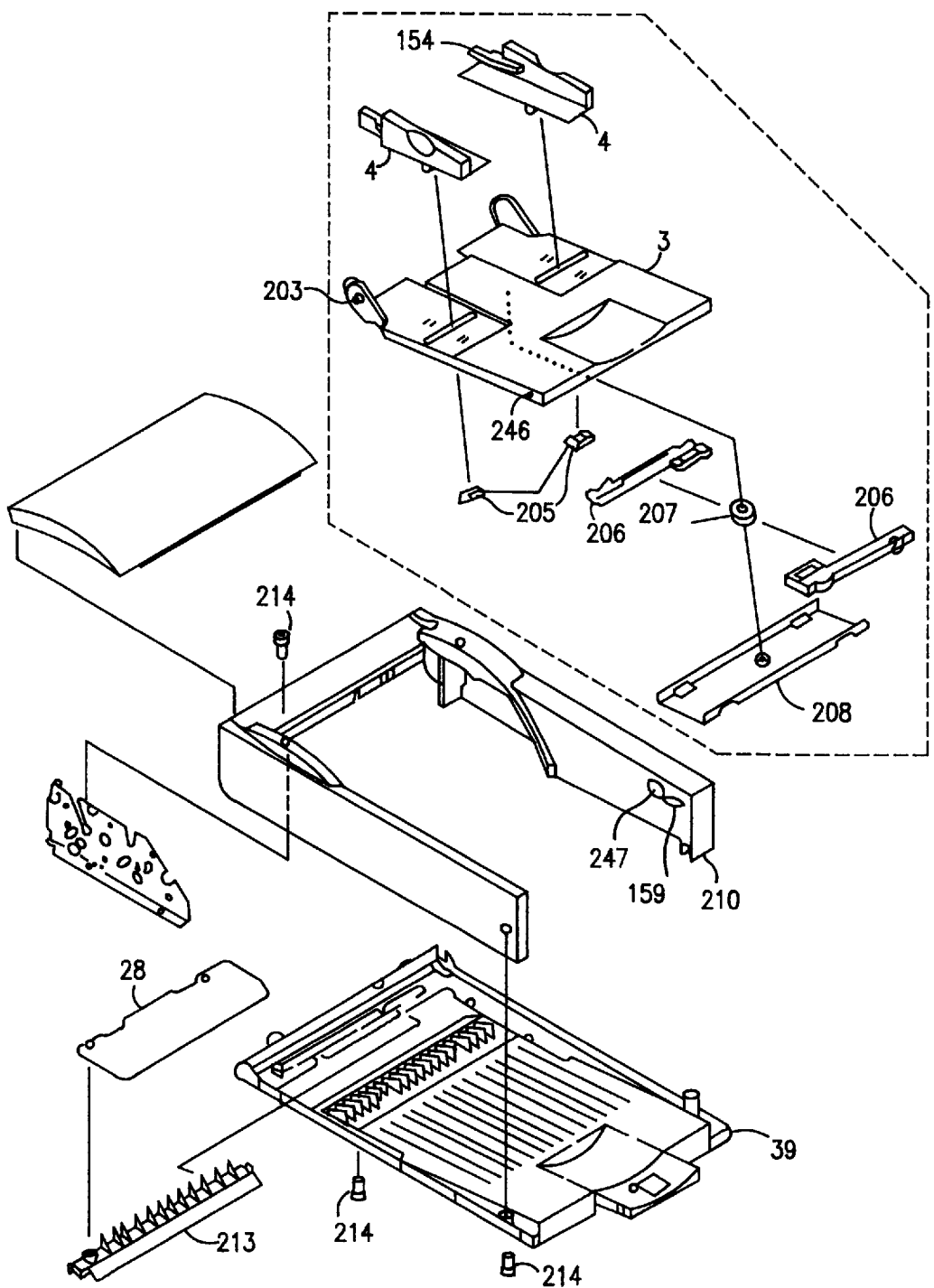
FIG. 6 is a layout of parts forming an exterior of the original document feeding apparatus.

Referring to FIGS. 5, 6, the constitution of the engaging means is described in detail. FIG. 5 is a partial enlarged view of a tip side of the feeding tray 3 when seen from the bottom thereof, FIG. 6 is an extended view of an outer housing.

The engaging means is constituted of an elastic member 248 (snap-fit member) having an elastic boss 246, and an engaging recess 247 to which the elastic boss fits. In this embodiment, as shown in FIGS. 5, 6, the elastic member 248 is attached on a side of the feeding tray 3; the engaging recess 247 is disposed on a side of the original document feeding apparatus 1; by the virtue of such elastic engagement between the boss 246 and recess 247, the feeding tray 3 will not operate to be open or closed in association with the opening or closing operation of the original document feeding apparatus 1.

In FIG. 5, the numeral 248 represents an elastic member in a substantially U-shape molded of resin material, formed unitedly with the engaging recess 247 located on the side of the original document feeding apparatus 1 and with the elastic boss 246 with which the recess 247 engages. The elastic member 248 is attached as shown in FIG. 5 so as to be sandwiched between ribs provided on the bottom of the feeding tray 3. A rib 249 for stopping rotation is provided on a predetermined position on the bottom of the feeding tray 3 to prevent the elastic member 248 from rotating when the elastic member 248 is attached between the ribs provided on the bottom of the feeding tray 3, and a hole is provided there to which the elastic boss 246 fits. The elastic member 248 serves as a snap-fit mechanism where attached to the feeding tray 3 as shown in FIG. 5 and where the elastic boss 246 of the elastic member 248 is pushed by a member with which the boss engages.

Meanwhile, as shown in FIG. 6, the outer housing 210 of the original document feeding apparatus 1 is formed with the engaging recess 247 with which the elastic boss 246 functioning as the snap-fit mechanism attached to the feeding tray 3 engages, and a contact rib 159 is disposed on the outer housing 210 to support the feeding tray 3 by contacting the tray 3. It is to be noted that in FIGS. 5, 6, the elastic member 249 having the elastic boss 246, the engaging rib 159, and the contact rib 159, constituting the engaging means, are shown on one side in a widthwise direction, but engaging means having substantially the same constitution is also symmetrically provided on the other side with respect to the center in the widthwise direction.

This constitution allows to prevent the feeding tray 3 from unnecessarily opening even when the original document feeding apparatus 1 is opened, by engaging the elastic boss 246 of the elastic member 248 attached on the bottom of the feeding tray 3 with the engaging recess 247 of the outer housing 210 of the original document feeding apparatus 1. Since the elastic member 248 can function as the snap-fit mechanism, engagement between the elastic boss 246 of the elastic member 248 and the engaging recess 247 is easily released merely by user's pulling operation of the feeding tray 3, thereby allowing the user to readily remove original documents in a small size delivered in the delivery tray 39 and to readily work on jammed paper at the delivery section.

{Side Regulating Guide}

As shown in FIG. 6, side regulating guides 4, as a pair, are arranged at the feeding tray 3 on both sides in the widthwise or horizontal direction of the original document. The guide 4 is attached, to the feeding tray 3, slidably in a perpendicular direction to the paper feeding direction and prevents the original documents from forwarding obliquely by pushing the original documents from the perpendicular direction of the feeding direction.

The side regulating guide 4 is engaged as shown in FIG. 6 with a rack gear 206 formed on the bottom of the feeding tray 3; the rack gear 206 is connected to side regulating guides 4 by clips 205. The rack gear 206 engages respective pinion gears 207 rotatably supported on the bosses provided on the bottom of the feeding tray 3. By those gears 206, 297, the side regulating guides of the pair are constituted as to move in the opposite direction to each other with respect to the center thereof. It is to be noted that a rack gear cover 208 is formed to house such as the rack gear 206 and the pinion gears 207, on the bottom of the feeding tray 3. The rack gear cover 208 is formed with bosses for pushing the pinion gears 207 to prevent the pinion gears 207 from dropping out. This cover 208 eliminates screws used to provided for preventing the pinion gears from dropping out, thereby reducing the costs of the apparatus. The bottom of the feeding tray 3 also serves as an upper guide to prevent delivered papers from curling, so that the rack gear cover 208 also operates to prevent the paper from being stuck at that time. The side regulating guides are in a rectangular U-shape and formed with roofs 154 for pushing the original documents form a side of the top of the documents, to prevent ends of the original documents from floating up and forwarding obliquely. With the roofs 154 in this embodiment, a distance between the roof and the surface carrying the original documents on the feeding tray 3 can be selected from one of three steps depending on an amount of the original documents, curled shape or size, by control means.

Figure 7:
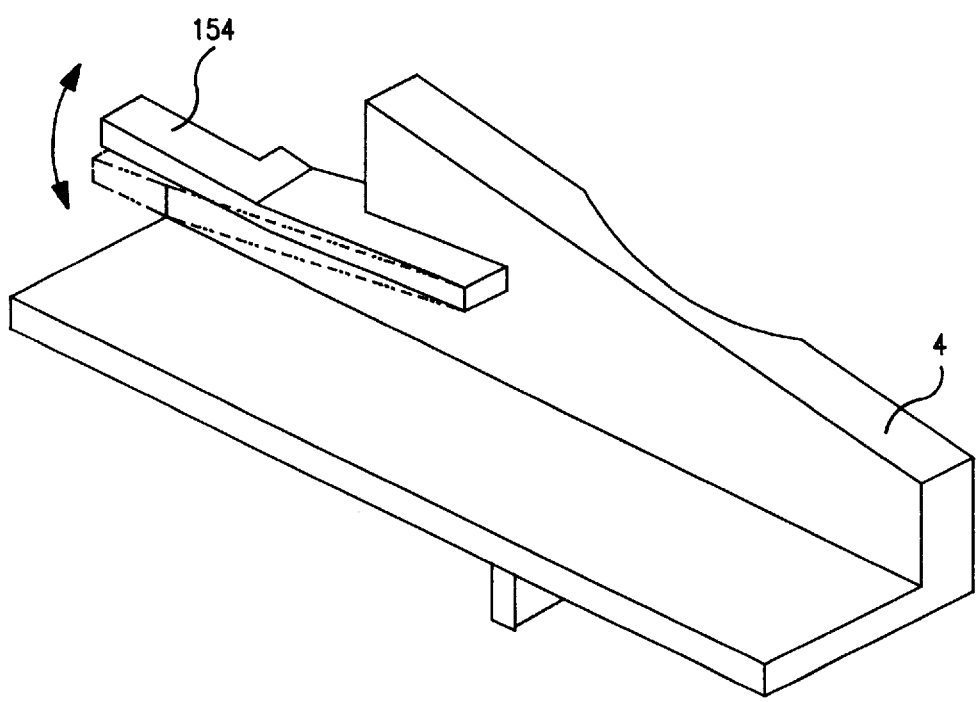
FIG. 7 is a perspective illustration of a side regulating guide.
Figure 8:
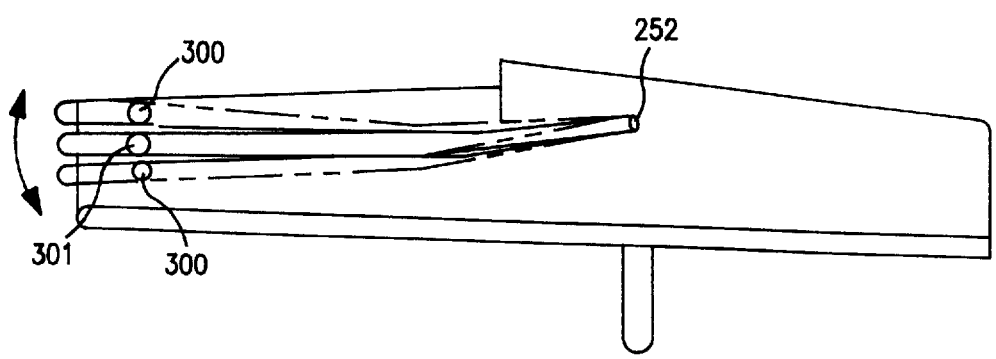
FIG. 8 is a side illustration of a side regulating guide.

Referring to FIGS. 7, 8, the constitution of the control means is described. FIG. 7 is a perspective illustration of the side regulating guide 4; FIG. 8 is a side view showing the guide in FIG. 7 when seen sidewise. As shown in FIG. 8, one end of the roof 154 for pushing curled paper is attached to the regulating guide 4 as pivotable around a shaft 252, whereas a leveling boss 301 for leveling is formed at a pivotable end as the other end of the roof 154 for pushing. Recesses 300 for engaging the leveling boss 301 are formed on a perpendicular wall of the regulating guide 4. The recesses 300 are provided at three locations in a vertical direction in this embodiment; spaces between the recesses 300 are narrower than a diameter of the leveling boss 301; the recesses 300 are connected by grooves allowing the leveling boss 301 to pass when compelled. The leveling boss 301 is capable of engaging any one of three recesses 300 and changes the level of the roof 154 for pushing by changing the recess to which the boss 301 engages.

FIG. 9 is a cross section showing a curled state of an original document. When original documents having folding lines (i.e., an opened letter used to be folded in three) as shown in (a) or original documents curled due to being moisturized under high moisture atmosphere as shown in (b) is fed, and when the number of the original documents is small, the roof 154 cannot press curls of the documents if located at a high position, and the side regulating guides 4 cannot regulate adequately the original documents in the widthwise direction. In such a situation, the level of the roofs 154 is lowered by changing the recess 300 with which the leveling boss 301 engages to the lower position, thereby pushing the curled documents optimistically and preventing the document from forwarding obliquely.

In the feeding tray 3, support pins 203 formed on both sides thereof (see, FIG. 6) are pivotably attached with respect to the engagement holes 5, so that the feeding tray 3 is openable when the original document is removed from delivery tray 39 or jammed paper is removed. It is to be noted that the engagement holes 5 are formed in right side plate 211 and left side plate 212 of the original document feeding apparatus 1 and are burring holes in which a projecting direction comes on outer sides of both side plates 211, 212.

{Upper Openable Guide}

Although the original documents put on the feeding tray 3 are conveyed by the pickup roller 8 or the like, an upper side of the original documents is guided by an upper openable guide 6. The upper openable guide 6 is pivotably attached as shown in FIG. 1 by a rocking center shaft 7 with respect to the original document feeding apparatus 1, and incorporates the pickup roller 8 and the feed roller 9 described below. The rocking center shaft 7 also serves as a drive shaft for transmitting drive power to the pickup roller 8 and feed roller 9 incorporated therein.

As shown in FIG. 1, a leaf spring 3 7 is provided around a proximal end of the upper openable guide 6. The leaf spring 37 operates a switch not shown but attached to an electric board 36 for controlling the original document feeding apparatus 1. A projection 26 formed on the guide 6 pushes the leaf spring 37 when the upper openable guide 6 is closed, so that the leaf spring 37 pushes the switch. On the other hand, when the upper openable guide 6 is open, the projection 26 is separated from the leaf spring 37, so that the lead spring 37 does not push the switch any more. By this mechanism, the open or closed condition of the upper openable guide is detected, and if the upper openable guide 6 is open to remove jammed paper or likewise, the original document feeding apparatus 1 is controlled to stop.

A sensor lever 12 is as shown in FIG. 1 pivotably attached to the upper openable guide 6 to detect whether the original documents are set on the feeding tray 3. The sensor lever 12 is located at a position to interrupt light path of a photo-interrupter 20 when no original document is set on the feeding tray 3; when original documents are set on the feeding tray 3, the original documents rotates the sensor lever 12 to a position away from the light path of the photo-interrupter 20.

(Pickup Roller)

The pickup roller 8 is a roller to feed original documents set on the feeding tray 3 to an inside of the apparatus sequentially from the top of the documents. The pickup roller 8 is formed with a roller shaft rotatably supported on the upper openable guide 6, and two rollers spaced with a predetermined length and attached to the roller shaft.

An up and down rocking tray 13 is disposed below the pickup roller 8 to push each sheet of the original documents to the pickup roller 8. The rocking tray 1, is swingable around a rotational shaft 14 as a center between a lower position shown in FIG. 1 by a solid line and an upper position by a broken line and is driven to move up and down by a lever, a rotational cam and a motor driving the rotational cam, as described below. It is to be noted that the rocking tray 13 is urged upward by a spring not shown, that the spring pulls the rocking tray 13 to move the tray up, and that the cam rotates to move the tray down in opposing force of the spring. The documents set by the rocking tray 13 are pushed onto the pickup roller 8, so that the topmost original document contacts with optimum pressure to the pickup roller 8 notwithstanding the thickness of a pile of the documents.

(Rocking Mechanism of the Up and Down Rocking Tray)

Figure 10:
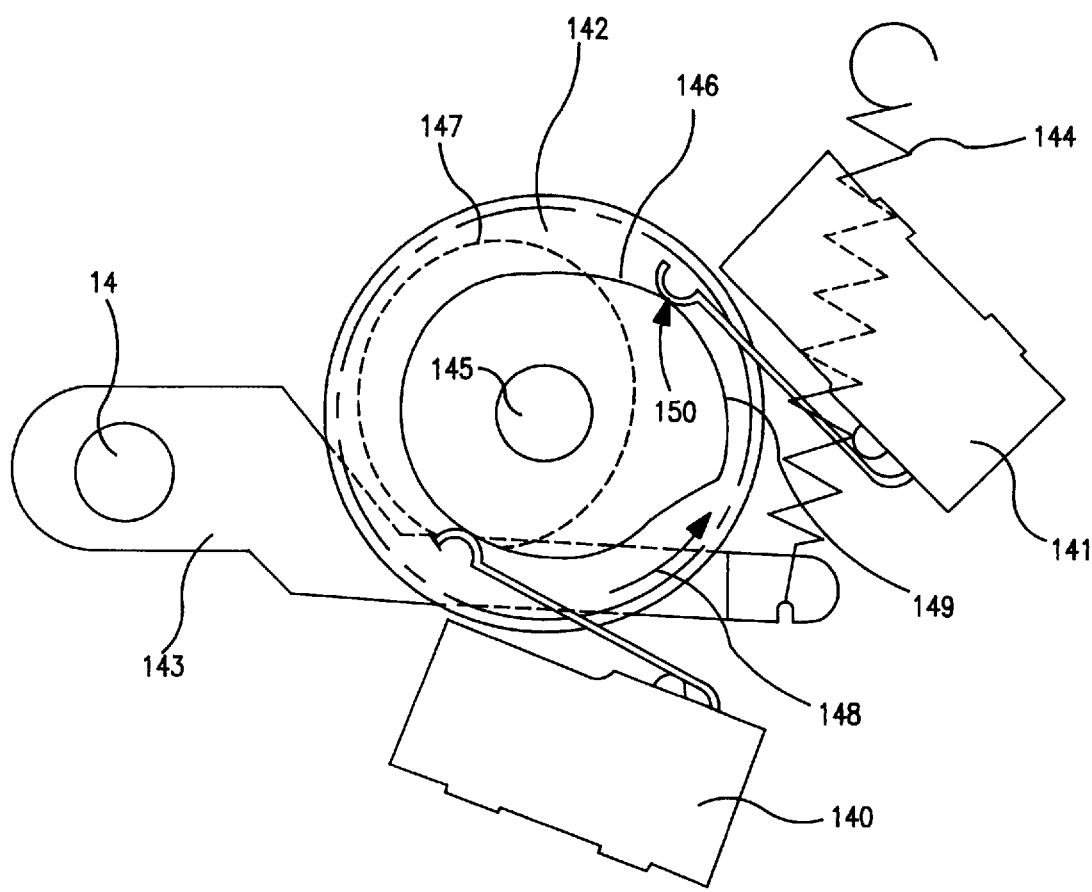
FIG. 10 is a drive structure diagram of a rotary cam for driving an up and down rocking tray.
Figure 11:
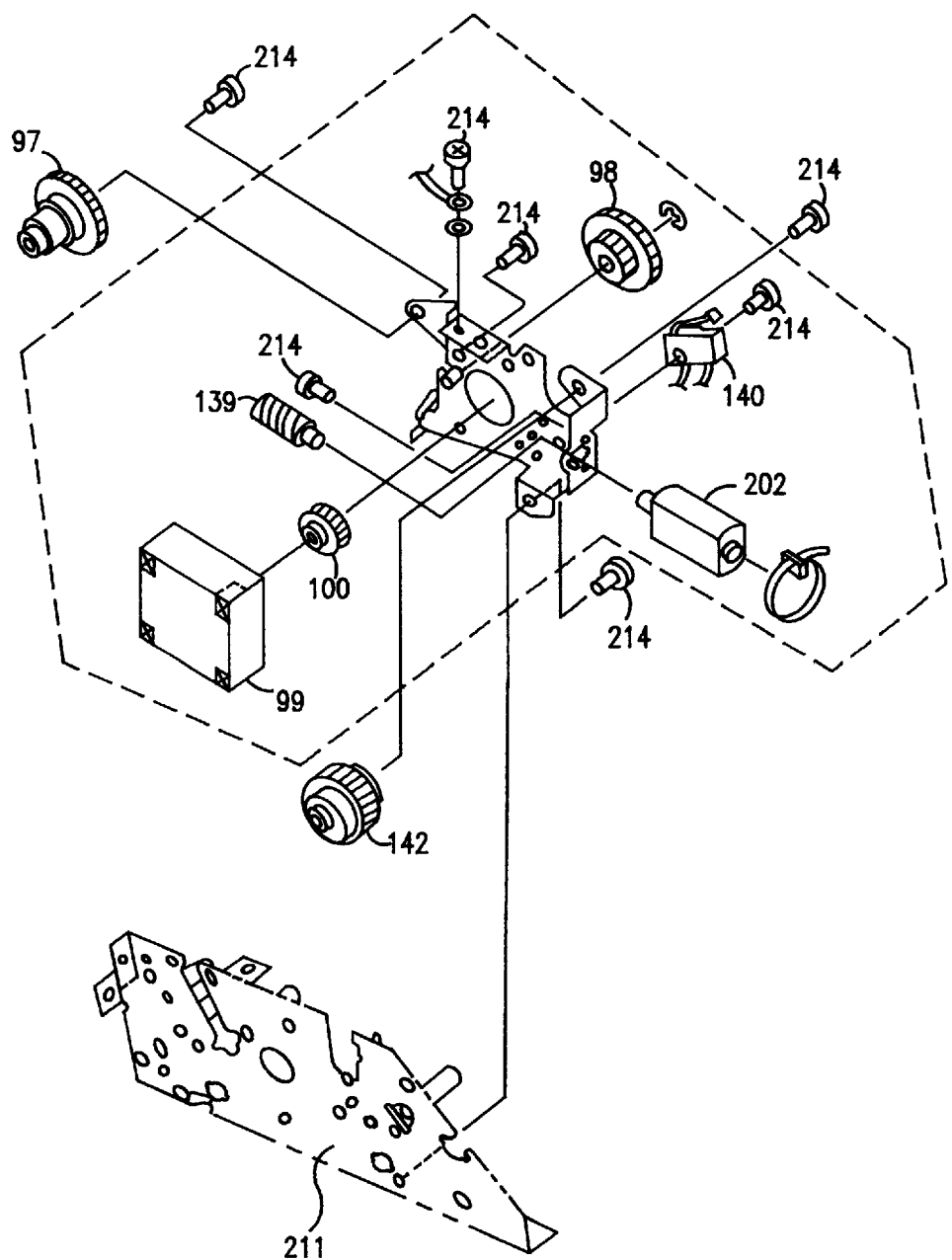
FIG. 11 is a layout of a step motor for driving respective rollers of the original document feeding apparatus and a motor unit made by a drive DC motor of the up and down rocking tray.

Referring now to FIGS. 10, 11, constitution of the rotational cam 142 to rock the up and down rocking tray 13 is described. In FIG. 10, the numerals 140, 141 indicate a first cam sensor and a second cam sensor, respectively and are turned on and off by a first cam 146 of the rotational cam 142 rotating in a direction of arrow 148 around a shaft 145 as a rotary center secured to a frame of the original document feeding apparatus.

A lever 143 is to move the up and down rocking tray 13 up and down, which are supported by a shaft 14. The lever 143 is secured to a rotational shaft, normally urged upward by a spring 144, and rocked around the shaft 14 as the center by the second cam 147 of the rotational cam 142. That is, the rotational cam 142 concurrently operates two jobs, to turn on and off the cam sensors 140, 141 and to move up and down the up and down rocking tray 13, by the respective cams 146, 147. The rotational cam 142 engages a worm gear 139 attached to a DC motor 202, and a wheel gear (not shown) united formed with the rotational cam 142. The numeral 149 indicates an apex of the cam at which the first and second cam sensors are to be stopped.

With this constitution, the DC motor is first turned on to rotate the cam in the direction of arrow 148. Thereby, one cam sensor so far in an on-state is turned off, whereas the other cam sensor is turned on from an off-state. The DC motor is then so powered off that the contact point of the cam sensor to the cam 146 will stop at the apex 149 of the cam. The rotational cam 142 thus can be stopped every about a half turn. As a result, the up and down rocking tray 13 supported by the shaft 14 can be stopped at the upper position and the lower position.

The numeral 150 shown in FIG. 10 is a connection cam face for connecting the apexes of the cam. The connection cam face is smoother than an opposite position. The connection cam face is provided to prevent the lever of the cam sensor 140 from being broken due to counter collision of the lever when the rotational cam rotates in the direction of arrow 148. It is to be noted that since time from the power-off of the DC motor to the actual stop of the cam tends to deviate based on the lot or the like of the apparatus, the apparatus learns a characteristics of the DC motor by rotating the cam one turn or more at a time of powering-on. With the apparatus, a timing that the apex 149 of the cam coincides the contact point of the cam sensor lever is calculated based on those data, and thereby the DC motor is turned off.

{Equalizing Plate}

Figure 12:
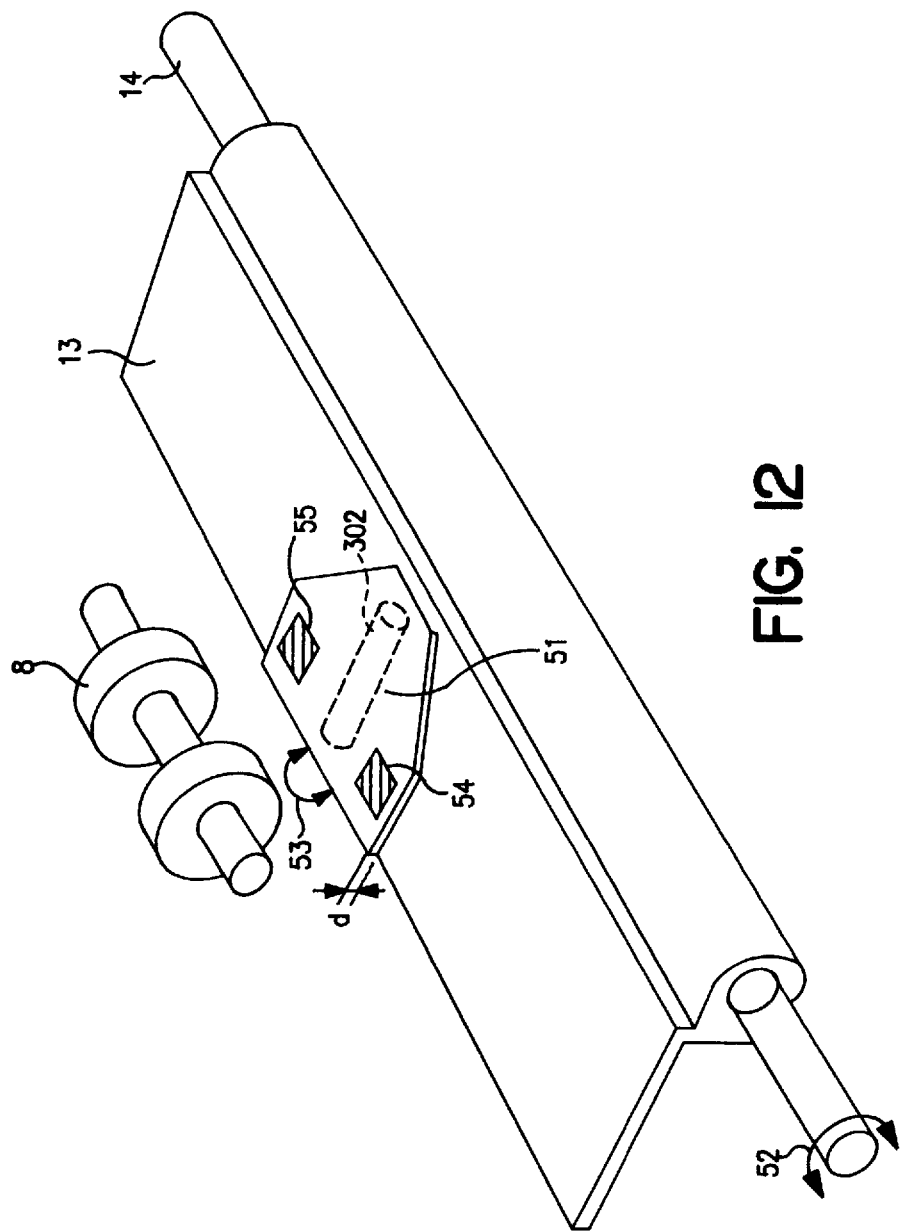
FIG. 12 is an illustration describing a mechanism of the up and down rocking tray.

The up and down rocking tray 13 rocks in a direction shown by arrow 52 in FIG. 12 around the rotational shaft 14 as a rocking center, and enables original documents to be conveyed at prescribed timing in contact with the pickup roller 8. An equalizing plate 51, serving as a supplemental setting member, is attached as shown in FIG. 12 to the up and down rocking tray 13 serving as a main setting member. The equalizing plate 51 is so attached to be capable of rocking in a direction of arrow 53 around a rocking center axis 302 formed on the up and down rocking tray 13 to exert force equally on contact portions 54, 55 for contacting with the pickup roller 8.

To ensure the operation of the equalizing plate 51, a predetermined gap d is formed between the up and down rocking tray 13 and the equalizing plate 51, and a flat surface for setting original documents of the equalizing plate 51 comes closer to the pickup roller 8. It is to be noted that in this embodiment, the gap d is set at about 1 millimeter.

Figure 13:
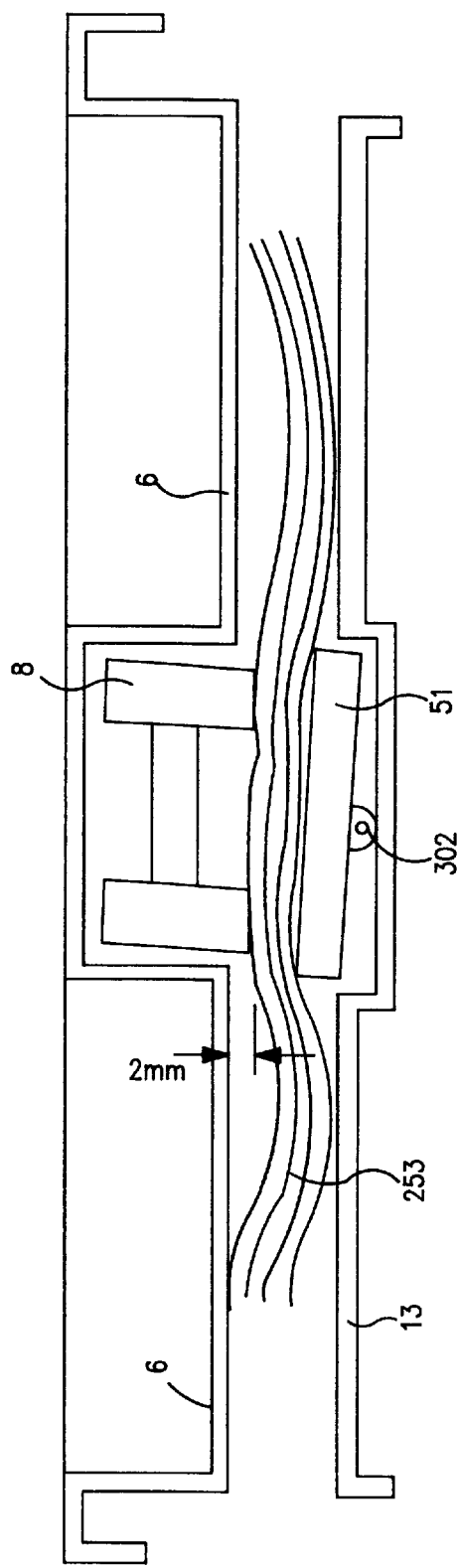
FIG. 13 is an illustration of an original document pushed state by an equalizing plate.

The reason that the gap d is formed is that original documents, when curled, should be fed after curling is corrected by sandwiching the curled original documents between the upper openable guide 6 and the up and down rocking tray 13, as shown in FIG. 13. However, when the original documents are curled largely, an upper curled portion may touch the upper openable guide 6 earlier than the pickup roller 8, so that pressure to the upper openable guide roller 8, the larger than pressure to the pickup roller 8, thereby making the pressure to the pickup roller 8 inadequate, and thereby causing a problem that the original documents cannot be fed.

To avoid this problem, in this embodiment, the equalizing plate 51 facing to the pickup roller 8 is disposed at a higher position (or a closer position to the pickup roller 8) by about 1 millimeter than the position of the up and down rocking tray 13 as described above. If the gap d is too small, no effect can be obtained. If the gap d is too large, less curling correction effect can be obtained. Accordingly, as in this embodiment, when the thickness of the pile of the original document is assumed at around 13 millimeters, it would be optimum that the gap d is set at 0.5 to 3 millimeters. If the gap d is set at 5 millimeters or more, the apparatus cannot obtain the correction effect forming the documents in a flat shape by sandwiching the curled documents before the documents are fed. Also, if the gap d is so set, a permissible thickness of the pile of documents would be reduced by 5 millimeters or more, the apparatus may not satisfy its specification of the maximum number of documents to be loaded. Moreover, in this embodiment, a distance between a lower end of the pickup roller 8 and the top face of the up and down rocking tray 13 is set at 6 to 20 millimeters.

Figure 14:
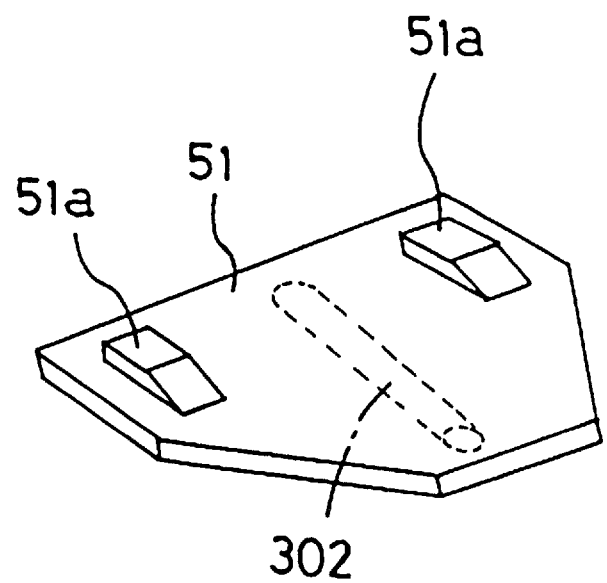
FIG. 14 is a perspective illustration showing another embodiment of the equalizing plate.

FIG. 13 shows the constitution described above. Original documents 253 curled upward are corrected by being sandwiched between the upper openable guide 6 and the up and down rocking tray 13. Since the equalizing plate 51 is located at the higher position than the up and down rocking tray, the original documents 253 are surely pushed toward the pickup roller 8. Since the width of the equalizing plate in the widthwise direction is substantially the same as the width of the pickup roller 8, even if the equalizing plate 51 is inclined as shown in FIG. 13 around the rocking center axis 302, the ends in the widthwise direction do not move so much in the up and down direction, and therefore, a gap between the bottom of the pickup roller 8 and the upper openable guide, though small, is operational. It is to be noted that in this embodiment, as shown in FIG. 13, the gap is about 2 millimeters. Moreover, the equalizing plate 51 allows pressure on the pickup roller 8 to be balanced, thereby preventing the original documents form being obliquely conveyed. Although in this embodiment, as described above, the equalizing plate 51 is attached at a height having the gap d from the surface of the up and down rocking tray 13, substantially the same effects can be obtained even where the equalizing plate 51 is constituted in a manner shown in FIG. 14 and where the plate 51 is so attached that the height of the original document setting surface of the plate 51 is substantially the same as the height of the original document setting surface of the up and down rocking tray 13. The equalizing plate 51 shown in FIG. 14 has projections 51a only at portions corresponding to the pickup roller 8 to push the original documents, and the projections 51a are constituted to have a height corresponding to the gap d with respect to the surface of the plate 51. Moreover, the pushing projection 51a has a gradual raiser portion on an upstream side in the document feeding direction, so that the original documents can be guided smoothly. Even with this constitution, since the projections 51 a operate as well as the gap d in this embodiment, substantially the same effects as that of the equalizing plate 51 in this embodiment can be obtained.

{Feed Roller and Retard Roller}

The feed roller 9 and the retard roller 10 constitute separate feeding means for feeding documents in separating one by one the documents fed by the pickup roller 8. The feed roller 9, as shown in FIG. 1, is directly driven as to rotate in a document feeding direction at a time for feeding documents by means of a pulley secured on the rocking center shaft 7 of the upper openable guide 6 through a belt 42. Drive power transmitted to the feed roller 9 is then transmitted to the pickup roller 8 through a belt 43 to rotate the roller 8.

The retard roller 10 constitutes a separating member to push the original documents to the feed roller 9 as well as to rotate as to feed the original documents in the reverse direction to the feeding direction when the original documents are fed. Both ends of the retard roller 10 are supported to be movable in a direction to push toward the feed roller 9 by two supporting levers 16 for retard roller, and the retard roller 10 is pressed to the feed roller with a predetermined pressure by a spring 19.

Figure 15:
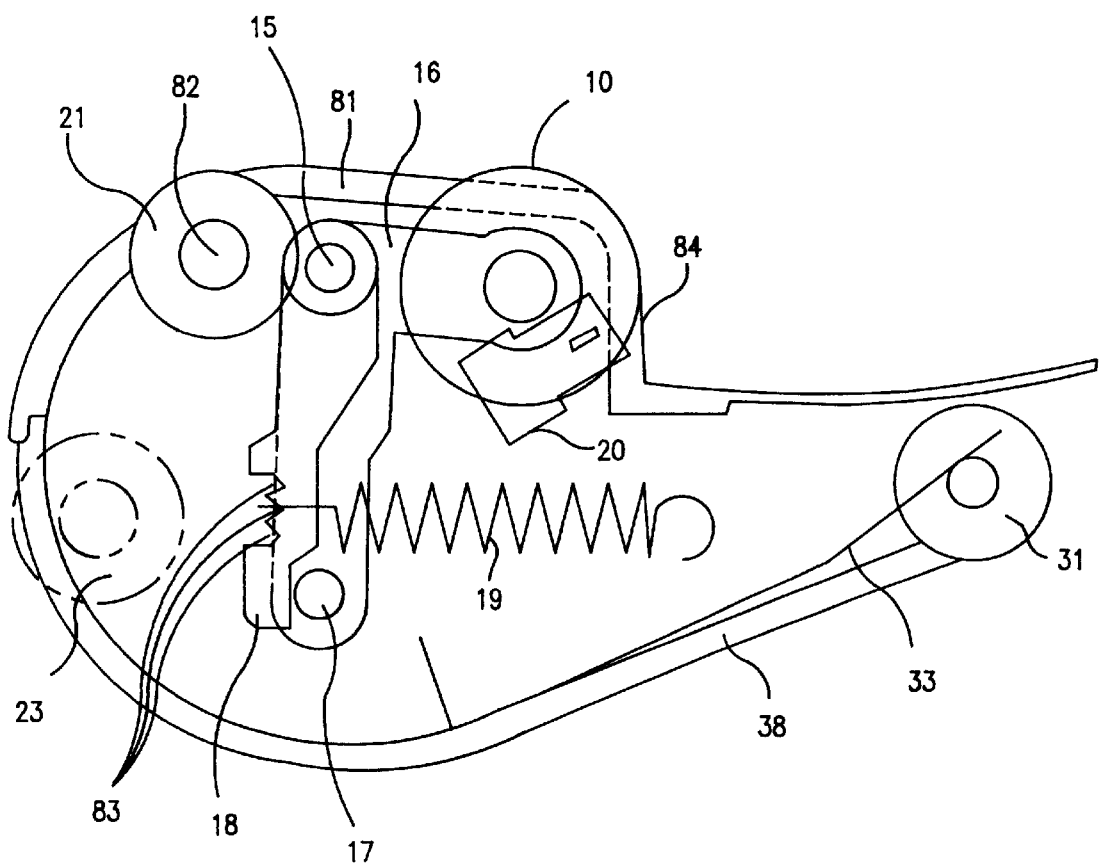
FIG. 15 is a detailed cross section around a lower guide.
Figure 16:
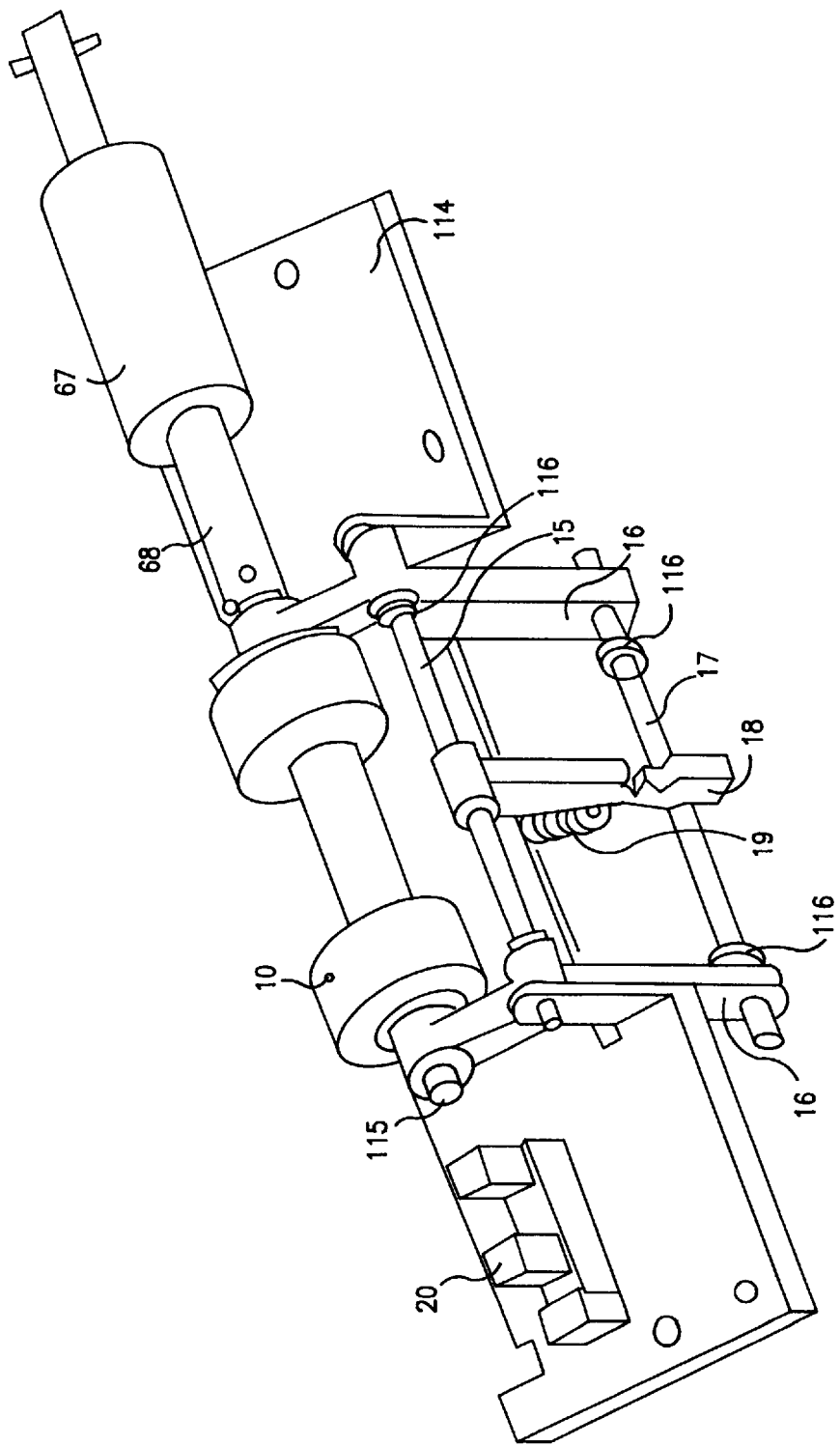
FIG. 16 is a perspective view showing a retard roller supporting member when assembled.

The supporting lever 16 for retard roller is, as shown in FIGS. 15, 16, in a L-shape, rotatably supported around a shaft 15 as a center which is secured to an apparatus body frame at the folded portion thereof, supporting at one end the retard roller 10 to be rotatable, and attaching a shaft 17 for linking the two supporting levers 16 for retard roller at the other end. The shaft 17 is pushed by a pushing lever 18 around a center portion in a longitudinal direction. The pushing lever 18 is supported pivotably around the shaft 15 as the center, and a pulling spring 19 engages at a lever's pivoting side to pull the lever 18 in a right direction in FIG. 15. The retard roller 10 is pressed by this spring 19, on the feed roller 9. It is to be noted that the pushing lever 18 has three notches 83 to engage the spring 19, and the pressure of the retard roller 10 to the feed roller 9 can be controlled by changing the position to which the spring 19 engages.

Figure 17:
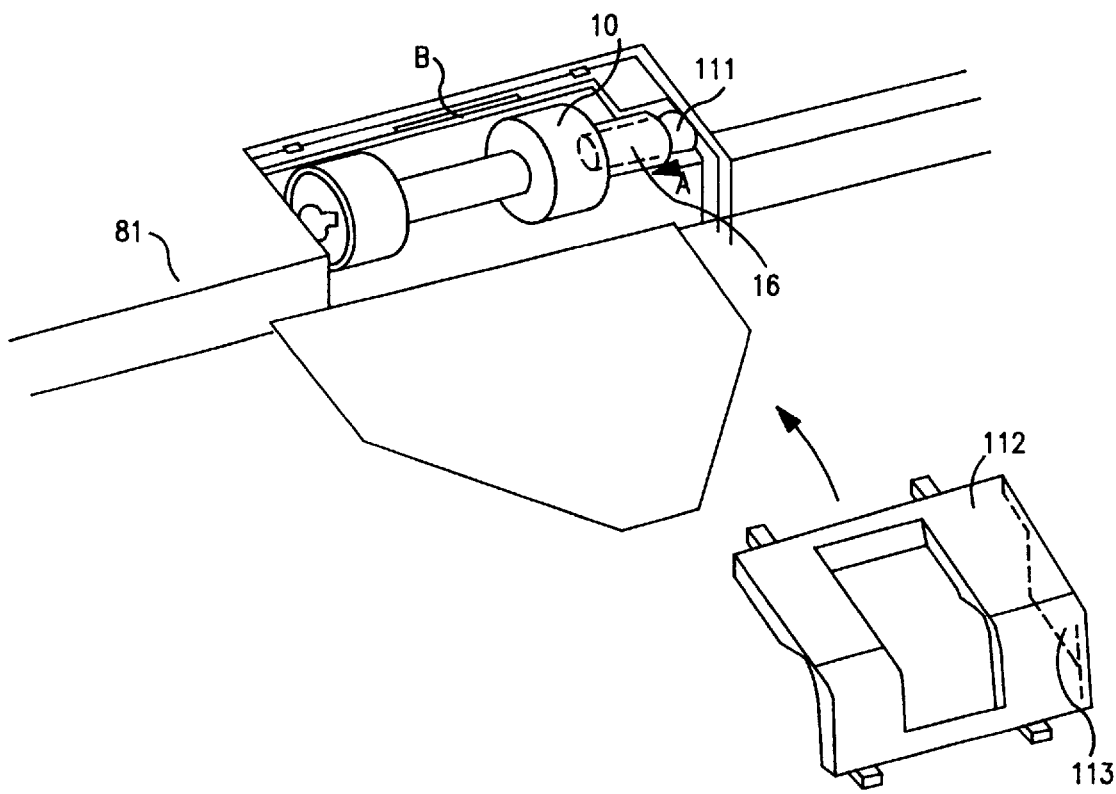
FIG. 17 is a perspective view around a detachable retard roller.

The retard roller 10 is movable in a thrust direction as shown in FIG. 17 and is rotatably supported by a shaft 111 urged in a direction of arrow A in FIG. 17. A retard roller cover 112 is attached to an upper portion of the retard roller 10. The retard roller cover 112 is detachably attached to a lower guide 81 for guiding the lower face of the documents, regulates the movement of the shaft in the thrust direction by a wall 113 when incorporated in the lower guide 81, and ensures holding operation of the retard roller 10 to prevent the retard roller 10 from dropping out even if vibrations or impacts are given. The retard roller 10 is replaceable by detaching the retard roller cover 112.

{Pull-up Roller and Feed Roller}

An original document separated to be a sheet by the feed roller 9 and the retard roller 10 is conveyed in being nipped by the pull-up roller 21 and an idle roller 22 which is made in pressure contact with the roller 21 by a leaf spring 11 attached to the upper openable guide 6.

In this embodiment, as shown in FIG. 1, a distance from a separating nip position between the feed roller 9 and the retard roller 10 to the contacting position between the pull-up roller 21 and the idle roller 22 is shortened, and the length of the side regulating guide 4 is set three times or more longer than the distance above. This design allows the original documents to be nipped by the pull-up roller 21 and the idle roller 22 before the original documents proceed obliquely, there by preventing the original document from being fed obliquely without providing a special register roller pair as in a conventional apparatus. This mechanism does not need any register loop as provided for an antiobliquely-feeding device by such a register roller pair, so that the apparatus can take a very thick paper such a business card or the like, which has a short paper span and is unable to form any register loop. An original document with its paper end not straight, e.g., original documents whose front end is torn, can be fed without being obliquely carried.

The original document fed by the pull-up roller 21 is fed to the original document reading section by the document feed roller 23 located on a further downstream side of the roller 21 and by an idle roller 24 urged to the roller 23 by a spring 25. The spring 25 is pivotably supported as shown in FIG. 1 at a supporting point 27 of the frame and is bent by the projection 26 located at the tip of the upper openable guide 6 from a broken line position to a solid line position in FIG. 1 to urge the idle roller 24 toward the direction of the document feed roller 23. Therefore, when the original document is jammed, the upper openable guide 6 is opened upwardly to release the guide, and thereby the spring 25 is moved to the broken line position. The idle roller 24 loses its pushing force by that motion of the spring 15, thereby allowing the jammed paper to be removed easily.

{Intervals of the Feed Roller, the Pull-up Roller, etc.}

Figure 18:
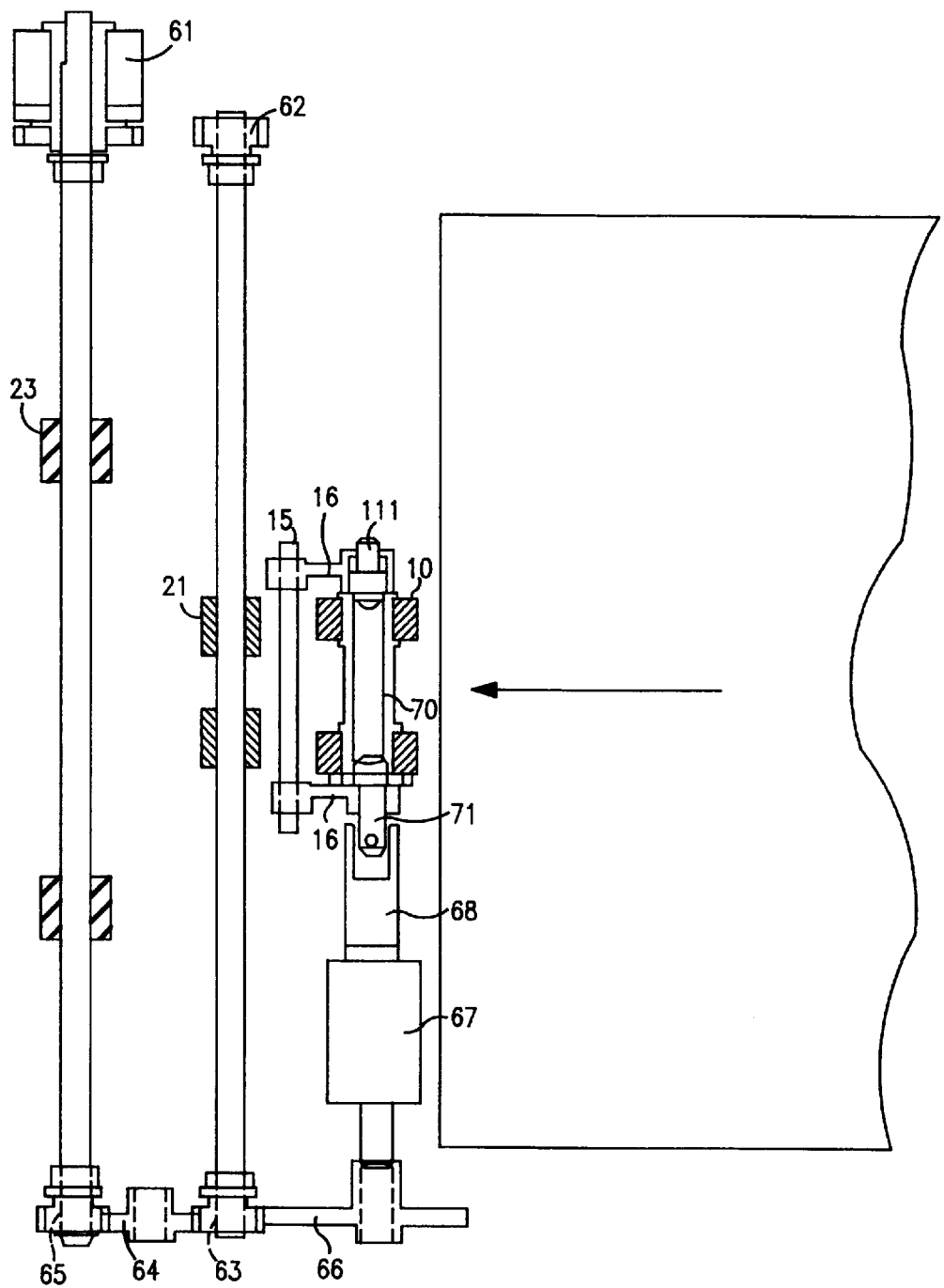
FIG. 18 is a view extended along a feeding path.
Figure 19:
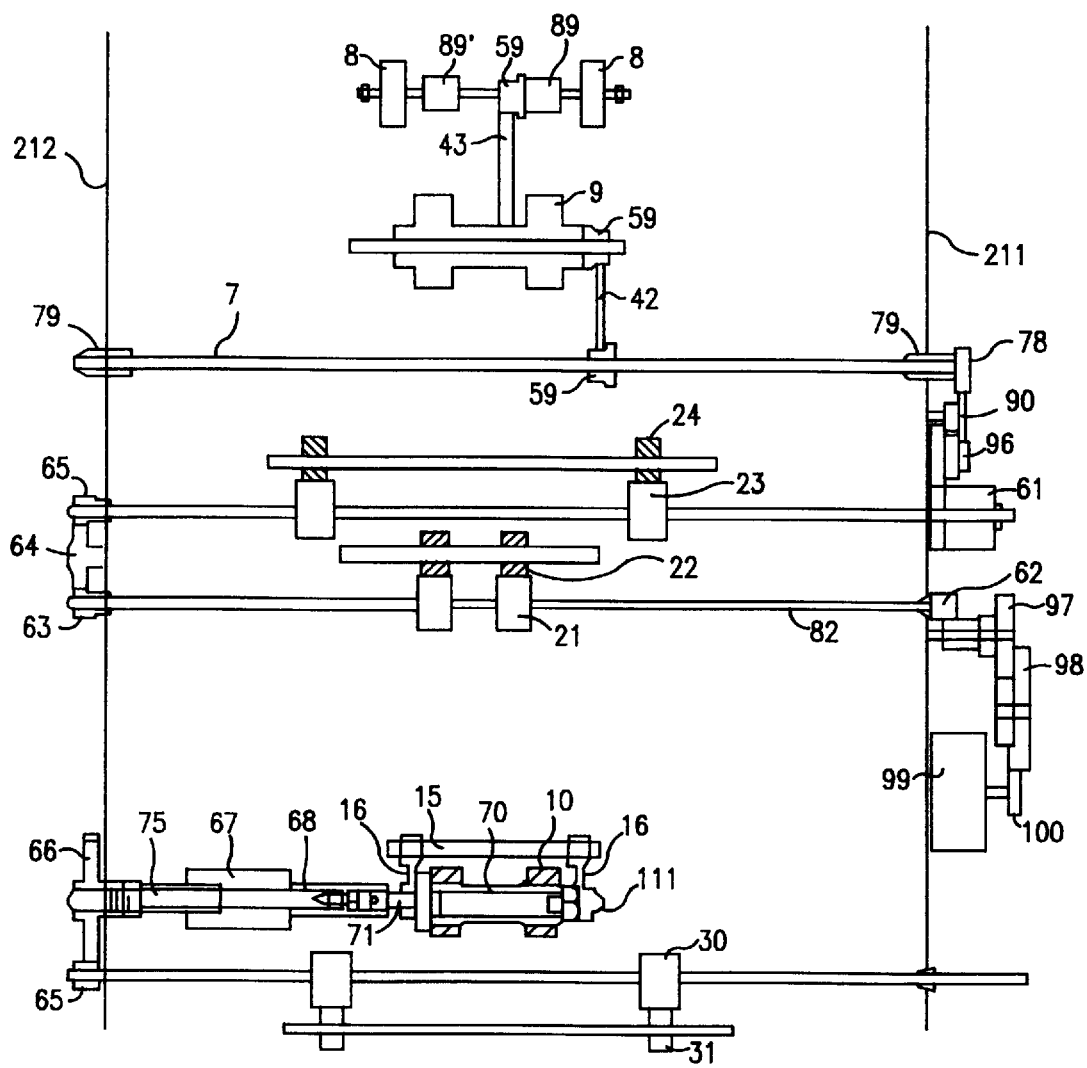
FIG. 19 is an extended view showing respective rollers of the original document feeding apparatus extended along the feeding path.

FIGS. 18, 19 are diagrams showing rollers as extended along the feeding route. In FIG. 19, the pull-up roller 21 and the feed roller 22 are placed in the opposite way when seen in the original document feeding direction. As shown in FIGS. 18, 19, the feed roller 9, the retard roller 10, the pull-up roller 21, and the document feed roller 23 constitute respective roller pairs juxtaposed in the widthwise direction of the original document, and in view of relation of the respective roller pairs in the widthwise direction of the original document, it is constituted that a distance between the two rollers of the pull-up roller 21 is smaller than a distance between the two rollers of the feed roller 9, and that a distance between the two rollers of the document feed roller 23 is larger than a distance between the two rollers of the pull-up roller 21. It is to be noted that a distance between the two rollers of the retard roller 10 is the same as a distance between the two rollers of the feed roller 9.

If the two rollers of the pull-up roller 21 is arranged in a broader width than that the two rollers of the feed roller 9, the apparatus may fall in a toe-in conveyance state, and if a thin original document of around 40 $g/m^2$ is conveyed, a problem may occur in which the front end of the original document may be corrugated. As the worst case, blocking of paper, or paper jam, may occur due to the corrugation formed right after the feed roller 9. This happens due to that the original document receives a constant braking force since the retard roller 10 facing the feed roller 9 is always urged with a predetermined torque in a direction to push back the original document. When the width between the two rollers of the pull-up roller 21 located on the downstream side of the separating nip position between the feed roller 9 and the retard roller 10 is broader than the width at the separating nip position, braking force may be exerted to the center in the original document feeding direction and conveyance force operates both sides in the feeding direction. That is, since the vector of the braking force and the vector of the conveyance force are not on a line, force other than pulling force may occur inside the original document. Specifically, contracting force exerts to the front end of the original document. This is called as the toe-in conveyance state. Although such a problem may rarely occur when the original document has a thick thickness, when flimsy, likewise a thermal paper for facsimile or a thin paper, the original document may not endure the contracting force at the front end, so that the corrugation may occur while the document is curved or bent.

To avoid the corrugation or the like, an applicable range of the conveyance force has to be narrower than that of the braking force. By doing so, not contacting force but pulling force operates at the front end, and therefore, even thin paper may not be bent. This is because original documents made of paper or plastic sheets are endurable against pulling force rather than against contracting force. This situation is called as a toe-out conveyance state.

However, if the width of the two rollers of the document feed roller 23 is set the same as the narrow width of the two rollers of the pull-up roller 21, the original document tends to be carried obliquely and to raise a problem. This is because, with rollers arranged within a narrow width, a little difference between left and right conveyance speeds might turn out a large oblique conveyance. To avoid this problem, in this embodiment, a width of the two rollers of the document feed roller 23 is set broader than a width of the two rollers of the pull-up roller 21. The apparatus thus can convey documents, even if thin, without bending them and without obliquely carrying them, by constituting the widths of the feed roller 9, the pull-up roller 21, and feed roller 23 as described above.

{Drive transmission}

Figure 20:
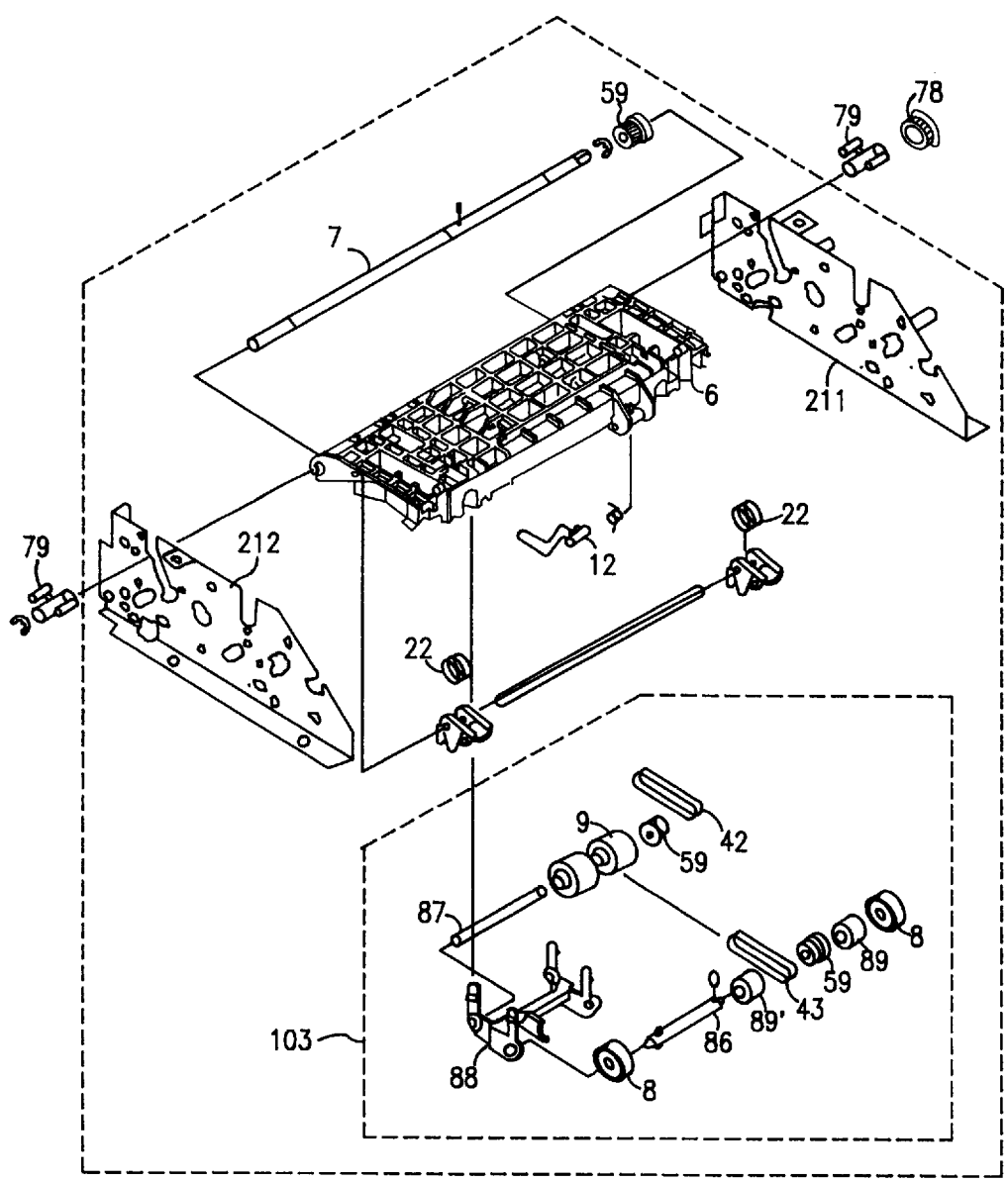
FIG. 20 is a layout of parts attached to an upper openable guide of the original document feeding apparatus.

Referring to FIGS. 18 to 20, a constitution of the drive transmission to the retard roller 10, the feed roller 9, the pickup roller 8, and the like is described. FIG. 20 is a perspective view showing parts of a unit for the upper openable guide 6.

As shown in FIGS. 18, 19, gears in series are engaged in an order of a shaft gear 100 attached to a step motor 99 serving as a drive motor, idler gears 98, 97, and a gear 62 attached to an one end of a shaft 82 of the pull-up roller 21. Other gears in series are engaged in an order of a gear 63 attached to the other end of the shaft 82, an idler gear 64, and a gear 65 attached to a one end of a shaft of the document feed roller 23. The gear 63 engages a gear 66 coupled to a torque limiter 67 (See, FIG. 18).

An electromagnetic clutch 61 is attached to the other end of the shaft of the document feed roller 23, and according to on and off states of the clutch 61, the rocking center shaft 7 of the upper openable guide shown in FIG. 1 is selectively driven. That is, the gears in series are engaged in an order of the gear of the electromagnetic clutch 61, idler gears 96, 91, and a gear 78 attached to one end of the center shaft 7. When the electromagnetic clutch 61 is turned on, the drive power is transmitted to the gear 96, and when the clutch is turned off, the drive power is not transmitted to the gear 96.

Belt pulleys 59 are attached on the center shaft 7 and the shafts of the freed roller 9 and the pickup roller 8, and belts 42, 43 are wound around those belt pulleys. The retard roller 10 is supported by a retard roller core 70, and a shaft 71 supporting the roller core 70 is coupled to a pipe member 68 by way of a universal joint mechanism. The pipe member 68 is coupled to the torque limiter 67. The torque limiter 67 always receives drive force in a direction of pushing the original document back, as opposed to the direction of feeding the original document, by the gear 66. Therefore, if a torque equal to or greater than the constant rotary torque is exerted to the retard roller 10 in the reverse direction to the rotary direction, transmission of drive force to the retard roller 10 is cut off.

If the step motor 99 is drive, the drive power is transmitted in an order of the gear 100, the idler gear 98, the idler gear 97, the gear 62, the gear 63, the gear 66 (see, FIG. 18), the torque limiter 67, and the retard roller core 70, a constant rotary torque (e.g., 300 g.cm in this embodiment) is transmitted to the retard roller 10. The rotary direction (a direction of the predetermined torque exerted) transmitted to the retard roller 10 is the direction pushing the original documents back to the feeding tray 3 notwithstanding on or off state of the electromagnetic clutch 61.

The drive power of the step motor 99 is then transmitted to the feed roller 9, by way of the gear 100, the gear 98, the gear 97, the gear 62, the shaft 82, the gear 63, the idler gear 64, the gear 65, the shaft of the document feed roller 23, and the electromagnetic clutch 61. When the electromagnetic clutch 61 is powered on, its drive power is transmitted to the feed roller 9 through the gear 96, the idler gear 90, the gear 78, the rocking center shaft 7, the belt pulley 59 attached to the shaft 7, the belt 42, and the belt pulley 59 attached to the shaft of the feed roller 9. The rotary direction of the feed roller 9 at that time is a direction carrying the original documents to a downstream side of feeding. On the other hand, if the electromagnetic clutch 61 is powered off, the feed roller 9 enters a free state. If the step motor 99 is in a drive state at that time, the retard roller 10 in pressure contact with the feed roller 9 is driven in the reverse direction with respect to the feeding direction of the documents as described above, so that the feed roller 9 in the free state follows the rotation of the retard roller 10 to rotate. That is, the feed roller 9 rotates in the feeding direction of the documents when the electromagnetic clutch 61 is powered on, and the roller 9 rotates in following the retard roller 10 in the direction pushing the documents back toward the feeding tray 3 when the electromagnetic clutch 61 is turned off.

Regarding the drive force to the pickup roller 8, the drive force transmitted to the feed roller 9 is transmitted to the pickup roller 8, by the belt 43, the belt pulley 59, a one-way clutch 89, and a pickup roller shaft 86. The one-way clutch 89 transmits the drive power in locking to the pickup roller shaft 86 when the feed roller 9 rotates in the feeding direction, and the clutch 89 does not transmit the drive power to the pickup roller shaft 86 as entering in the free state when the feed roller 9 rotates in the reverse direction to the feeding direction.

The feed roller 9 changes its rotary direction according to the on and off states of the electromagnetic clutch 61 as described above. Accordingly, when the electromagnetic clutch 61 is turned on (or when the feed roller 9 rotates in the feeding direction), the one-way clutch 89 is locked to rotate the pickup roller 8 in the same direction as the direction of the feed roller (feeding direction), thereby feeding the original documents. At that time, the up and down rocking tray 13 shown in FIG. 1 operates in association with those. That is, the up and down rocking tray 13 moves up prior to a powering on of the electromagnetic clutch 61, and the up and down rocking tray 13 moves down prior to a powering off of the electromagnetic clutch 61. When the electromagnetic clutch 61 is turned off (or when the feed roller 9 rotates in the reverse direction to the feeding direction), the one-way clutch 89 enters the free state, the drive force is not transmitted to the pickup roller 8. Therefore, the pickup roller 8 remains stopping.

If the pickup roller 8 rotates in the reverse direction to the feeding direction by a free torque of the one-way clutch 89 when the feed roller 9 rotates in the reverse direction to the feeding direction, the original document is conveyed in an upstream direction over a contact point between the original document and the pickup roller 8, thereby disabling feeding of documents. To prevent this problem, in this embodiment, another one-way clutch 89' is provided as a one-way brake to prevent the pickup roller 8 from rotating in the reverse direction to the feeding direction. By the one-way clutch 89', the pickup roller 8 is either rotating in the feeding direction or stopping notwithstanding the rotary direction of the feed roller 9.

To prevent the original documents from being fed doubly when the documents are fed in utilizing such a constitution, the control means performs the following sequence in this embodiment. When a user first sets original documents on the feeding tray 3, the original documents may be pushed too much to be inserted into the separating nip between the feed roller 9 and the retard roller 10. If feeding of documents is started with this situation, the apparatus may fail to separate the documents and doubly feed them, and in some cases, the documents are jammed. In this apparatus, when a user sets original documents and starts feeding the documents, the step motor 99 is driven as the electromagnetic clutch 61 is turned off, prior to the feeding; the feed roller 9 and the retard roller 10 are rotated in the reverse direction to the feeding direction, thereby controlling to discharge a pile of the original documents pushed into the separating nip to the feeding tray 3 once to return to an initial situation. Thus, the apparatus can prevent the document from being doubly fed or jammed by discharging the documents at the separating nip.

It is to be noted that to make the documents discharged easily onto the original document feeding tray 3, the up and down rocking tray 13 is forced to rock several times in association with this operation. By this rocking motion, the original documents are shaken and can be easily returned. By implementing such a discharging operation of the documents at every feeding of the documents, the apparatus can prevent the documents from being doubly fed or jammed due to an insertion of a large amount of the documents into the separating nip.

{Replacement of the Pickup Roller and Feed Roller}

Figure 21:
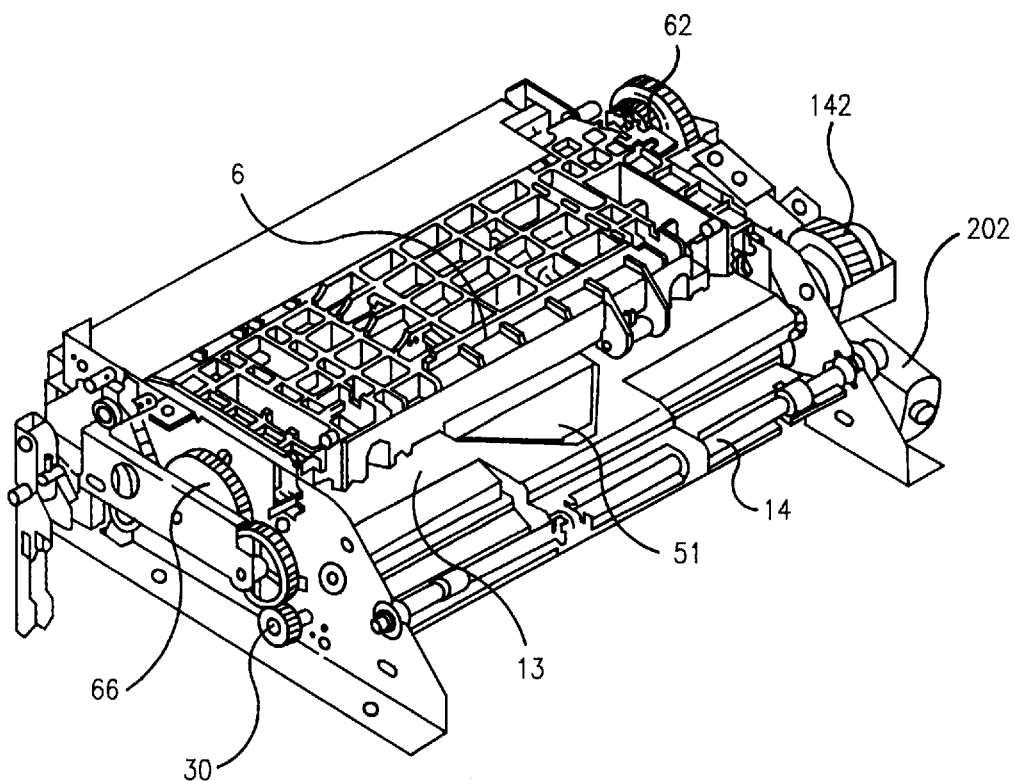
FIG. 21 is a perspective view for illustrating constitution of an openable guide unit including the upper openable guide of the original document feeding apparatus.

Now, a replacement constitution of the pickup roller 8 and the feed roller 9 is described. FIGS. 20, 21 are perspective views showing constitution of an openable guide unit including the upper openable guide 6 of the original document feeding apparatus. As shown in FIG. 20, the rocking center shaft 7 of the upper openable guide 6 is attached to left and right frames 211, 212 of the original document feeding apparatus 1 by bearings 79.

Figure 22:
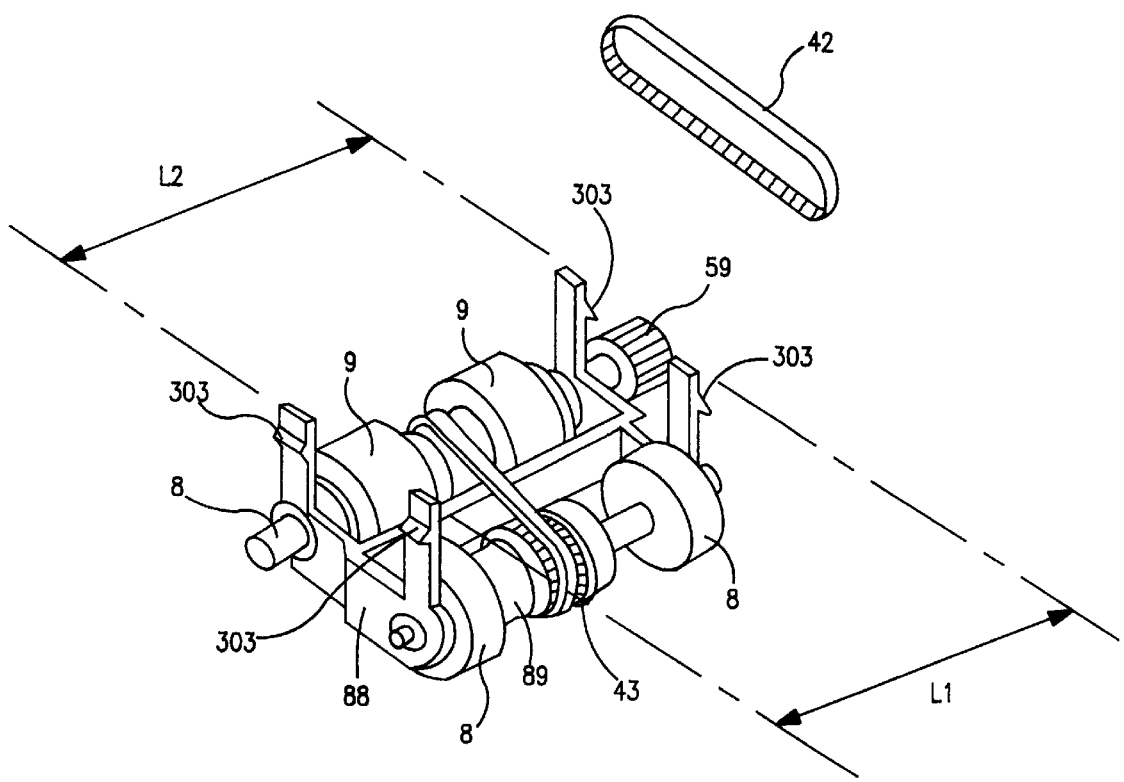
FIG. 22 is an illustration of attaching and detaching of pickup and feed rollers.

The bearings 79 also pivotably support the upper openable guide 6. As shown in FIGS. 20, 22, a roller unit bearing member 88 is attached in a snap-on manner to the upper openable guide 6, for holding the feed roller and the pickup roller 8. The roller unit bearing 88 is assembled with a feed roller shaft 87, the feed roller 9, the belt pulley 59, the belt 42, the one-way clutch 89, and the pickup roller 8 to constitute a roller unit 103. The roller unit bearing member 88 is formed with four engaging tongues 303 as shown in FIG. 22, and four engaging holes, not shown, capable of engaging the respective tongues 303 are formed on the upper openable guide 6 as an attachment for attaching the bearing member 88. By this constitution, when the apparatus is disassembled to replace the feed roller 9 and the pickup roller 8, the apparatus can be disassembled by disengaging the engaging tongues 303 of the unit bearing member 88, and when assembled, the apparatus can be very easily assembled since the member can be secured in the snap-on manner only by fitting the engaging tongues 303 into the engaging holes of the upper openable guide 6.

With this roller unit 103, the belt pulley 59 is preferably attached in a cantilever or overhung manner at an end of the feed roller shaft 87 outside the roller unit bearing member 88. With this mechanism, when the engaging tongues 303 are disengaged, the roller unit 103 can be taken out as a situation shown in FIG. 22 since the belt 42 can be taken easily. Accordingly, a replacement work of the pickup roller 8 and the feed roller 9 can be done on another desk, so that efficiency of the replacement work is significantly improved. It is to be noted that although the belt pulley 59 may be formed inside the roller unit bearing member 88, the belt pulley 59 is preferably formed outside the roller unit bearing member as described above, because the feed roller shaft 87 is needed to be perfectly pulled out when the belt 42 is disassembled.

In general, a rubber material such as the feed roller 9 and the pickup roller 8, etc. tends to be consumed earlier than other parts due to its weak durability, and makes a part for replacements. Therefore, it would be great advantage that the apparatus can be assembled and disassembled thus easily.

Figure 23:
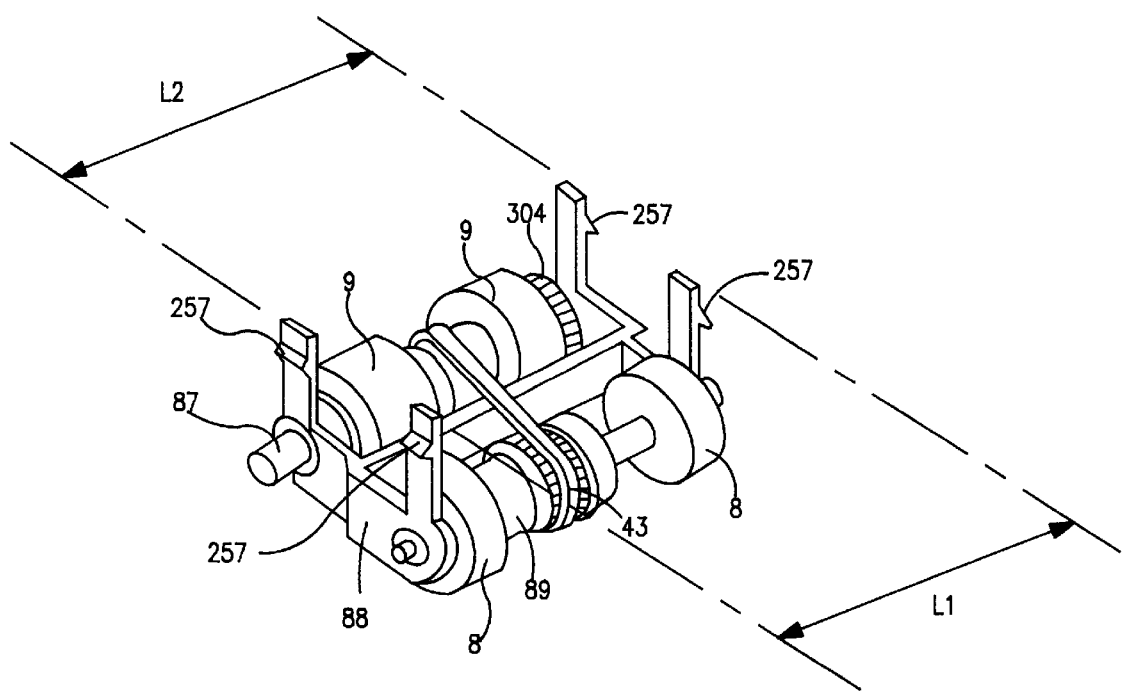
FIG. 23 is an illustration of attaching and detaching of pickup and feed rollers and also an illustration of an embodiment in which drive power transmission to the feed roller is done by gears.

In this embodiment, to prevent the roller unit bearing member 88 from being assembled in the opposite way when attached and assembled, as shown in FIG. 22, the apparatus is so constituted that a length LI between the engaging tongues 303 on a side of the pickup roller 8 and a length L2 between the engaging tongues 303 on a side of the feed roller 9 are different from one another (L1≠L2) to form the roller unit bearing member 88 in an asymmetric shape. By this asymmetric shape, the engaging tongues 303 meet the engaging holes formed on the upper openable guide 6 only when the bearing member 88 is in a legitimate attaching situation. It is to be noted that with this embodiment, although the drive power is transmitted in use of the belt 42 to the feed roller 9 and the like, the drive power may be transmitted by gear series that a gear 304 is in engagement with a drive line, where the gear 304 is attached to an end of the feed roller shaft 87 as shown in FIG. 23. With this mechanism, engaging and disengaging the belt 42 may become unnecessary when the roller unit 103 is attached or detached, so that the pickup roller 8 and the feed roller 9 can be assembled and disassembled more easily.

{Gear Constitution}

Figure 24:
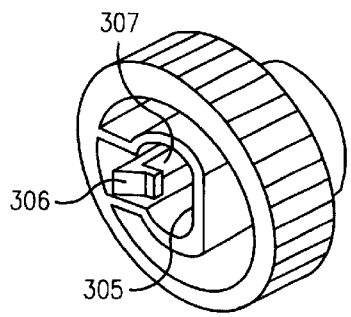
FIG. 24 is a perspective illustration of a drive transmission gear.
Figure 25:
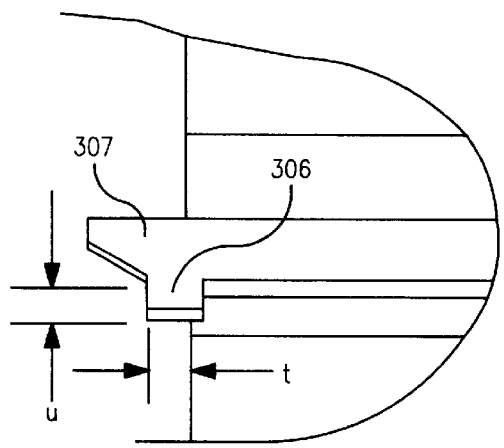
FIG. 25 is an illustration of an engaging portion of the gear.
Figure 26:
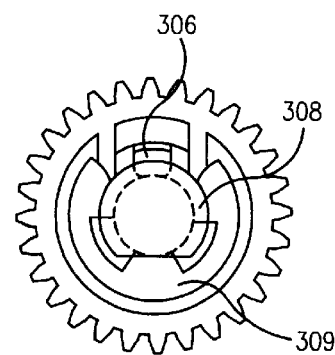
FIG. 26 is a cross-sectional illustration showing a gear when the gear is engaged with a gear shaft.

The apparatus of this embodiment is constituted so that gears for transmitting drive power can be easily attached. Referring to FIGS. 24 to 26, its constitution is described. The gears shown in FIGS. 24 to 26 represent structures of the gears 62, 63, 65 and the like described above, and an inner diameter engaging a shaft as a rotation stopper of the shaft in the rotational direction is in a D-type shape 305. The gear has an engaging arm 397 having a tongue 306 at a tip of the arm as a stopper against pulling out of the gear in a thrust direction.

FIG. 25 is a cross section of the engaging arm 307 of the gear. The tongue 306 having a length u and thickness t is capable of engaging a groove to which an E-ring is attachable. FIG. 26 is an illustration of a situation that the gear is attached on the shaft when seen in the thrust direction; a groove 30 to which the tongue 306 is capable of engaging is formed on a gear shaft to attaching the gears cut in a D-shape. If the shaft is inserted into the gear, the gear cannot be pulled away by engagement of the tongue 306 to the groove 308 in association with elasticity of the engaging arm 307. Therefore, by insertion of the shaft into the gear, the shaft can be attached easily.

When an E-ring has to be used due to weakness of the engagement of the gear, as shown in FIG. 26, the E-ring 309 can be fitted into the groove 308. By this E-ring, the gear can be easily attached. The E-ring 309 thus can be attached to the same groove as the groove 308 to which the tongue 306 is engaged by fitting the E-ring 309 from the opposite side to the side where the tongue 306 is engaged to avoid an interference with the tongue 306. It is unnecessary to newly form a special groove for the E-ring when the E-ring is attached, so that the shaft can be shortened in comparison with the case where a special groove for E-ring is formed, and as a result, the apparatus can be made compact. It is to be noted that this gear structure can apply to all gears constituting the gear series, but it is also effective when any one of these gears uses the gear structure.

{Universal Joint Constitution}

A universal joint mechanism for connecting the torque limiter 67 for transmitting a predetermined torque with the retard roller 10 is described.

Figure 27:
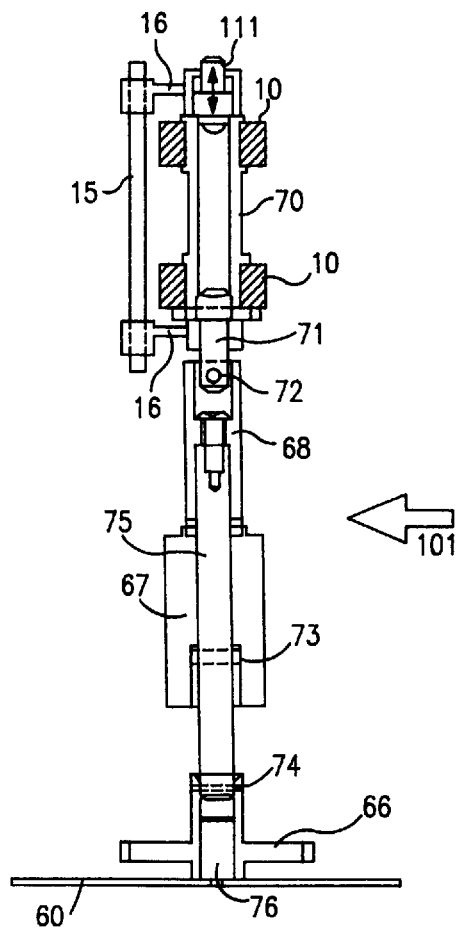
FIG. 27 is a view around the retard roller when seen from its top.

FIG. 27 is a view showing the retard roller 10 and its vicinity when seen from the top thereof The gear 66 is rotatably supported on a cantilever securing shaft 76 secured to a gear support plate 60 secured to the apparatus frame. The gear 66, as described above, is rotated by the step motor 99. The gear 66 and the shaft 71 of the retard roller 10 are connected by a universal joint. It is to be noted that in this embodiment a first universal joint mechanism is formed by engagement of a long hole formed in the gear 66 with a pin 74 formed at an intermediate shaft 75.

On the other hand, the retard roller 10 is secure to the retard roller core 70, and the retard roller core 70 is supported as to be capable of equalizing by the supporting lever 16 rocking around the shaft 15 secured to a frame (retard roller bracket) 114 (see, FIG. 32) of the original document feeding apparatus 1. A pin 72 is secured to the shaft 71, and the pin 72 forms a second universal joint mechanism in engaging with a long hole in a pipe member 68 attached to the intermediate shaft 75. The intermediate shaft 75 is fixedly coupled to a drive input end of the torque limiter 67 by a pin 73, and a projection of an output end of the torque limiter 67 engages the pipe member 68. By this constitution, the torque transmitted to the torque limiter 67 is transmitter to the retard roller 10 by way of the pipe member 68. As described above, the drive torque transmitted to the gear 66 is transmitted to the retard roller 10 by the intermediate shaft 75, the torque limiter 67, and the pipe member 68.

Figure 28:
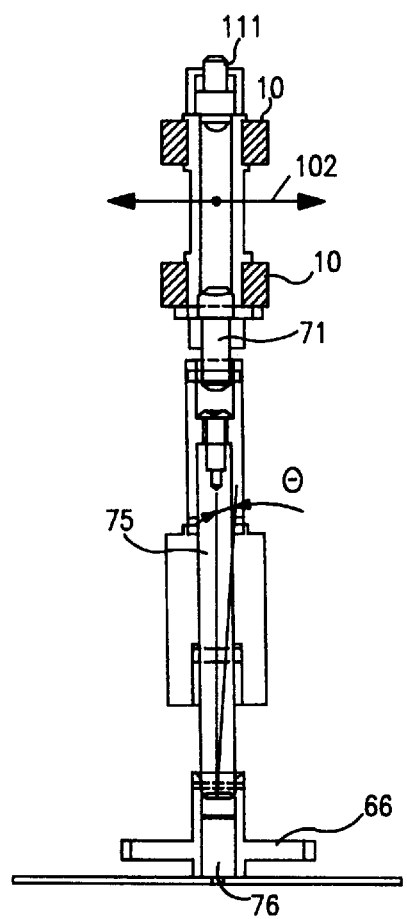
FIG. 28 is a view around the retard roller when seen in a direction of an arrow 1 10 in FIG. 27.

FIG. 28 is a view of the retard roller 10 and its vicinity when seen in a direction of an arrow 101 in FIG. 27. The retard roller 10 travels in a direction of an arrow 102 in trailing the feed roller 9 substantially secured to the frame of the original document feeding apparatus 1. As shown in FIG. 28 two portions of the first and second universal joint mechanisms are folded, thereby enabling this travel.

In this embodiment, as described above, the gear 66 is held by the cantilever shaft 76, thereby enabling a distance between the outside of the gear 66 and the first universal joint mechanism to be shortened to its limitation. Such a structure can also brought by forming the torque limiter 67 to the intermediate shaft 75 for forming the universal joint and incorporating the torque limiter 67 itself into the unit of the universal joint. According to this structure, the length of the intermediate shaft 75 for forming a universal joint can be made very longer than a conventional structure, and as a result, the angle theta ($\theta$) shown in FIG. 28 can be made very small value. Therefore, the universal joint can ideally transmit only torque, thereby significantly reducing unnecessary power generation in a radial direction of the intermediate shaft 75. Moreover, the pushing force of the retard roller 10 to the feed roller 9 therefore deviate much less, thereby suppressing occurrences of eccentric worn-out phenomena in which the retard roller 10 is partly worn out. Consequently, the life of the retard roller comes longer significantly.

Figure 29:
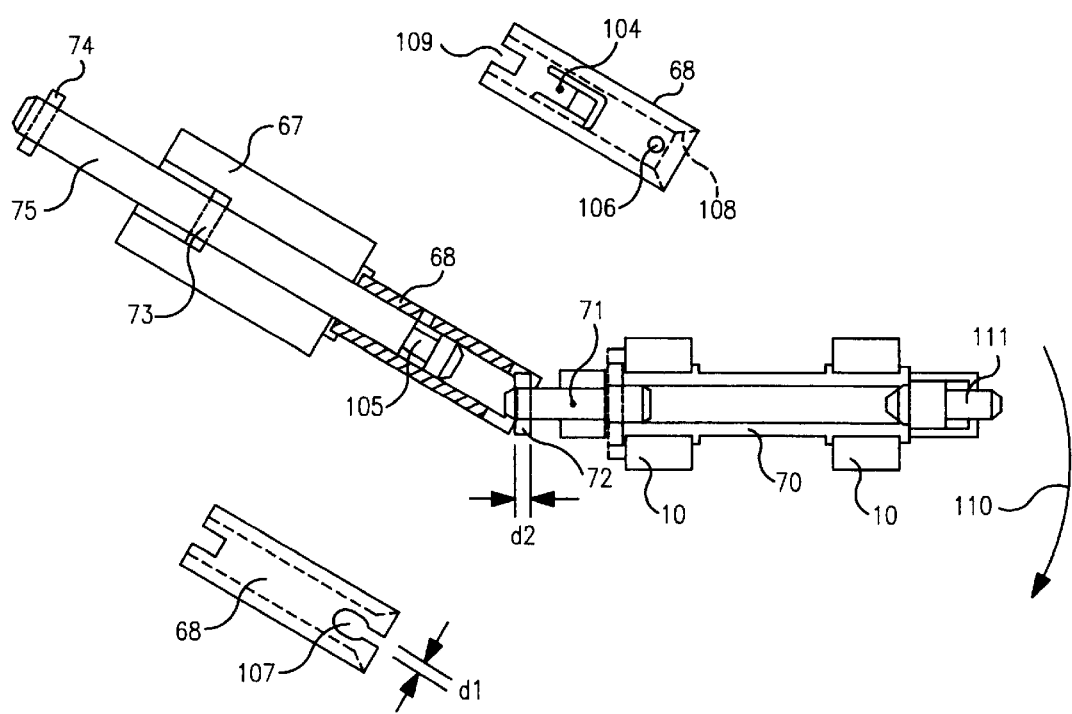
FIG. 29 is a cross section showing an assembling method of a universal joint portion for transmitting rotary drive force to the retard roller.

FIG. 29 shows an assembly structure of a universal joint transmitting a rotary drive force to the retard roller 10. In this embodiment, to improve assembling workability of the portion of the retard roller, a joint portion of the pipe member 68 of the universal joint is devised. That is, in FIG. 29, the pin 74 is formed on the shaft 75 for receiving a rotary drive force from the drive gear 66. The pin 73 is also formed on the shaft 75 for transmitting the drive power to the torque limiter 67. The output from the torque limiter 67 is transmitted to the pipe member 68 via an engaging groove 109 of the pipe member 68.

The pipe member 68 can be assembled in a snap-on manner by engaging a snap fitting lever 104 with the engaging groove 109 of the shaft 75. Accordingly, the shaft 75, the pin 74, the pin 73, the torque limiter 67, and the pipe member 68 make an incorporated unite. On the other hand, a pin 72 projected in two ways is formed on the retard roller shaft 71 and is connected to the other end of the pipe member 68. A predetermined torque outputted from the torque limiter 68 is transmitted to the retard roller 10 through the pipe member 68, the pin 72, and the retard roller shaft 71. One projection of the pin 72 engages a jointing hole 106 as a first hole formed on the pipe member 68. The other projection of the pin 72 engages a jointing long hole 107 as a second hole formed on the pipe member 68. A chamfered portion 108 is formed inside the pipe member 68 to form the universal joint. The jointing long hole 107 is opened as a groove having a width d1 up to the edge of the pipe member 68. A diameter of the pin 72 is d2; the width of the long hole is a little wider than the diameter d2 of the pin 72; d1 as a groove size is a little smaller than the diameter d2 of the pin 72.

To assemble the universal joint, as shown in FIG. 29, the one projection of the pin 72 is engaged with the jointing hole 106 as shown in FIG. 29, and then, the other projection of the pin 72 broadens the groove width d1 in pushing it upon movement of the retard roller shaft 71 in the direction of an arrow 110, so that the pin 72 can move to the position of the jointing long hole 107. The universal joint portion therefore can be easily assembled. It is to be noted that when the joint is disengaged, the pin 72 can be easily disengaged from the jointing long hole 107 only by moving the retard roller shaft 71 in the reverse direction of the arrow 110.

Figure 30:
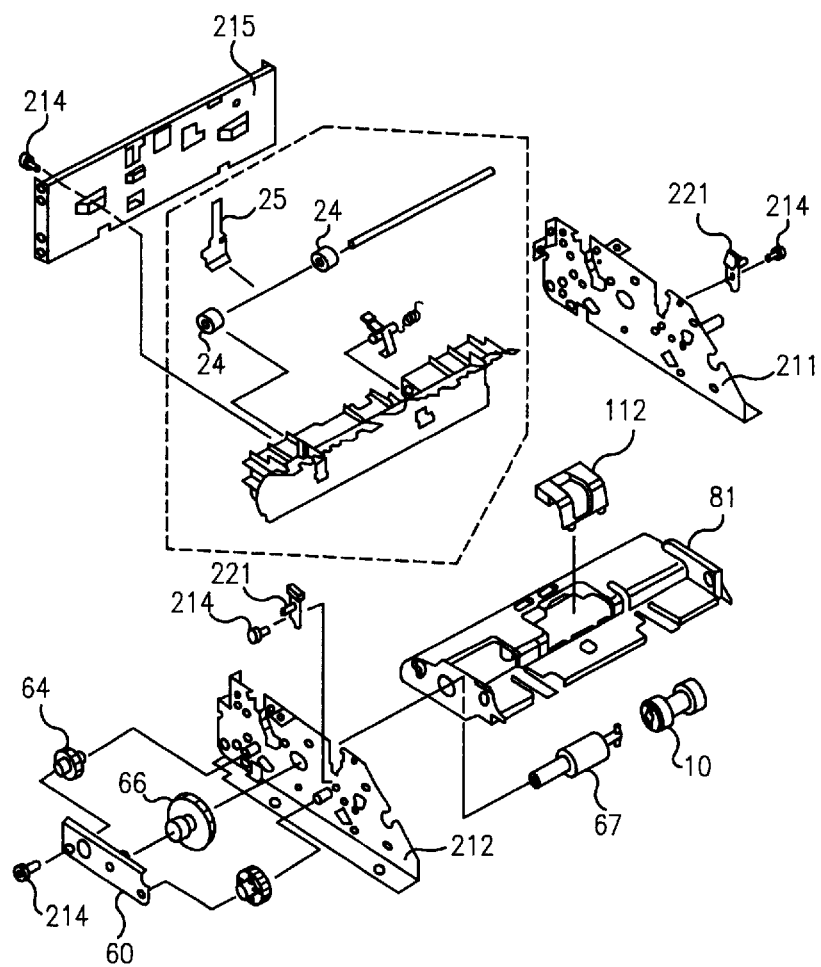
FIG. 30 is a layout showing a paper guide and parts around the lower guide of the original document feeding apparatus.

Although the retard roller 10 and the torque limiter 67 are connected via the universal joint as described above, the surface of the torque limiter 67 serves as an original document guide in this embodiment. Referring to FIG. 30, this is described in detail. FIG. 30 shows constituting parts of the portion of the retard roller 10 around the lower guide 81.

Figure 31:
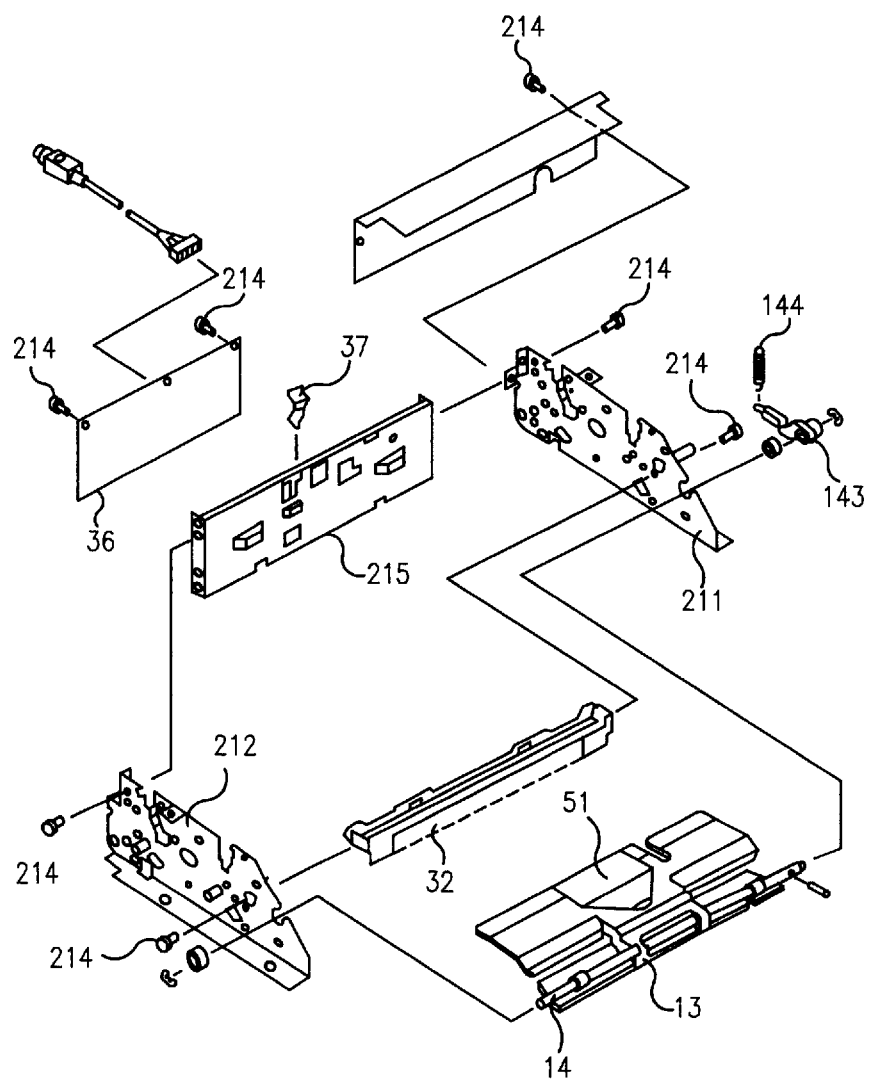
FIG. 31 is a layout of essential parts forming a frame of the original document feeding apparatus.

In FIG. 30, the numerals 211, 212, and 215 are a right frame, a left frame, and a stay for forming the entire frame in connecting the right and left frames. The entire frame structure is shown in FIG. 31. The numeral 221 is an openable click for positioning the upper openable guide 6 in a snap-on manner; the numeral 214 is a screw for securing members. As shown in FIG. 30, the torque limiter 67 is exposed through an opening formed in the lower guide 81. The surface of the torque limiter 67 is located at the same level as the original document guide surface of the lower guide 81 and forms with the guide surface in concert the original guide surface. The surface of the torque limiter 67 is therefore so smooth and constituted without trace of a molding gate or eject pin. In this embodiment, the torque limiter 67 is thus functioned as an original document guide, thereby realizing a compact apparatus. That is, in a conventional apparatus, the surface of the torque limiter 67 connected to the retard roller 10 is completely stayed away from the route of papers, and there is no special regard on the surface, such as forming the surface smooth. Such a conventional apparatus therefore cannot make itself a compact apparatus likewise this embodiment, or the torque limiter 67 cannot be arranged directly beside the retard roller 10.

At separation control of retard roller 10, the accuracy of the value of the predetermined torque, which is transmitted to the retard roller 10, is very important parameter, and if it is not managed precisely, jamming or double feeding may occur. Accordingly, it would be desirable that any unnecessary gear or other transmission mechanism is not located between the retard roller 10 and the torque limiter 67 as much as possible. In this regard, it is effective that the torque limiter 67 can be arranged immediately beside the retard roller 10 likewise in this embodiment, and that the surface of the torque limiter 67 serves as an original document guide. It is to be noted that in this embodiment, a diameter of the retard roller 10 is set at 20 millimeters, and a diameter of the surface of the torque limiter 67 is set at 18 millimeters. That is, the surface of the retard roller 10 is constituted to project by 1 millimeter from the original document guide surface (see FIG. 15).

{Delivery Roller}

Figure 32:
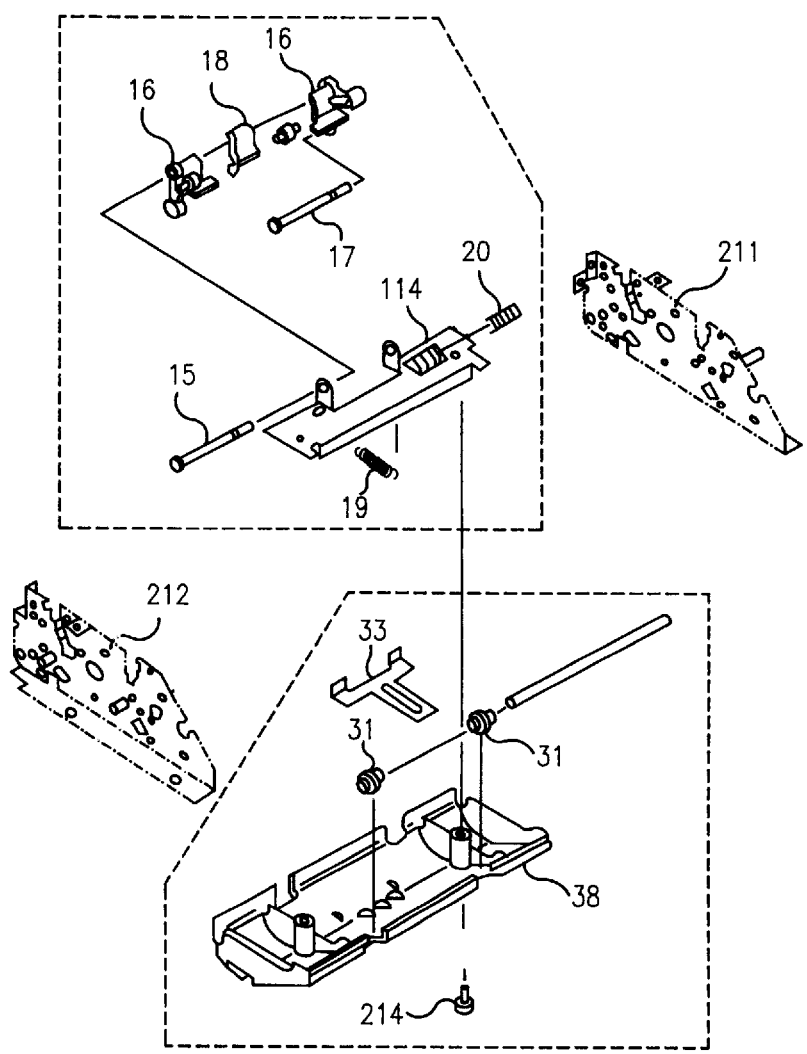
FIG. 32 is a layout of members located around a white guide member of the original document feeding apparatus, in particular, a perspective view showing a structure supporting the retard roller.

In FIG. 1, the numeral 30, 31 are delivery roller pair for delivering original documents, images on which are read, onto the delivery tray 39 described below. The numeral 30 represents the delivery roller; the numeral 31 is an idler roller driven to rotate in pressure contact with the delivery roller 30. The idler roller 31 is normally urged toward the delivery roller 30 by a spring 33 secured to a white guide member 38 placed in the image reading section as described below. The white guide member 38 is supported pivotably around the shaft of the document feed roller 23, normally pushed downward by the upper openable guide 6 in a closing state as shown in FIG. 1, and positioned as shown in FIG. 1. The relation among the white guide member 38, the idler roller 31, and the spring 33 is shown in FIG. 32.

As described below, when the upper openable guide 6 is released, the white guide member 38 whose pushing is released also rocks upward, so that urging force of the spring 33 urging the idler roller 31 toward the delivery roller 30 is released. That is, the idler roller 31 is in contact with the delivery roller 30 by the weight of the white guide member 38. In other words, since the pressure contact between the delivery roller 30 and the idler roller 31 is released, recovery from jamming can be done easily.

{Discharge Needle}

The numeral 32 indicates a discharge needle for removing charges in original documents to prevent the documents delivered by the delivery roller pair 30, 31 from attached to the back sides of the delivery tray 39 and the document feeding tray 3 due to static electricity and inducing stacked jamming or the like. The discharge needle 32 also serves as a stopper for suppressing curled rear end of an original document, when the rear end of the delivered original document is curled upward, and prevents the rear end of the curled document from disturbing the subsequent delivery of the original document. Therefore, a length of the discharge needle 32 is designed to be longer than that of an ordinary needle, and it is about 20 millimeters in this embodiment.

{Delivery Tray}

In FIG. 1, the numeral 39 is a delivery tray as a tray means and is to hold original documents delivered and conveyed by the delivery rollers 30, 31 after the end of reading and discharged by the discharge needle 32. As described above, the stopper 120 for preventing the front end of the original document from bending down is attached, as to be capable of being pulled, on a most downstream side of the delivery tray 30 in the feeding direction. It is to be noted that the stopper 120 also, as described above in use of FIG. 4, serves as a handle for opening and closing the original document feeding apparatus. To prevent a user's hand from slipping when the hand takes the stopper 120 at the opening or closing, the cover 137 having a grip 131 with projections suitable for fitting fingers, is disposed on a lower side.

(Stopper)

Figure 33:
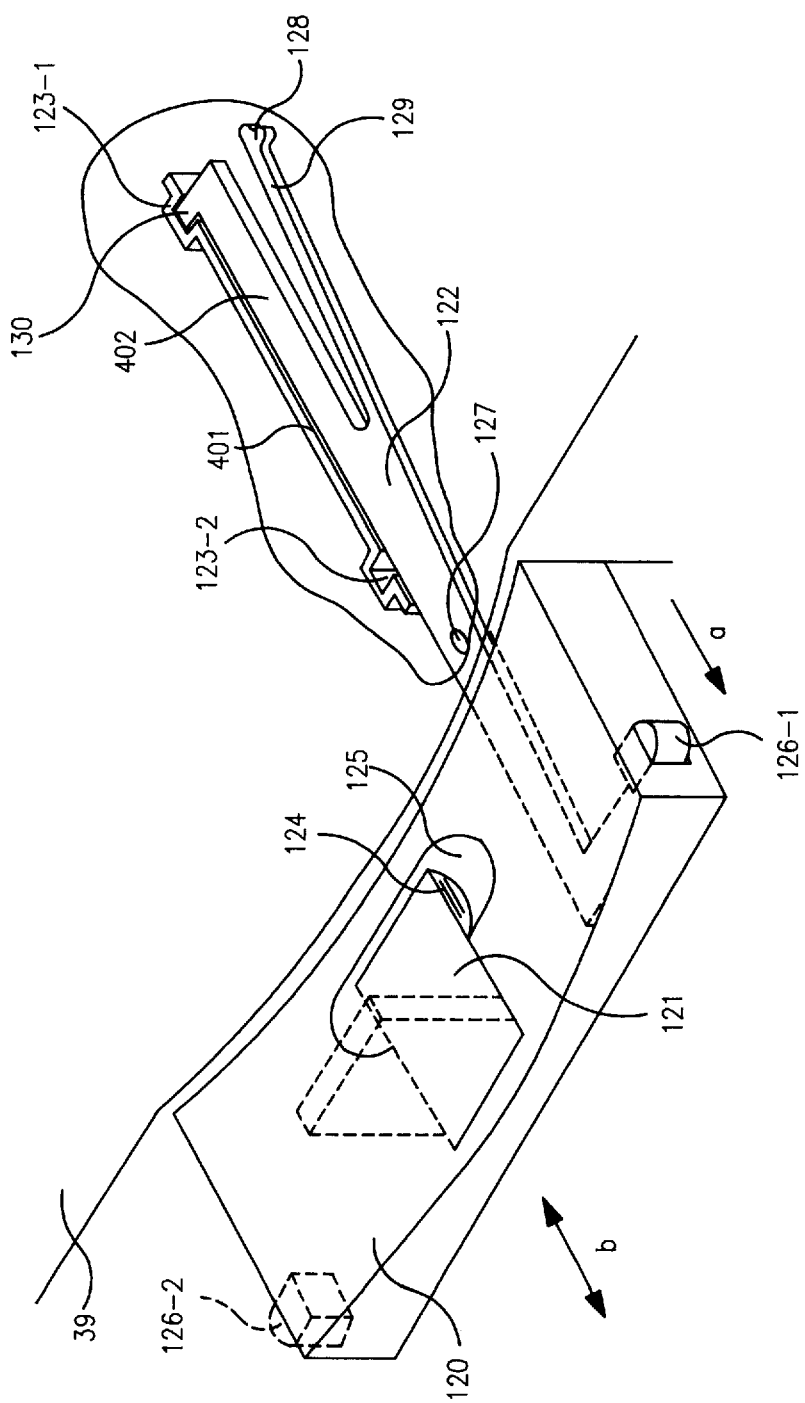
FIG. 33 is a view illustrating movement of a stopper.

Referring to FIG. 33, the stopper 120 attached to the delivery tray 39 is described in detail. The stopper 120 as a supplemental tray means can be pulled in a direction of an arrow b in FIG. 33 in association with sizes of the original documents held at the delivery tray 39. In this embodiment, two positions, a first position at which the stopper 120 is pushed in the delivery tray 39 and a second position at which the stopper 120 is pulled out of the delivery tray 39, can be chosen. It is to be noted that in FIG. 33 the stopper 120 is shown as located at the first position in which the stopper 120 is pushed in the delivery tray 39.

To make the stopper 120 stable at each position, stopper levers 122 are incorporated within the stopper 120. Each lever 122 is pivotable around a point 127 and formed unitedly with an arm 402 having a projection 130 engaging recesses 123-1, 123-2 formed on a rail 401 in the delivery tray 39, a spring 129 having a pushing portion 128 for urging the projection 130 toward the recesses 123-1, 123-2, and a lever button 126 for projection's engaging to and disengaging from the recesses 123-1, 123-2 upon pivotal movement of the lever 122. Although in FIG. 33 the stopper lever 122 incorporated in the stopper 120 is shown on one side, another stopper lever having the same constitution is symmetrically incorporated on the other side, and the lever button 126 satisfies functions described above when both of the lever buttons 126 are pushed at the same time.

In the stopper 120 normally located at the first position, the projection 130 is pushed in and engages the recess 123-1 (or the recess 123-2) upon contacting of the pushing portion 128 of the spring 129 unitedly formed with the stopper lever 122 to an of the inner wall, not shown, of the stopper 120. To move the first position to the second position, the stopper lever 122 is rotated around the point 127 upon pushing of the lever buttons 126-1, 126-2, thereby disengaging the projection 130 from the recess 123-1 in opposing urging force of the spring 129. The stopper 120 is then traveled in a direction of an arrow a in FIG. 33 while the lever buttons 126-1, 126-2 are pushed, and securely engages at the second position upon falling the projection 130 into the other recess 123-2. Conversely, to move the second position to the first position, the stopper 120 is pushed while the lever buttons 126 are pushed in a manner likewise above to fall the projection 130 in the recess 123-1. It is to be noted that the arm 402 having the projection 130, the rail 401 having the recesses 123-1, 123-2 are formed in an arc shape to reduce space between them, thereby making less rattle in a perpendicular direction to the pulling direction of the stopper 120.

{Stopper Tab}

A stopper tab 121 as regulating means is attached as to be collapsible to prevent original documents from dropping off from the delivery tray 39. The stopper tab 121 can be sit at two selective positions: a first position when the tab is not used (position shown by a solid line in FIG. 33); a second position when the tab is used (position shown by a broken line in FIG. 33). A projection 124 is formed on both ends of the stopper tab on its free end side for engaging with fingers or nails, and a recess 125 for receiving fingers is formed on the stopper 120 on the corresponding free end side. The stopper tab 121 can be therefore easily pulled by putting fingers in the recess 125 formed on the stopper 120 and pulling up both projections 124 of the stopper tab 121 with the fingers or nails.

Figure 34:
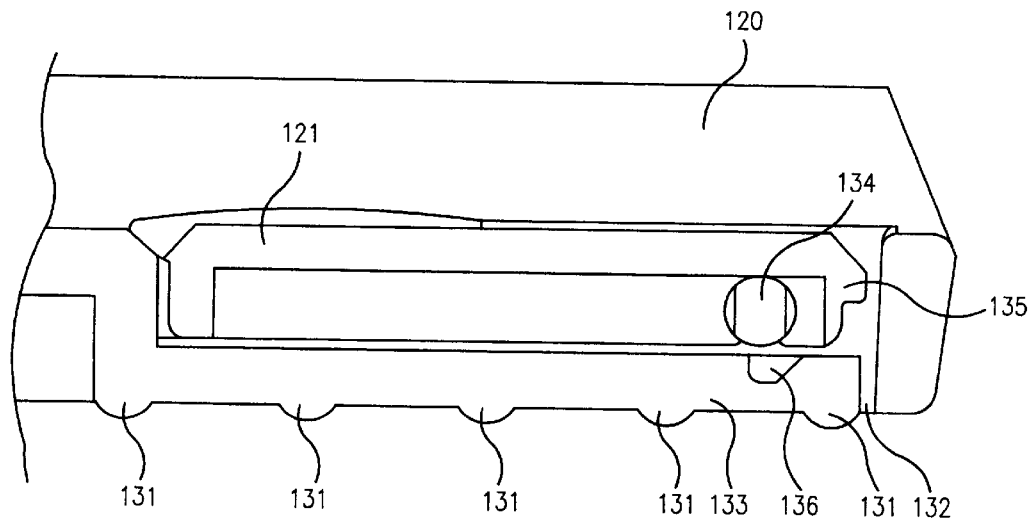
FIG. 34 is a cross section cut along a center portion of the stopper.
Figure 35:
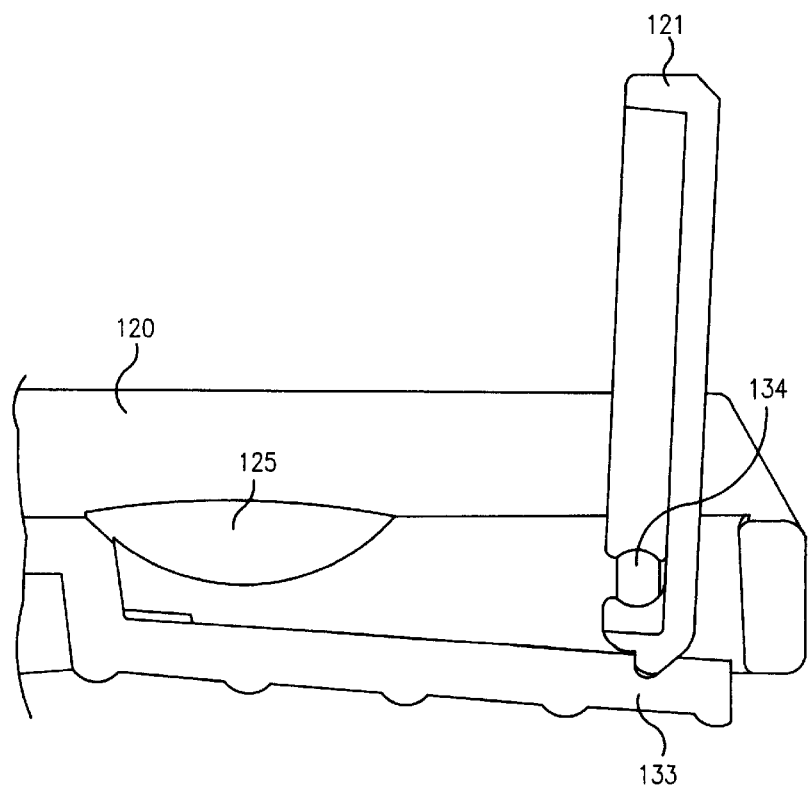
FIG. 35 is a cross section cut along a center portion of the stopper.

The stopper tab 121 is constituted to be locked at the second position for serving as the regulating means for regulating ends of the original documents. Referring to FIGS. 34, 35, the lock mechanism of the stopper tab 121 is described. FIG. 34 shows the stopper tab 121 located at a first position (collapsed position); FIG. 35 shows the stopper tab 121 located at a second position (standing position).

As shown in FIGS. 34, 35, the stopper tab 121 is pivotable around a pivotal shaft 134 and is formed with a projection 135 at a pivotal proximal end for engaging a recess 136 formed on a side of the stopper. The recess 136 is formed over a spring 133 cantilevered by a slit 132 formed at a part of the cover 137 disposed below the stopper 120. Accordingly, when the stopper tab 121 is pivoted from the first position to the second position, the spring 133 cantilevered by the stopper tab 121 is bent downward, and the projection 135 falls into the recess 136 on the spring 122, thereby locking the stopper tab 121 to function as regulating means at the second position (the broken line position in FIG. 33).

{Process for Paper Jamming}

Now, there describes a process for paper jamming in this original document feeding apparatus. In this invention, the apparatus is so constituted that all of the conveyance roller pairs for sandwiching and conveying original documents can be in pressed contact and released in association with open and closed manipulation of the upper openable guide 6 attached as to be openable at a topmost position of the apparatus body. That is, the apparatus is constituted that by opening the upper openable guide 6, the pressed contact of all the conveyance roller pairs is released, and conversely, by closing the upper openable guide 6, all the conveyance roller pairs are made in pressed contact. It is to be noted that as a method for releasing the pressed contact of the conveyance roller pairs, there are some methods such as a method to separate one roller of each conveyance roller pair from the other roller of the pair, a method to release urging force of urging means such as springs or the like for pressing the rollers, and the like. In this embodiment, both of the methods above are used to make contact with pressure and to release the conveyance roller pairs.

{Pressed Contact and Release of the Roller Pairs}

The rollers for conveying original documents from feeding to delivery in the original document feeding apparatus thus constituted are, in an order from the upstream side in the feeding direction, the pickup roller 8, the feed roller 9 and the retard roller 10 in pressed contact with the feed roller 9, the pull-up roller 21 and the idler roller 22 in pressed contact with the roller 21 by an urging force of the leaf spring 11, the document feed roller 23 and the idler roller 24 in pressed contact with the roller 23 by an urging force of the spring 25, and the delivery roller 30 and the idler roller 31 in pressed contact with the roller 30 by an urging force of the spring 33. The conveyance roller pairs that are made in pressed contact and released by opening and closing manipulation of the upper openable guide 6 are: the feed roller 6 and the retard roller 10; the pull-up roller 21 and the idler roller 22; the document feed roller 23 and the idler roller 24; and the delivery roller 30 and the idler roller 31.

Among those rollers, the rollers rotatively attached to the upper openable guide 6 are the feed roller 9 and the idler roller 22 (see, FIG. 20). It is to be noted that the pickup roller 8 is also mounted on the upper openable guide 6. The pull-up roller 21, the document feed roller 23, the delivery roller 30 are rotatively mounted on the apparatus body. The retard roller 30 is rotatively attached to the L-shaped supporting lever 16 attached, as to be capable of rocking ,on a side of the apparatus body, and is pushed toward the feed roller 9 by the urging force of the spring. The idler roller 24 is rotatively attached to a conveyance guide attached to the stay 215 forming the frame of the apparatus body (see, FIG. 30) and is pushed in a direction toward the document feed roller 23 by urging force of the spring 25. The idler roller 31 is rotatively attached to the free end of the white guide member 3 8 capable of rocking around a shaft of the document feed roller 23 (see, FIG. 32) and is urged in a direction toward the delivery roller 30 by pushing force of the upper openable guide 6 and urging force of the spring 33.

Accordingly, if the upper openable guide 6 is opened, the feed roller 9 and the idler roller 22 are separated from the corresponding rollers 10, 21, and therefore, the pressed contacts between the feed roller 9 and the retard roller 10 and between the pull-up roller 21 and the idler roller 22 are released, respectively. The urging force of the spring 25 urging the idler roller 24 to the document feed roller 23 and the urging force of the spring 33 urging the idler roller 31 to the delivery roller 30 are released at the same time, so that the pressed contacts between the document feed roller 23 and the idler roller 24 and between the delivery roller 30 and the idler roller 31 are also released. Therefore, a single action as opening the upper openable guide 6 allows the pressed contact of all the conveyance rollers to be released, so that jammed documents or the like in the conveyance route are easily removed. In particular, the documents jammed in a condition that the documents are sandwiched between rollers of any one of the conveyance roller pairs can be removed easily. In the same way, the pressed contact of the respective roller pairs can be made by a single action. That is, all what to do is that the upper openable guide 6 is closed with the steps in the opposite order to the steps described above.

It is to be noted that processes of jamming happened at portions of delivery roller pair 30, 31 placed between the feeding tray 3 and the delivery tray 39 can be done by releasing the feeding tray 3. The feeding tray 3, as described above using FIGS. 3, 5, and 6, is merely engaged elastically by engaging means composed of the elastic member 248 and the engaging recess 247 functioning as a snap-fitting mechanism, and therefore, the tray 3 can be easily disengaged and swung upward.

In FIG. 15, the numeral 81 is the lower guide as the guide member, disposed at a position below and corresponding to the upper openable guide 6 with a predetermined space to form a conveyance route for original documents. The numeral 82 is the pull-up roller shaft, serving as rotary center of the pull-up roller 21. The numeral 83 is a notch for suspending spring to adjust pressure of the retard roller 10 to the feed roller 9 and is formed on the pushing lever 18 pivotably supported around the shaft 15 as a center. The free end of the pushing lever 18 is in contact with the shaft 17 located at one end of the supporting lever 16 pivotable around the shaft 15 as a center, and urging force is exerted to the lever 18 by the contact point. The retard roller 10 is thus in pressed contact with the feed roller 9. The numeral 84 is a stopping wall for stopping ends of the original documents when the original document are set on the original document feeding tray 3. In FIG. 15, all the members except the idler roller 31 are swung around the pull-up roller shaft 82 as a rotary center in accordance with opening and closing of the upper openable guide 6. When the upper openable guide 6 is closed, the spring 33 urges idler roller 33 to press the delivery roller 30, and when the guide 6 is open, the urging force to the idler roller 31 is released to nullify pressure onto the delivery roller 30.

{Retry Feeding When Paper Jammed}

Figure 36:
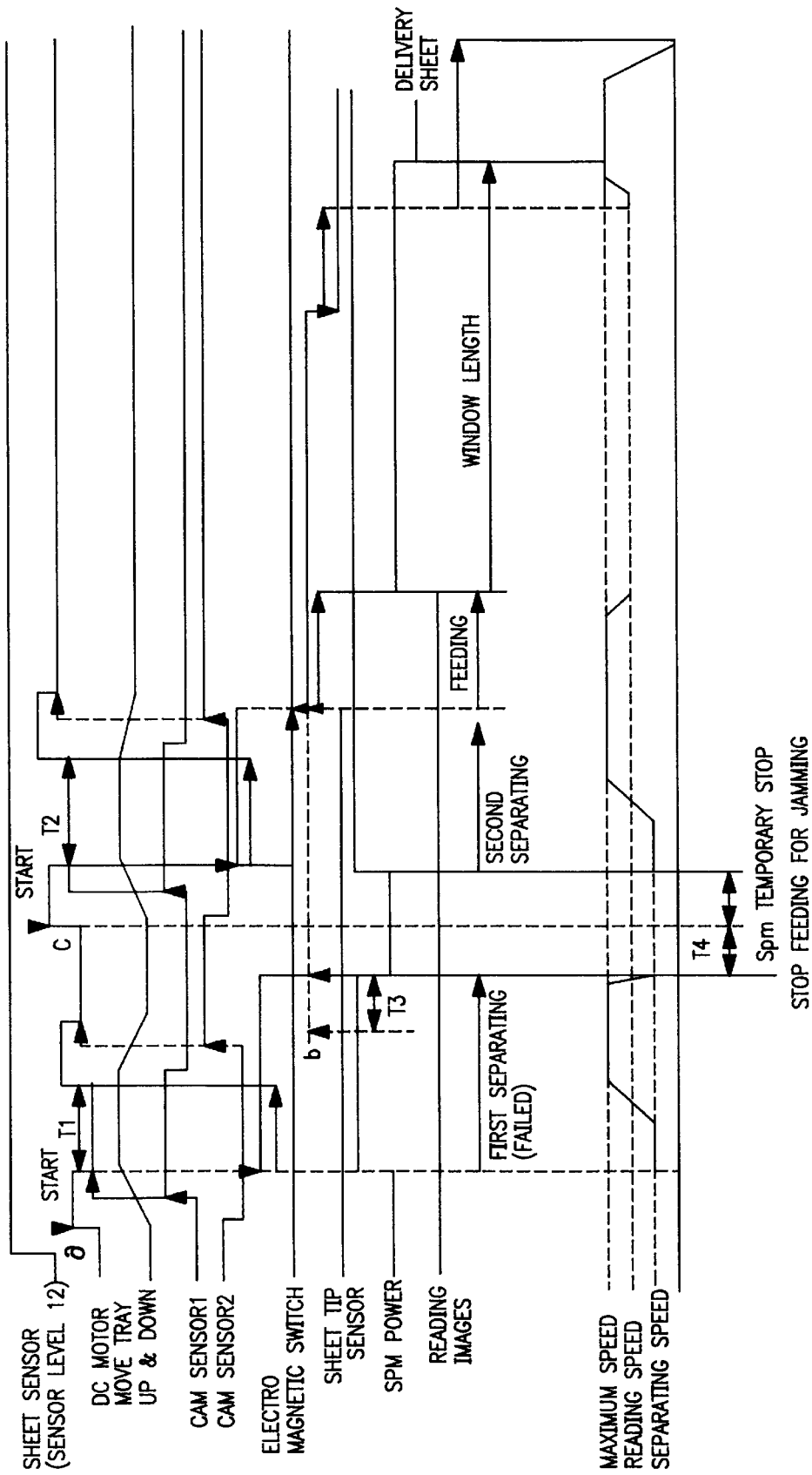
FIG. 36 is an illustration of retry sequence of the original document feeding apparatus for jamming.
Figure 37:
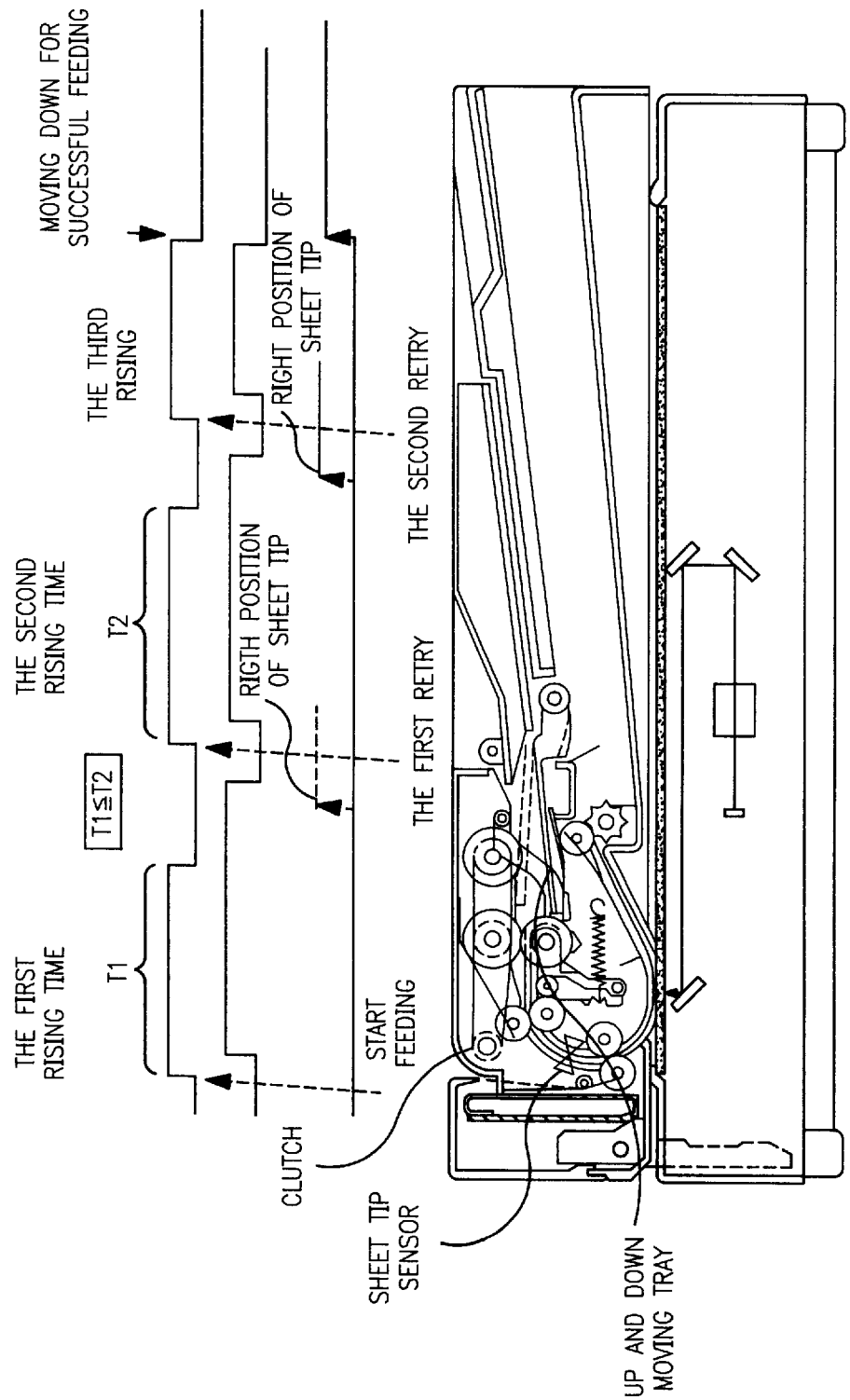
FIG. 37 is a detailed illustration of the retry sequence in FIG. 36.

FIG. 36 is an illustration of a retry sequence when a paper jamming occurs used for the original document feeding apparatus. FIG. 37 shows a part shown in FIG. 36 to make FIG. 36 comprehensive. It is to be noted that the retry sequence is, as disclosed in Japanese Unexamined Patent Publication (KOKAI) No. Heisei 3-216,428 or the like, a sequence, not judging as a paper jamming when the feed roller is slipped at the time of the document feeding, but trying to repeat feeding operation several times. When the original documents are not fed even if the feeding operation is repeated, the apparatus judges it as a paper jamming.

In the original document feeding apparatus according to this embodiment, the sequence is designed as follows. That is, upon a feeding start signal (a portion in the drawing), the up and down rocking tray 13 starts to move up, and the electromagnetic clutch 61 is turned on after passing a prescribed period. After the up and down rocking tray 13 reaches a top position and after a predetermined time T1 passes, the up and down rocking tray 13 starts to move down. When a paper end sensor 41 detects a front end of the original document, the electromagnetic clutch 61 is turned off at the same time or after a prescribed period passes. The original document feeding apparatus normally starts feeding the original documents from the powering-on of the clutch 61, and the paper end sensor 41 supposedly detects the front end of the documents after the prescribed period passes (b portion in the drawing). However, when the pickup roller 8 or feed roller 9 is slipped, the original document cannot be fed by a predetermined distance, so that the original document cannot pass the paper end sensor 41 at the predetermined period.

If the original document does not pass the paper end sensor 41 even when the prescribed period passes, the step motor is stopped as feeding jam waiting, and a retry is implemented by repeating the feeding sequence from moving up (c portion of the drawing) of the up and down rocking tray 13 again after the feeding operation is stopped for a prescribed period T4. The apparatus may be able to surely feed documents by making the moving up period T2 of the up and down rocking tray 13 at the second time longer than the moving up period T1 (T2>T1). It is to be noted that at the second time, in addition to above, the same effects are obtainable by a retry with a lower feeding speed.

(Image Reading Means)

An optical system of the scanner 2 can read images on documents conveyed by the original document feeding apparatus 1 thus structured passing though an image reading section 29. Referring to FIGS. 38 to 42, the constitution of the image reading section and its vicinity is described.

{Transparent Sheet Member}

Figure 38:
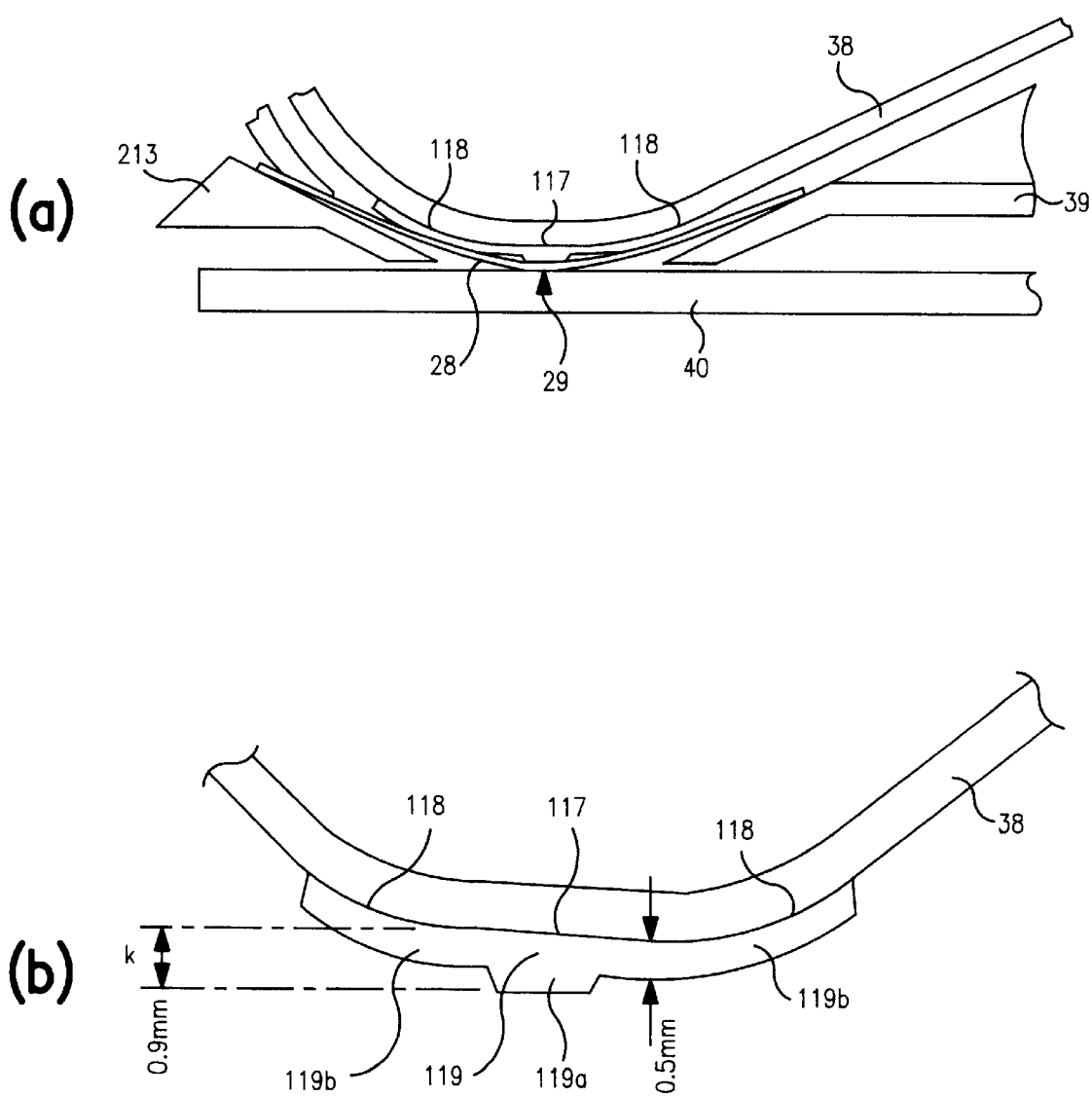
FIG. 38 is a detailed view showing a shape and operation of positioning projecting member for positioning the white guide member and a transparent sheet.

As shown in FIG. 38, around the image reading section and its vicinity, the numeral 28 is a transparent sheet member (hereinafter referred as to "transparent sheet"), and a space k (about 0.9 millimeters in this embodiment) is formed between the transparent sheet 28 and the white guide member 38 to pass the original document. It is to be noted that the space k between the transparent sheet 28 and the white guide member 38 is guaranteed by a positioning projecting member 119 as described below. When the original document passes the space k between the transparent sheet 28 and the white guide member 38, images on the original documents are read through the transparent sheet 28 at the image reading section 29.

Figure 39:
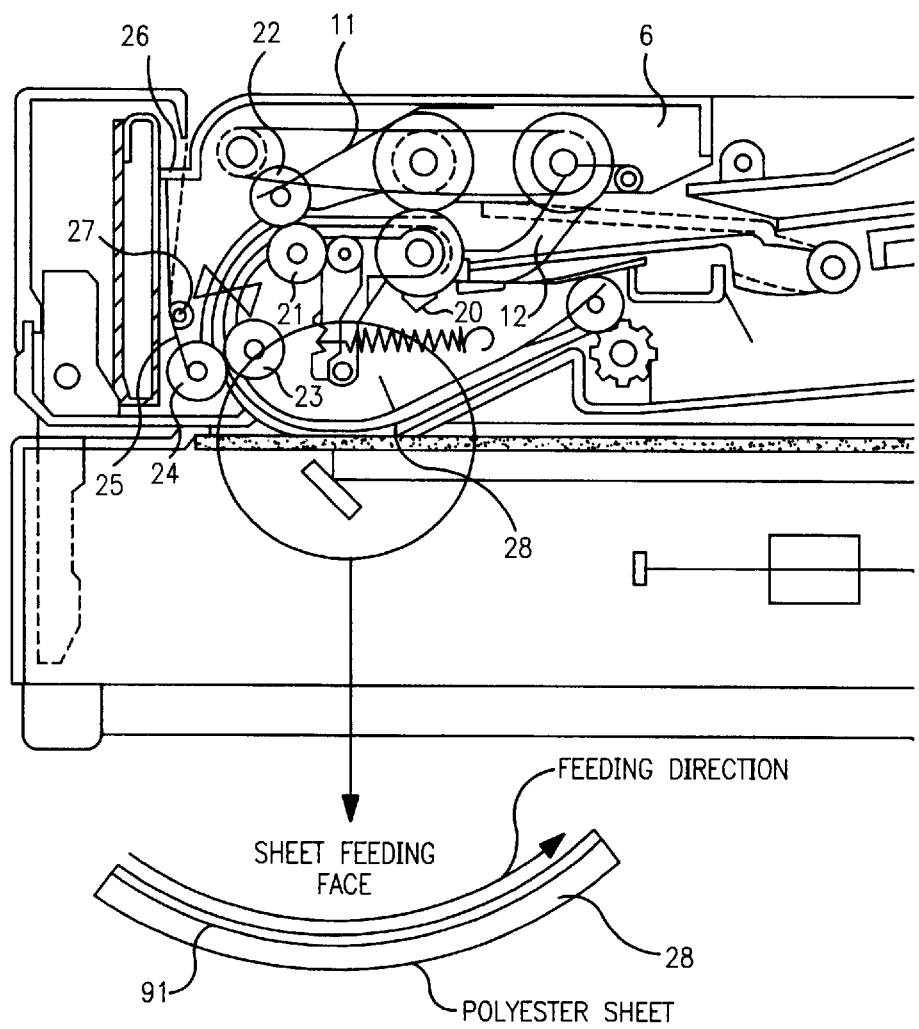
FIG. 39 is an enlarged view around the transparent sheet.

In this embodiment, as shown in FIG. 39, a sheet that anti-scratch coating 91 endurable more than 2H (Japanese Standard) is formed on an original document conveyance surface of a transparent polyester is used as the transparent sheet 28, so that no scratch will be on the original document conveyance surface of the polyester sheet. This structure prevents a transparent rate or imaging quality of this apparatus from being impaired due to scratches. In this embodiment, further, a material in which antistatic agent is blended is used to prevent static from being built in the polyester sheet. Therefore, the transparent sheet (polyester sheet) 28 and the original documents are prevented from sticking together by static electricity. It is to be noted that the transparent sheet 28 is not limited to the sheet thus constituted and, for example, can be a polycarbonate sheet, acrylic sheet, or molded glass, etc.

{Positioning of the Transparent Sheet}

The space k between the transparent sheet 28 and the white guide member 38 is as shown in FIG. 38 guaranteed by the positioning projecting member 119 disposed on a surface of the white guide member 38 in facing the image reading section 29, outside the area through which the original documents pass. Now, a shape and operation of the positioning projecting member 119 is described.

The white guide member 38 has the surface, facing the image reading section 29, formed in a shape as shown in FIG. 38, by a flat surface 117 in parallel to the platen glass 40, and arc surfaces 118 having a predetermined radial in continuation with the surface 117. The transparent sheet 28 is disposed in facing the face of the white guide member 38, which is further facing the image reading section 29. The transparent sheet 28 is positioned by being clamped by the positioning projecting member 119 formed on the face of the white guide member 38 and by the platen glass 40, and the space k between the white guide member 38 and the transparent sheet 28 is guaranteed.

However, if a projection 119a of the positioning projecting member 119 alone may makes the transparent sheet 28 in contact with the white guide member 38 at the arc surface 118 on the face described above, thereby causing to enlarge resistance against passage of certain paper, such as thin flimsy paper, and conversely, thick paper, and paper having a large friction coefficient likewise a cardboard paper.

In this invention, supplemental projections 119b extending with a lower height than the projection 119a up to both arc surfaces 118 of the white guide member 38 located on both sides of the flat surface 117 in parallel to the platen glass 40. The height of the projection 119a is substantially the same as the space k between the white guide member 38 and the transparent sheet 28, whereas the height of the projection 119b is about a half of the height of the projection 119a. In this embodiment, the height of the projection 119a is about 0.9 millimeter, whereas the height of the projection 119b is about 0.5 millimeter. With such a constitution, the space as a feeding route around the image reading section can be ensured across the entire area thereof, so that the image reading section 29 allows the original documents to pass and be conveyed smoothly even if the original document such as a thin paper or a cardboard paper is fed.

{Engagement between a Flap and the Transparent Sheet}

Figure 40:
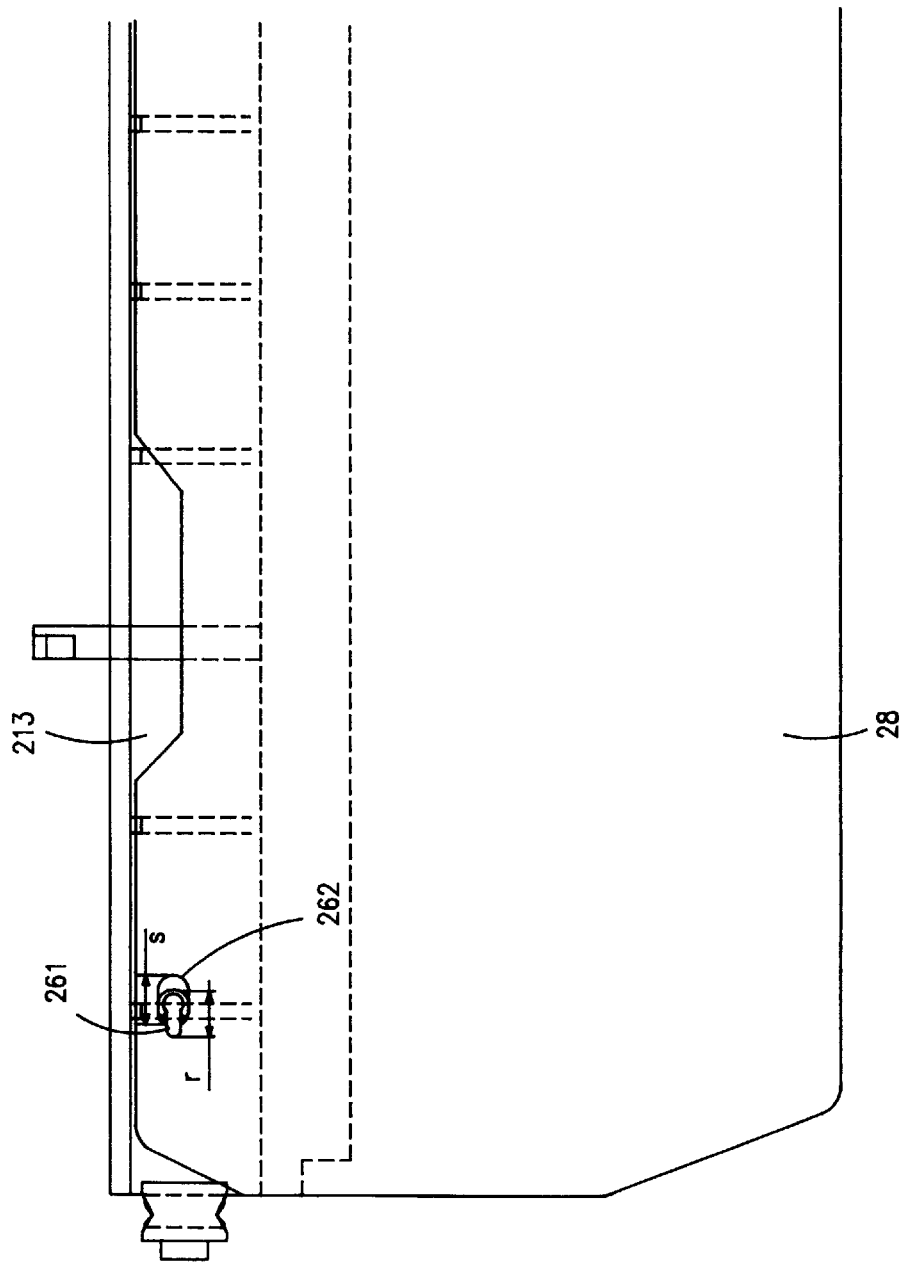
FIG. 40 is an illustration showing an engagement state between a key-shaped projection of a flapper and a long hole of the transparent sheet.
Figure 41:
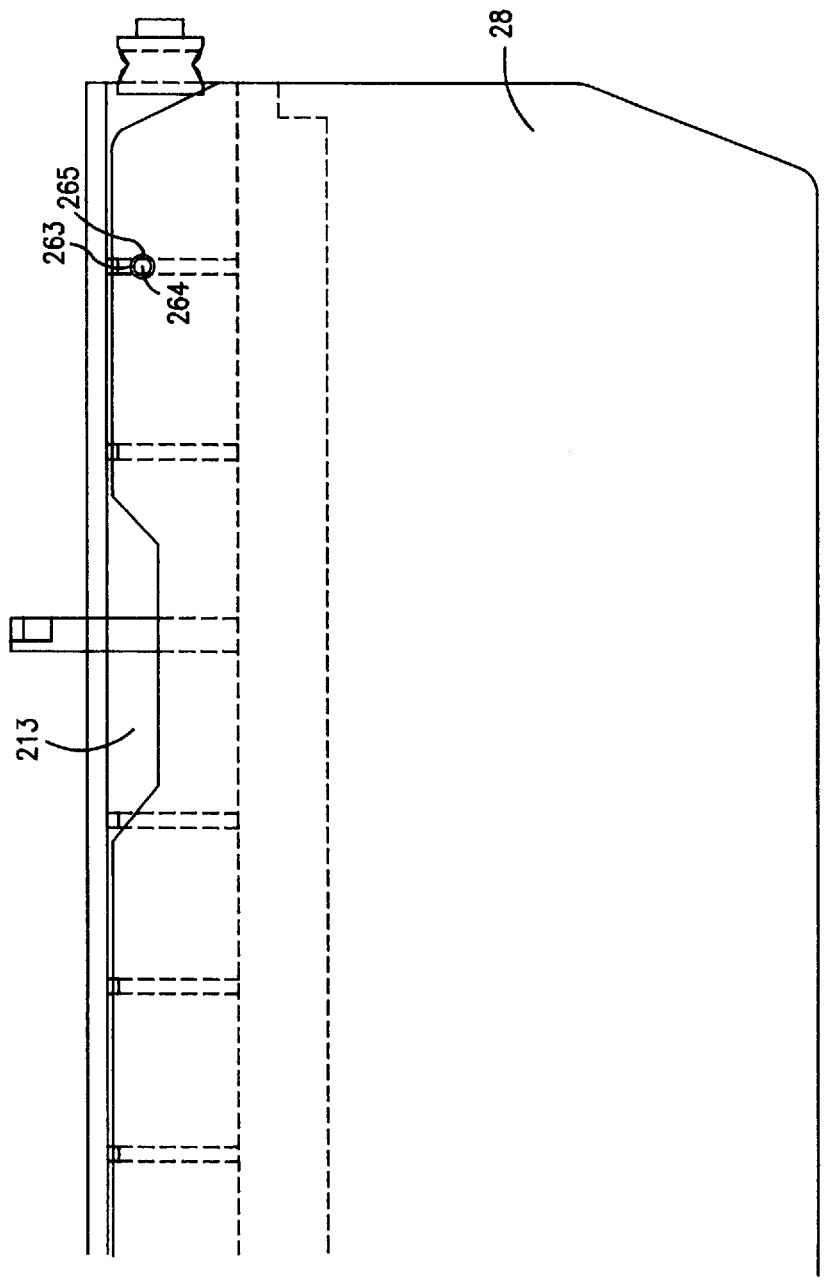
FIG. 41 is an illustration showing an engagement state between a projection of a flapper and a decisive hole of the transparent sheet.
Figure 42:
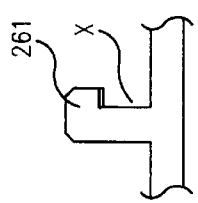
FIG. 42 is a cross section showing a shape of the key-shaped projection.

The transparent sheet 28 is attached to a flap 213 located on an upstream side of the image reading section 29. The structure of the flap 213 is described with reference to FIGS. 40 to 42. As shown in FIGS. 40, 41, a long hole 262 and a decisive hole 263 are formed on both sides in the widthwise direction on an upstream side of the transparent sheet 28. As opposed to those, a projection 261 in a key-like shape, and a projection 264 having a stopper 265, are formed at a position corresponding to the long hole 262, and at a position corresponding to the decisive hole 263, respectively, on both sides in the widthwise direction of the flap 213 for attaching the transparent sheet 28. Accordingly, when the transparent sheet 28 is attached to the flap 213, the decisive hole 263 and the projection 264 are engaged with each other after the long hole 262 and the key-like shaped projection 261 are engaged with each other, thereby attaching, as well as positioning, the transparent sheet 28 to the flap 213.

As shown in FIG. 41, the key-like shaped projection 261 is so formed that a length r in a longitudinal direction of the key portion is shorter than a length s in a longitudinal direction of the long hole 262 of the transparent sheet 28, so that when the transparent sheet 28 is attached to the flap 213, the long hole 262 can be fitted readily in the key-like shaped projection 261. After the long hole 262 is fitted in the key-like shaped projection 261, the transparent sheet 28 is slid to fit inside the key portion of the key-like shaped projection 261, thereby enabling a sure engagement. It is to be noted that fitting the long hole 262 of the transparent sheet 28 into a distal portion x (see, FIG. 42) of the key-like shaped projection 26 allows to prevent the transparent sheet 28 from dropping off from the flap 213, and to position the sheet at the same time.

To further ensure the engagement between the flap 213 and the transparent sheet 28, the decisive hole 263 of the transparent sheet 28 is fitted to the projection 264 having the stopper 265 of the flap 213. The transparent sheet 28 will not drop off from the flap 213 by both advantages of the stopper 265 of the projection 264 and the key portion of the key-like shaped projection 261. Furthermore, those also play a role as positioning members, so that the apparatus can save its space.

{Reading Speed}

A reading speed of images of the original documents is described. The image reading apparatus structured as described above can select one of two reading methods: that the original document feeding apparatus 1 feeds the original documents, and the images are read during passing of the original documents at the image reading section; and that the original document is set at the platen glass 40 and the image is read by scanning its optical system along the original document. In this embodiment, by making the original document feeding apparatus 1 adopted for a stream reading method, the space between the document and subsequent document when read is made smaller than that of the scanner 2 adopted for flat bed type.

In this embodiment, further, the image reading speed itself of the original documents is designed to be higher. More specifically, the flat bed scanner 2 takes 6 seconds for reading and 5 seconds for returning at its full speed, whereas the original document feeding apparatus 1 takes, when exercising the stream reading method, 3 seconds for reading and one second for interval between documents. That is, the scanner 2 takes 11 second per cycle, and the original document feeding apparatus 1 takes 4 second per cycle. If both are compared only by the reading time, the original document feeding apparatus 1 is faster twice.

Meanwhile, its illumination amount does not have an extra power suitable for high speed original document feeding apparatus 1, where an optical system for a liner CCD 47 (i.e., lamp, mirror, etc.) and an illumination lamp are commonly used, and since this apparatus is a low cost machine, a high cost design such that multiple lens are prepared and switched to change the brightness (f number) of the lens cannot be a solution. However, in general, unless a storing time of the liner CCD 47 multiplied by light amount is a predetermined amount, the S/N ratio of the liner CCD 47 tends to be poor, so that the apparatus cannot obtain an excellent image information.

To solve those problems in all aspects, in the embodiment of the invention, four-bit multi-value is utilized when the original document feeding apparatus 1 operate with the maximum speed. That is, when reading is implemented by eight-bit multi-value, the S/N ratio of the analog signal of the liner CCD 46 is needed to be 256 or above. However, if four-bit multi-value is used, the S/N ratio of the analog signal of the liner CCD 46 is needed to be 16 or above. In consideration of this, it is enough that the S/N ratio of 16 or above is ensured even though the apparatus reads image fast and the liner CCD 47 does not have an adequate light amount.

In any event, in this embodiment of the invention, the apparatus satisfies the needs by using a lamp whose a light amount produces the S/N ratio of 16 or above of the liner CCD 46 when running at the maximum speed. In other words, during a high speed reading mode, the step number (bit number) of reading is reduced where the liner CCD 47 is used in a state of an inadequate light amount by reducing the light amount of the liner CCD 47. Therefore, though the apparatus can operate as a high speed machine, the lamp light amount can be substantially the same level as a conventional low speed model, thereby enabling its cost to be reduced.

Figure 43:
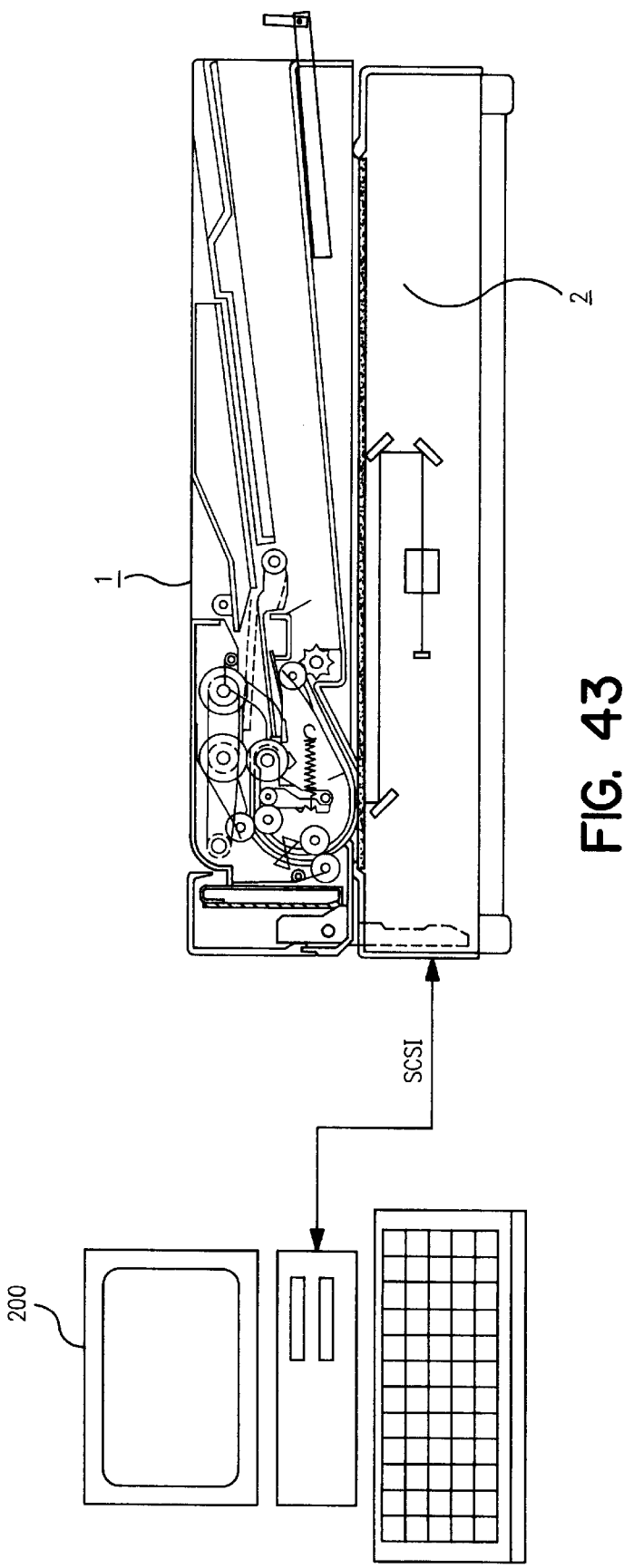
FIG. 43 is a view showing a system constitution of a flat bed scanner

FIG. 43 is a diagram showing a system constitution of the flat bed scanner. In FIG. 43, when image date read by the flat bed scanner 2 is transferred to a host computer 200, the host computer 200 may not handle the image data sent from the flat bed scanner 2 due to its memory capacity or processing speed. To solve such a problem, so called, a start and stop reading control is exercised in which the reading operation of the flat bed scanner 2 is temporarily interrupted.

At that time, in the apparatus using the liner CCD 47, if the storing time is changed smoothly, the image process becomes complicated, and the apparatus is compelled to abruptly stop and abruptly start, since the apparatus cannot reduce the operation speed smoothly during reading operation. However, as personal computers operate with higher speeds, their reading speeds are needed to be higher speeds. The original document feeding apparatus 1 and the flat bed scanner 2 of this embodiment adopt a sequence with a half speed placed between the full speed and the stop, avoiding any abrupt stop, such as the full speed, the half speed, and then, the stop, because it becomes difficult to maintain a continuation of images when the start and stop reading control is exercised and to prevent lose control of the motor. It is to be noted that an operation to change speed stepwise during image reading operation of the original documents as described above is referred as to a step down reading control.

{Step Down}

Figure 44:
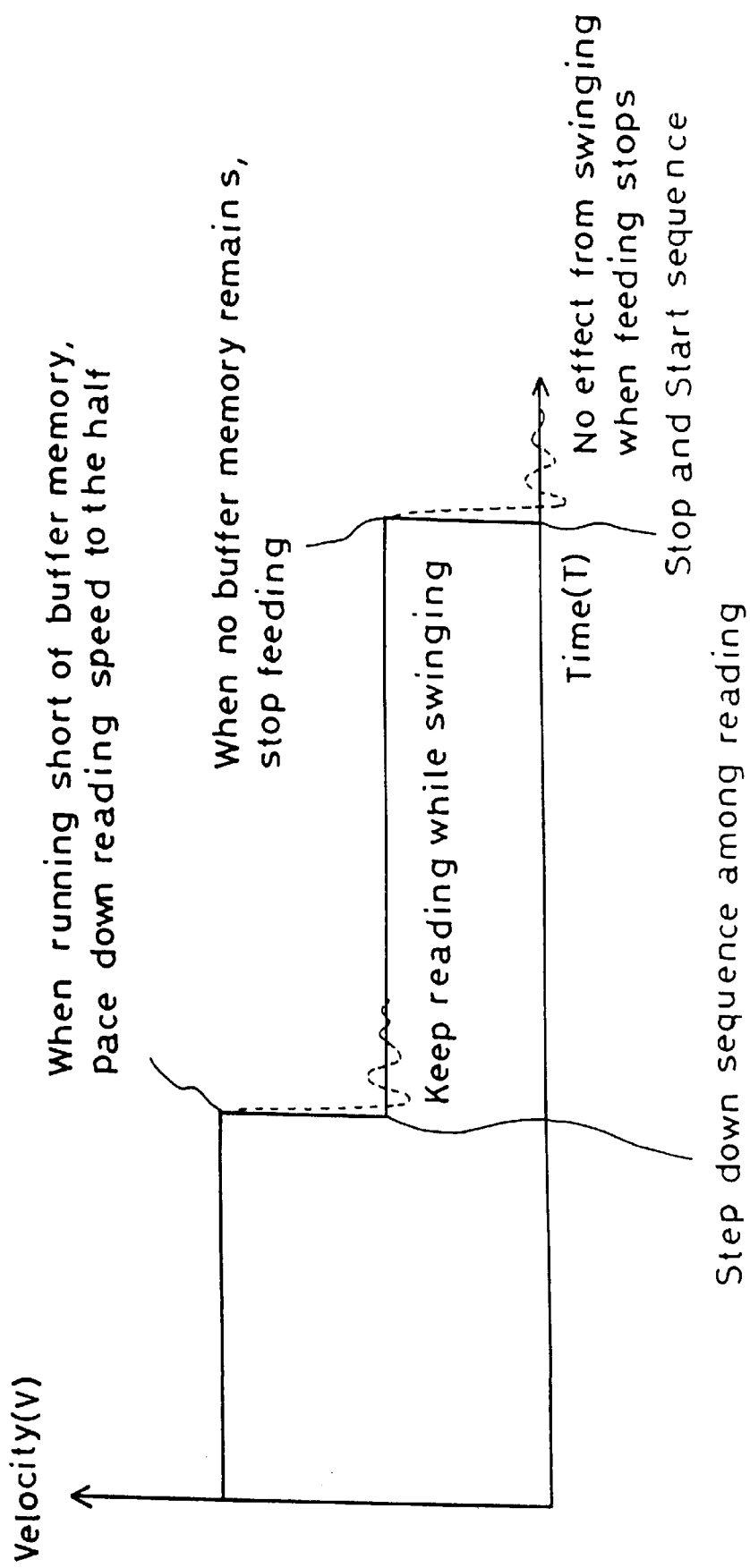
FIG. 44 is an illustration showing start and stop and step-down during reading.

FIG. 44 is a diagram showing in a simplified manner the start and stop reading control and the step down reading control during reading. In FIG. 44, the ordinate represents feeding speed of the paper feeding rollers and a mirror 44, and the abscissa represents time. In FIG. 44m when the apparatus reads images with a certain speed, if the image data comes close to an amount that the computer cannot handle due to its memory capacity or communication speed, the apparatus shifts the reading speed to the half thereof. This operation is called as a step down.

Then, operations: that the apparatus continues reading with the half speed; that if the computer comes to fail to process the image data, the image scanner stops reading until finishing of the data processing of the computer; that then, upon demand from the computer, the scanner re-operates reading, are repeated. Such operations are called as a start and stop.

It is to be noted that during operations of the step down and the start and stop, the original document illuminating lamp ordinarily does not response with a high speed at a moment, so that it is ordinarily impossible to change the storing time at the liner CCD 47 during the course of reading. To solve this problem, in the embodiment of the invention, since the liner CCD 47 outputs information containing extra one line when reading speed is set at the half speed, the two-line information is converted to the one-line information by taking the average of the outputted information after converted from analog to digital.

This image information processing is operated in association with timing of the step down. It is to be noted that if it is exercised in a simplified manner, one line of every two lines can be discarded. In this embodiment, although a two-phase motor is used as the step motor 99, the drive of the motor is devised. When the apparatus reads images with an ordinary reading speed (i.e., a high speed), drive pulse pattern is required to be outputted with a high speed, so that the task of a DC controller, or ordinarily, a microcomputer, tends to increase. However, such a microcomputer also handles other tasks at the same time. When a low performance chip is used for the sake of cost reduction under such a circumstance, the processing may fail to be in time if an ordinary 1-2 phase drive is performed, so that a paper jamming and malfunctions may occur. To solve this problem, one way is to change the chip to a high performance chip, but this requires its peripheral circuit to be operated with a high speed, thereby resulting in a higher cost.

In this embodiment, to reduce the costs and to read with a high speed, a two-two phase drive is done only when a one-two phase drive is difficult. That is, the two-two phase drive is used during the ordinary high speed reading, and if the step down occurs to let the speed a half, the one-two phase drive is used. That is, the drive pulse pattern is changed instantly in completely synchronism with the timing that the reading speed becomes the half This change is realized by performing the step down control in association with the timing to change form the two-two phase to the one-two phase likewise two phase, two phase, two phase, one phase, two phase, one phase, two phase, . . . . That is, this embodiment does not operate to perform the step down soon when a buffer memory simply becomes short, but decides timing of the step down control even in consideration of the two-two phase drive pulse pattern to the step motor 99.

This embodiment starts with a half reading speed of a speed at a time of a stop when the buffer memory runs out. The reason is that if the apparatus starts with a high reading speed, the motor has to have a high power, or a high torque and a high response with a smaller inertia moment, resulting in an expensive one. Furthermore, there raises a problem that such a motor having a high torque and a high response tends to be a slim but very long motor, which is likely impossible to be arranged within a compact body. Therefore, the apparatus starts with a slower speed than the ordinary speed when starting after the stop state. It is to be noted that when reading of a last document ends, the apparatus gradually increases its speed to recoup the original speed during an interval by when the front end of a subsequent document comes there and starts reading with the original speed from the subsequent document. Since the speed can be gradually increased while no document is read, even a small power motor can do so without any problem.

{White Reference of Scanner}

Figure 45:
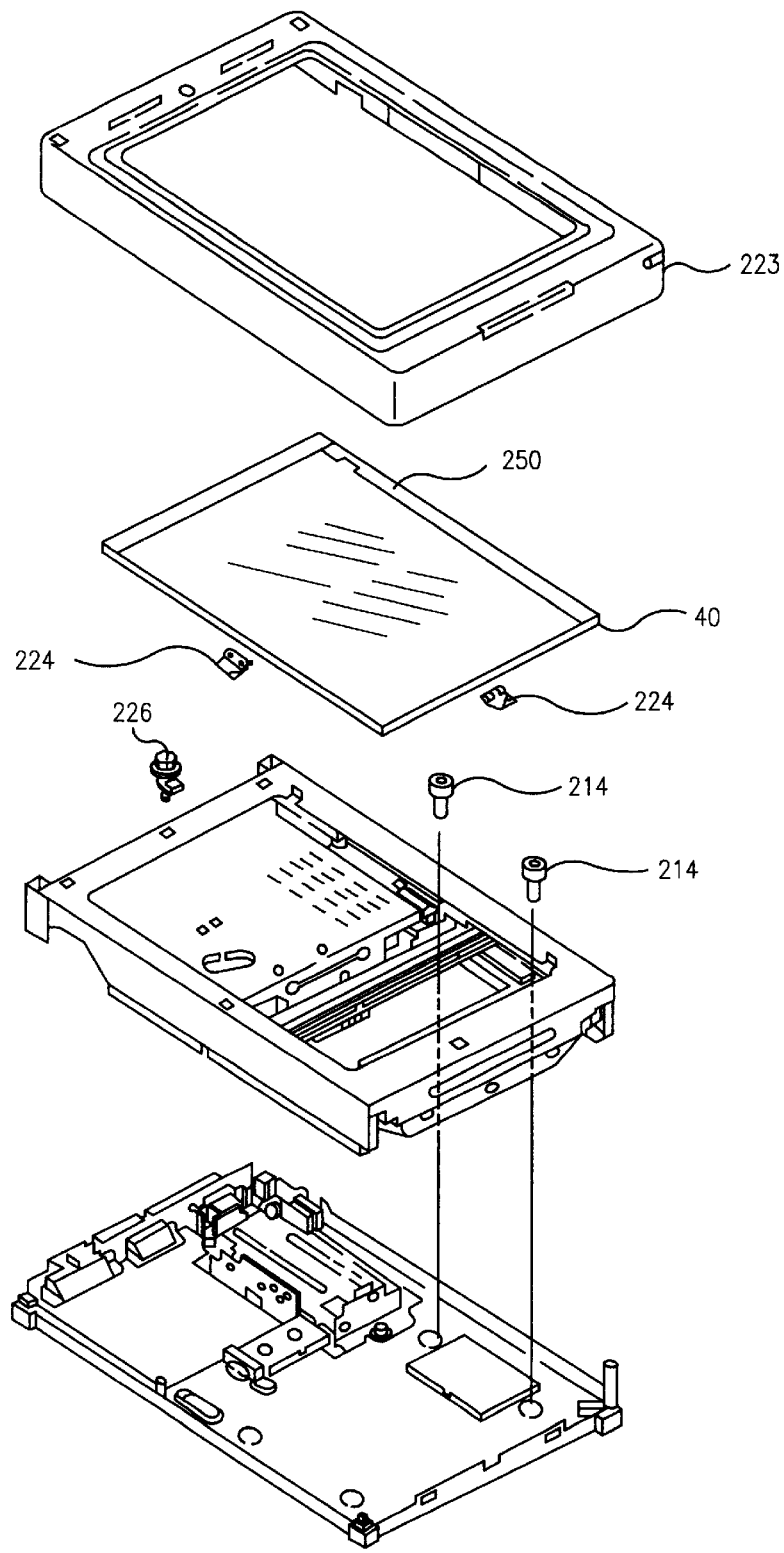
FIG. 45 is a layout showing a structure of a basic unit of a flat bed scanner portion.

FIG. 45 is an extended view showing a structure of a basic unit of the flat bed scanner 2 of the embodiment of the invention. In FIG. 45, the numeral 223 is a body upper cover; the numeral 224 is a glass pushing member for securing the platen glass 40 to the scanner unit; the numeral 226 is a mirror base securing hook rotatable in use of a coin. This is provided for preventing the first mirror 44 and a second mirror 45 from being broken due to a movement by an external impact or the like when the flat bed scanner 2 is carried. The numeral 225 is a bottom electrical transmission unit for forming a bottom of the flat bed scanner 2.

An alignment index notch 250 is formed on a side parallel to a subscanning direction of the original document alignment index of the platen glass 40 in FIG. 45. A white reference surface is formed behind the alignment index to amend deviations of original document reading sensitivity in the subscanning direction. When the flat bed scanner 2 reads the images on the original documents, the apparatus electrically amends its signals so that the density of the white plate always becomes a predetermined value to prevent variations (or deviations) in the subscanning direction. However, since no white reference face can be formed at the alignment index notch 250, an amended value immediately before the notch 250 is controlled to be maintained in the range of the notch 250 in this embodiment of the invention.

The reason that such a complicated control is required is described as follows. The positioning projecting member 190 of the white guide member 38 shown in FIG. 38 is facing the alignment index notch 250. If the positioning projecting member 190 is arranged within a passing range of the original documents, a document having a maximum width cannot pass due to the projection. Therefore, first, the positioning projecting member 190 must be placed outside the document having the maximum width, or more outside of the reading range in the widthwise direction (i.e., the perpendicular direction to the feeding direction). Second, in consideration that without use of the original document feeding apparatus 1 the original documents are directly read by the flat bed scanner 2, the original documents are aligned by contacting the alignment index of the platen glass 40, so that the alignment index must exist at an end of the original document reading range. To meet those requirements, if the reading ranges of the original document feeding apparatus 1 and the flat bed scanner 2 are coincided, an alignment index notch 250 has to be formed by notching partly the index of the alignment, and the positioning projecting member 190 has to be arranged to face there.

To prevent this, a conventional apparatus made the positioning projecting member 190 in contact on the index of the alignment, or the reading ranges between the original document feeding apparatus 1 and the flat bed scanner 2 are deviated largely by several millimeters. However, even if they are largely deviated, the original documents may be damaged because the positioning projecting member 190 comes over the original documents when the flat bed scanner 2 reads the original documents, and when the positioning projecting member 190 is arranged over the index of the alignment on the platen glass 40, images are likely impaired since the paper passage is floated over the top face of the platen glass 40 by the thickness of the alignment index. In this embodiment of the invention, those problems are solved by providing the alignment index notch 250 and by skipping white amendment in the subscanning direction at that portion.

{Electronic Equipment Board}

Figure 46:
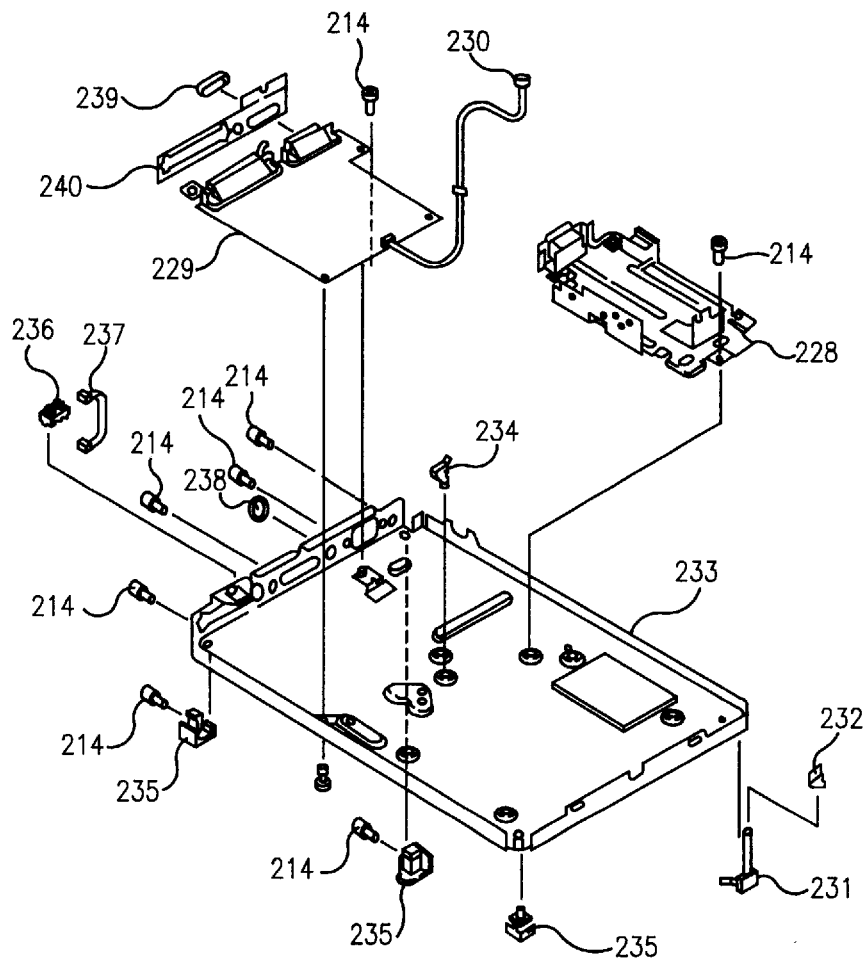
FIG. 46 is a detailed layout of a bottom unit in FIG. 45.

FIG. 46 is an extended view showing structural parts of the bottom electric transmission unit of the flat bed scanner 2. As shown in FIG. 46, a power source unit 228, a control circuit board 229, an LED 230 for indicating the powered on state and the powered off state, a supporting member 231 for LED, and a reflecting member 232 for LED are mounted on a bottom plate 233. In FIG. 46, the numeral 234 represents a wiring pushing member for securing wiring of the LED 230; the numeral 235 represents leg members for supporting the flat bed scanner 2; the numeral 236 represents a photo interrupter for detecting the home position of the first mirror 44 shown in FIG. 1; the numeral 237 represents a wiring to connect the photo interrupter with the control circuit board 229; the numerals 238, 239 represents a connector anti-dust cover to prevent dusts or foreign objects from entering in a connector formed on the control circuit board 229; the numeral 240 is a electric noise shielding plate for preventing electronic wave noises from coming out the circuit control board 229.

{Attachment of Motor for Driving Mirror}

Figure 47:
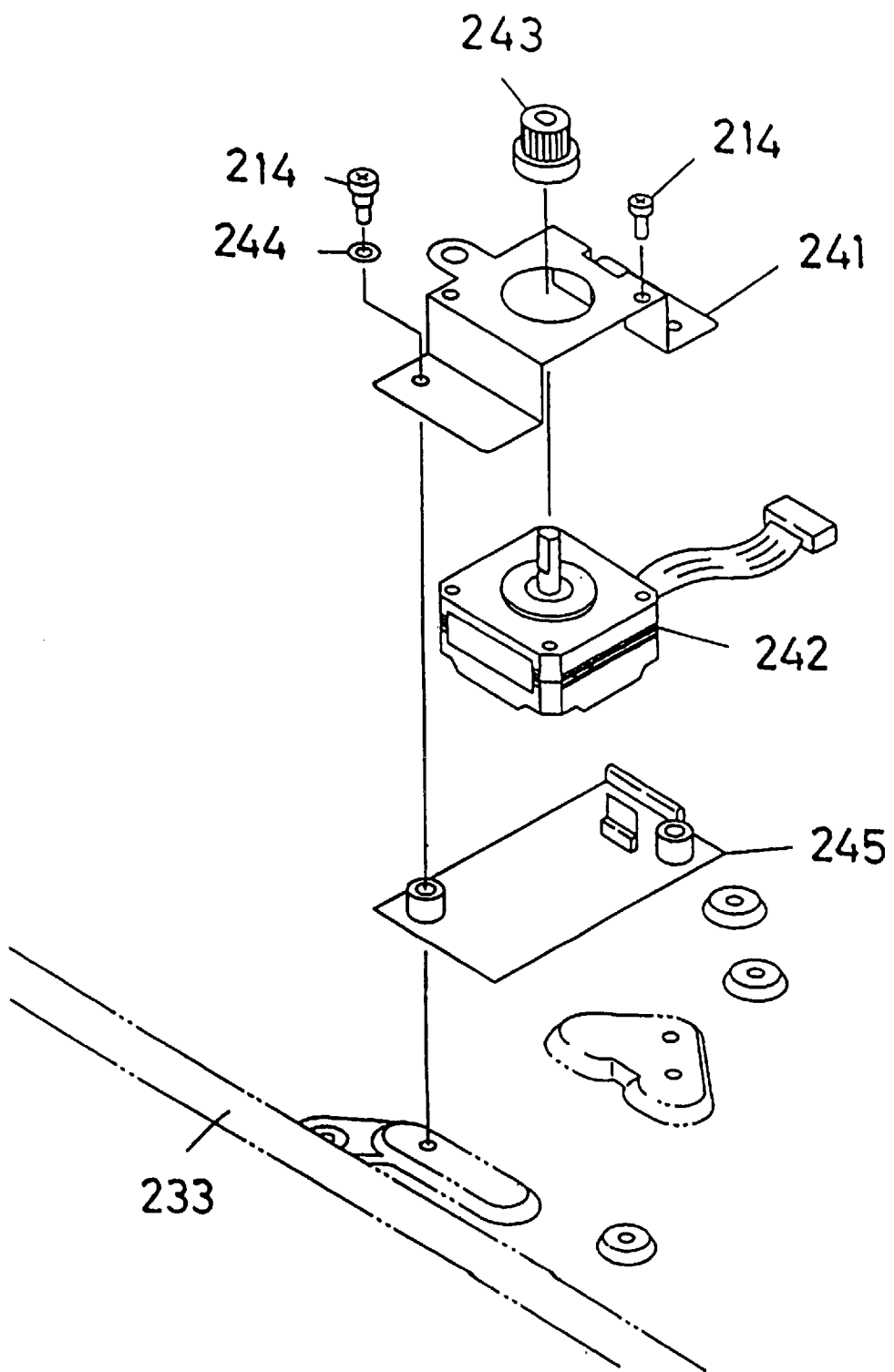
FIG. 47 is an attachment layout of a main body step motor to be attached to the bottom plate shown in FIG. 46.

FIG. 47 is an extended view showing an attachment structure of a body step motor 244, as a motor to drive the first and second mirrors 44, 45 of the flat bed scanner 2, attached on the bottom plate 233. In FIG. 47, the numeral 241 represents a body motor supporting plate for securing the body step motor 242 on the bottom plate 233; the numeral 243 represents a body motor gear secured on an output shaft of the body step motor 242; the numeral 244 represents washers for pushing an anti-vibration rubber member 245 when the body motor supporting plate 241 is secured to the bottom plate 233 by screws.

The anti-vibration rubber member 245 is placed between the bottom plate 233 and the body motor supporting plate 241, thereby preventing vibrations of the body motor supporting plate 241 from directly transmitting to the bottom plate 233. Therefore, the apparatus does not make a large noise due to resonance of an operation sound of the body step motor 242 to the bottom plate 233.

{Other Embodiments}

Figure 48:
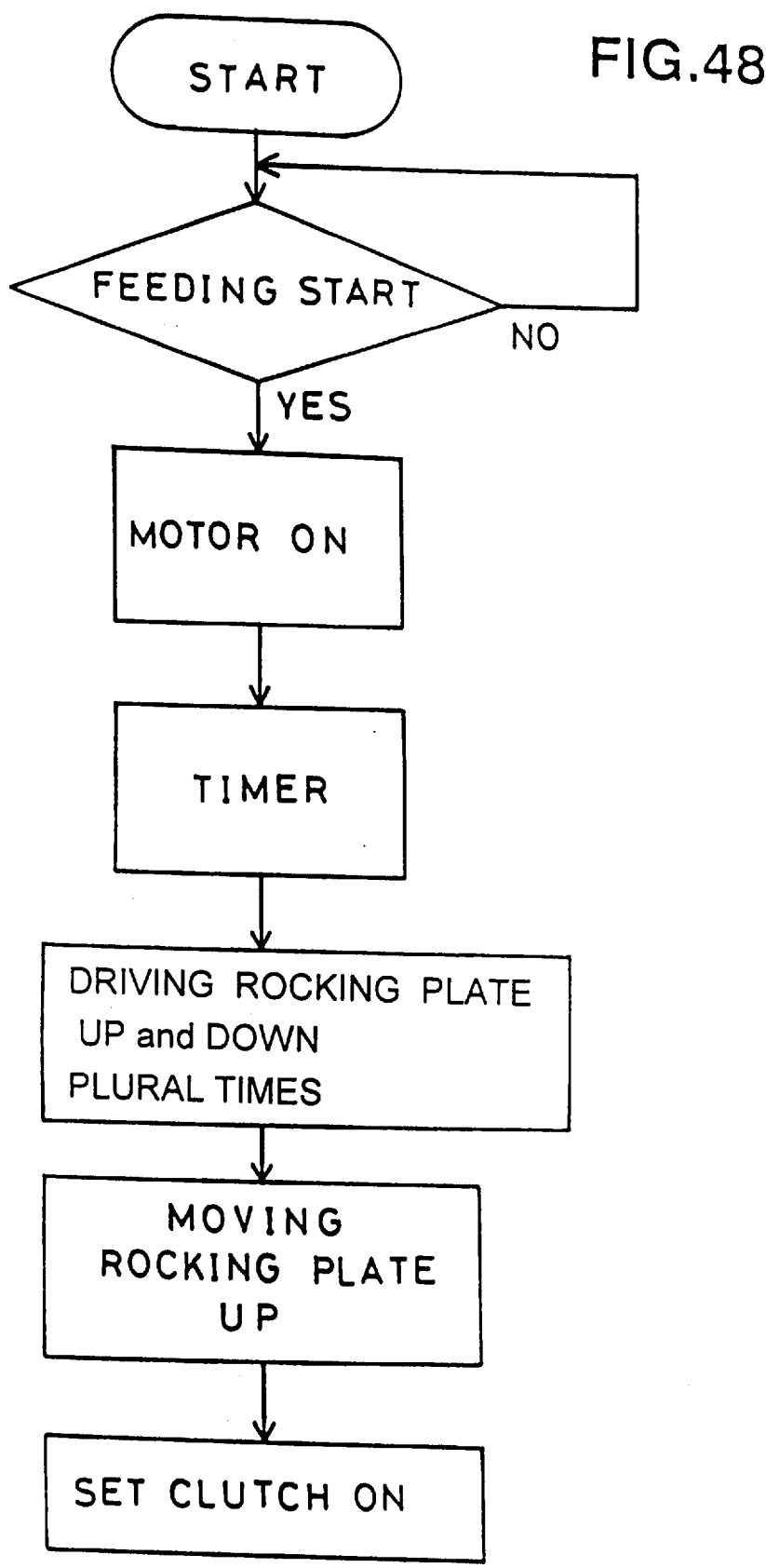
FIG. 48 is an illustration of constitution of another embodiment of the invention.
Figure 49:
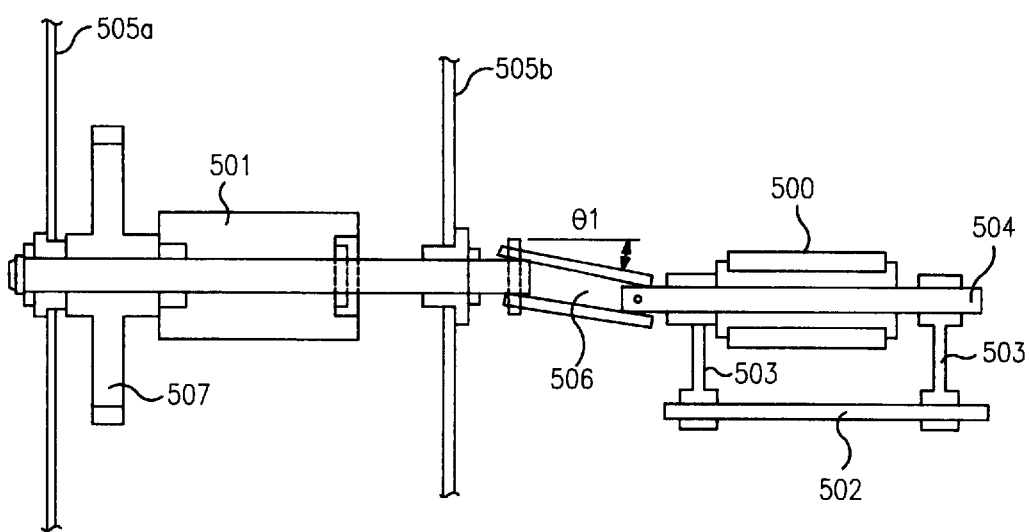
FIG. 49 is an illustration of drive transmission constitution to a retard roller of a prior art.

Although the first embodiment described above exemplifies that the documents are pushed to the feed roller by constituting that the retard roller is capable of rocking, it can be constituted that the documents are pushed to the feed roller by constituting that the feed roller is capable of rocking without making the retard roller capable of rocking. In such a structure, as shown in FIG. 48, a gear 600 for transmitting drive force to the feed roller 9 is cantilevered to a frame 601; the gear 600 and an one end of the coupling member 602 are directly connected by a first universal joint mechanism (in FIG. 48, an engagement between a recess 600a formed on the gear 600 and a pin 602 formed in the coupling member 602); the other end of the coupling member 602 and a feed roller shaft 603 are connected by a second universal joint mechanism (in FIG. 48, an engagement between a hole 602b formed on the coupling member 602 and a pin 603b formed on the roller shaft 603). It is to be noted that the other end of the feed roller shaft 603 is supported by a bearing 604.

According to this structure, the length of the coupling member 602 can be taken adequately even if the apparatus is made compact, and since the inclined angle of the coupling member 602 is small even when the feed roller is rocked, generation of force in the radial direction by the universal joints can be suppressed to be a small amount. Accordingly, the rotary drive force to the feed roller 9 can be transmitted effectively; the pressed force between the feed roller 9 and the retard roller 10 is made stable; and an eccentric worn-out can be prevented at the feed roller 9 and the retard roller 10.

Although in the first embodiment described above the retard roller is exemplified as a separating member to push sheets to the feed roller, the retard roller is not necessary to be a member rotating in the reverse direction to the feeding direction of the sheets, and for example, substantially the same effects can be obtained by constituting it with a pushing member such as separating pads or the like. Although in the first embodiment described above a feed roller or the like in roller shapes are exemplified as members to give conveyance force to the sheets, the roller in this invention is a rotary body capable of providing conveyance force to the sheets, and it is a concept including, for example, a thing providing conveyance force to the sheets by rotating an endless belt or the like wound around pulleys.

Moreover, although in the first embodiment described above the sheet feeding apparatus is exemplified as that the original documents are conveyed to the reading position of the scanner and after reading of the images the original documents are delivered onto the delivery tray, the sheet feeding apparatus according to the invention is applicable, in addition to feeding the documents to the scanner, to an automatic document feeding apparatus in a photocopier, a feeding apparatus for feeding recording sheets in a printer, or a feeding apparatus for feeding original documents or recording sheets in a facsimile machine, and the like. Accordingly, the sheets fed by the sheet feeding apparatus, can be recording sheets, in addition to the original documents as described above, cannot be limited to a paper, and can be made of materials of non-paper such as plastic sheets or the like.

In this invention, as described above, since the gear for transmitting the drive force and the retard roller shaft or the feed roller shaft are coupled by the coupling member in which the universal joint forms coupling, the length of the coupling member can be long even if the apparatus is made compact, and the inclined angle of the coupling member cannot be larger even when the retard roller is rocked. Therefore, the rotational force to the retard roller or the feed roller is smoothly transmitted by the universal joint, thereby making stable the pushing force by the roller, and thereby preventing eccentric worn-out.

What is claimed is:

1. A sheet feeding apparatus for separating stacked sheets one by one and feeding the sheets, comprising:

rotative feeding means for feeding sheets;

a retard roller disposed to be capable of contacting the rotative feeding means, rotating in a reverse direction to the feeding direction of the sheets, for separating the sheets one by one between the retard roller and the rotative feeding means;

a torque limiter for transmitting a predetermined torque to the retard roller:

a roller shaft for movably supporting the retard roller;

inputting means to which a drive force from a drive source is transmitted;

coupling member for coupling the roller shaft and the inputting means; and universal joints connecting the inputting means with the coupling member, and the coupling member with the roller shaft, respectively, wherein the torque limiter is disposed on the coupling member.

2. A sheet feeding apparatus for separating stacked sheets one by one and feeding the sheets, comprising:

rotative feeding means for feeding sheets;

a retard roller disposed to be capable of contacting the rotative feeding means, rotating in a reverse direction to the feeding direction of the sheets, for separating the sheets one by one between the retard roller and the rotative feeding means;

a torque limiter for transmitting a predetermined torque to the retard roller;

a roller shaft for movably supporting the rotative feeding means;

inputting means to which a drive force from a drive source is transmitted;

coupling member for coupling the roller shaft and the inputting means; and universal joints connecting the inputting means with the coupling member, and the coupling member with the roller shaft, respectively.

3. The sheet feeding apparatus according to claim 1 or 2, wherein the inputting means and the coupling member are connected directly by the universal joint.

4. The sheet feeding apparatus according to claim 1 or 2, further including a pickup roller for feeding sheets to the rotative feeding means and the retard roller.

5. The sheet feeding apparatus according to claim 4, further including a sheet stacking member capable of rocking to push the sheets onto the pickup roller, wherein when the sheets are fed the sheet stacking member is rocked to push the sheets onto the pickup roller.

6. The sheet feeding apparatus according to claim 4, wherein when the sheets are fed the pickup roller is rocked to push the sheets.

7. The sheet feeding apparatus according to claim 1 or 2, wherein the torque limiter transmits the predetermined torque to the retard roller and cuts off a transmission of the rotation when the predetermined torque is exerted to the retard roller in the reverse direction to its direction to permit the retard roller to rotate in the feeding direction of the sheets.

8. The sheet feeding apparatus according to claim 1 or 2, wherein each of the universal joints comprises a pin engaging a hole.

9. The sheet feeding apparatus according to claim 1, wherein the roller shaft is swingably supported so that the retard roller is capable of contacting to and separating from the rotative feeding means.

10. The sheet feeding apparatus according to claim 1, wherein the inputting means is a gear cantilevered to a support plate.

11. The sheet feeding apparatus according to claim 1, wherein the coupling member is coupled to the inputting means by one universal joint, includes an intermediate shaft connected to a drive input side of the torque limiter and a member connected to a drive output side of the torque limiter, and couples the connected member with the roller shaft by another universal joint.

12. An image reading apparatus for reading images on sheets, comprising:

a sheet feeding means comprising:
rotative feeding means for feeding sheets,
a retard roller disposed to be capable of contacting the rotative feeding means, rotating in a reverse direction to the feeding direction of the sheets, for separating the sheets one by one between the retard roller and the rotative feeding means,
a torque limiter for transmitting a predetermined torque to the retard roller,
a roller shaft for movably supporting the retard roller,
inputting means to which a drive force from a drive source is transmitted,
coupling member for coupling the roller shaft and the inputting means, and
universal joints connecting the inputting means with the coupling member, and the coupling member with the roller shaft, respectively wherein the torque limiter is disposed on the coupling member; and
a reading means for reading images on the sheets fed by the rotative feeding means.

13. An image reading apparatus for reading images on sheets, comprising:

a sheet feeding means comprising:
rotative feeding means for feeding sheets,
a retard roller disposed to be capable of contacting the rotative feeding mean, rotating in a reverse direction to the feeding direction of the sheets, for separating the sheets one by one between the retard roller and the rotative feeding means,
a torque limiter for transmitting a predetermined torque to the retard roller
a roller shaft for movably supporting the rotative feeding means,
inputting means to which a drive force from a drive source is transmitted,
coupling member for coupling the roller shaft and the inputting means, and
universal joints connecting the inputting means with the coupling member, and the coupling member with the roller shaft, respectively; and
a reading means for reading images on the sheet fed by the rotative feeding means.

* * * * *

UNITED STATES PATENT AND TRADEMARK OFFICE
CERTIFICATE OF CORRECTION

PATENT NO. : 5,816,569
DATED : October 6, 1998
INVENTOR(S) : AKIMITSU HOSHI

It is certified that error appears in the above-identified patent and that said Letters Patent is hereby corrected as shown below:

COVER PAGE

[56] References Cited, FOREIGN PATENT DOCUMENTS, "4031661404" should read --4031-661404-- and "3216428" should read --3-216428--.

COLUMN 2

Line 29, "seem" should read --seen--.

COLUMN 3

Line 55, "scanner" should read --scanner;--.

COLUMN 4

Line 19, "an" should read --a--.
    Line 63, "thereof" should read --thereof.--.

COLUMN 7

Line 7, "provided" should read --provide--.

COLUMN 11

Line 57, "such" should read --such as--.

UNITED STATES PATENT AND TRADEMARK OFFICE
CERTIFICATE OF CORRECTION

PATENT NO. : 5,816,569

DATED : October 6, 1998

INVENTOR(S) : AKIMITSU HOSHI

It is certified that error appears in the above-identified patent and that said Letters Patent is hereby corrected as shown below:

COLUMN 12

Line 28, "is" should read --are--.
    Line 29, "that" should read --that of--.
    Line 35, "that" should read --the fact that--.

COLUMN 13

Line 21, "an" should be deleted.

COLUMN 17

Line 2, "thereof" should read --thereof.--.
    Line 23, "transmitter" should read --transmitted--.

COLUMN 20

Line 35, "falling the" should read --falling of the--.

COLUMN 21

Line 13, "describes" should read --is described--.
    Line 58, "rocking ,on" should read --rocking on--.
    Line 66, "3 8" should read --38--.

COLUMN 23

Line 45, "as to" should read --to as--.

COLUMN 24

Line 25, "makes" should read --make--.

UNITED STATES PATENT AND TRADEMARK OFFICE
CERTIFICATE OF CORRECTION

PATENT NO. : 5,816,569

DATED : October 6, 1998

INVENTOR(S) : AKIMITSU HOSHI

It is certified that error appears in the above-identified patent and that said Letters Patent is hereby corrected as shown below:

COLUMN 25

Line 44, "second" should read --seconds--.
    Line 45, "second" should read --seconds--.
    Line 62, "operate" should read --operates--.

COLUMN 26

Line 6, "a" (second occurence) should be deleted.
    Line 18, "date" should read --data--.
    Line 63, "response" should read --respond--.

COLUMN 27

Line 30, "completely" should read --complete--.
    Line 31, "the half" should read --half.--.

COLUMN 29

Line 38, "an" should be deleted.

COLUMN 30

Line 44, "roller:" should read --roller;--.

UNITED STATES PATENT AND TRADEMARK OFFICE
CERTIFICATE OF CORRECTION

PATENT NO. : 5,816,569

DATED : October 6, 1998

INVENTOR(S) : AKIMITSU HOSHI

It is certified that error appears in the above-identified patent and that said Letters Patent is hereby corrected as shown below:

COLUMN 32

```
Line 5,  "sheets,"      should read  --sheets;--.
Line 8,  "means,"       should read  --means;--.
Line 10, "roller,"      should read  --roller;--.
Line 11, "roller,"      should read  --roller;--.
Line 13, "transmitted," should read  --transmitted;--.
Line 15, "means,"       should read  --means;--.
Line 25, "sheets,"      should read  --sheets;--.
Line 30, "means,"       should read  --means;--.
Line 32, "roller"       should read  --roller;--.
Line 34, "means,"       should read  --means;--.
Line 36, "transmitted," should read  --transmitted;--.
Line 38, "means,"       should read  --means;--.
```

Signed and Sealed this

Seventh Day of September, 1999

Attest:

Q. TODD DICKINSON

Attesting Officer

Acting Commissioner of Patents and Trademarks